United States Patent
Cwalina et al.

(10) Patent No.: US 12,248,455 B1
(45) Date of Patent: *Mar. 11, 2025

(54) SYSTEMS AND METHODS FOR GENERIC DATA PARSING APPLICATIONS

(71) Applicant: The Travelers Indemnity Company, Hartford, CT (US)

(72) Inventors: Roman Cwalina, Vernon, CT (US); Shashank Jain, Austin, TX (US); Vishesh Kain, Delhi (IN); Rudrappa Malapur, Karnataka (IN); Kalyani Chidrawar, Maharashtra (IN)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,390

(22) Filed: Nov. 2, 2023

Related U.S. Application Data

(63) Continuation of application No. 17/235,148, filed on Apr. 20, 2021, now Pat. No. 12,001,416.

(51) Int. Cl.
*G06F 16/00* (2019.01)
*G06F 16/182* (2019.01)
(Continued)

(52) U.S. Cl.
CPC ........ *G06F 16/2272* (2019.01); *G06F 16/182* (2019.01); *G06F 16/211* (2019.01);
(Continued)

(58) Field of Classification Search
CPC .............. G06F 16/2272; G06F 16/182; G06F 16/211–214; G06F 16/2455;
(Continued)

(56) References Cited

U.S. PATENT DOCUMENTS

| 7,792,814 B2 | 9/2010 | Cohen |
| 10,318,413 B1 | 6/2019 | Wilson et al. |

(Continued)

FOREIGN PATENT DOCUMENTS

| EP | 3623959 | 3/2020 |
| WO | WO 2004070500 | 9/2004 |

(Continued)

OTHER PUBLICATIONS

Office Action for U.S. Appl. No. 17/235,148 dated Jan. 26, 2023; 57 pps.

(Continued)

*Primary Examiner* — Srirama Channavajjala
(74) *Attorney, Agent, or Firm* — Rowan Tree Law Group, PLLC; Carson C. K. Fincham

(57) ABSTRACT

Systems and methods for Generic Data Parsing (GDP) applications may automatically parse unstructured and/or semi-structured data sources (e.g., extensible Markup Language (XML), JavaScript Object Notation (JSON), and/or Common Business-Oriented Language (COBOL)) and generate a normalized and/or structured (e.g., relational) data schema, and load the parsed data into the structured data schema, which may then be readily queried utilizing known end-user tools.

21 Claims, 22 Drawing Sheets

(51) Int. Cl.
*G06F 16/21* (2019.01)
*G06F 16/22* (2019.01)
*G06F 16/2455* (2019.01)
*G06F 16/435* (2019.01)

(52) U.S. Cl.
CPC ........ *G06F 16/214* (2019.01); *G06F 16/2455* (2019.01); *G06F 16/24564* (2019.01); *G06F 16/435* (2019.01)

(58) Field of Classification Search
CPC ............. G06F 16/24564; G06F 16/254; G06F 16/435; G06F 16/84; G06F 16/282; G06F 16/2386; G06F 16/2454; G06F 16/2343; G06F 16/25; G06F 16/2379
See application file for complete search history.

(56) References Cited

U.S. PATENT DOCUMENTS

| | | | |
|---|---|---|---|
| 11,042,560 | B2 | 6/2021 | Griffith et al. |
| 11,409,764 | B2 | 8/2022 | Rehal |
| 2004/0168124 | A1 | 8/2004 | Beisiegel et al. |
| 2008/0320012 | A1 | 12/2008 | Loving et al. |
| 2012/0331392 | A1* | 12/2012 | Akolkar ............... G06F 40/143 715/738 |
| 2014/0330780 | A1* | 11/2014 | Chen .................... G06F 16/27 707/625 |
| 2016/0321307 | A1* | 11/2016 | Dingman ............... G06F 16/25 |
| 2018/0349428 | A1* | 12/2018 | Wu ...................... G06F 16/282 |
| 2019/0171749 | A1* | 6/2019 | Varadarajalyengar ...................... G06F 16/256 |
| 2019/0325041 | A1 | 10/2019 | Bailey et al. |
| 2021/0233146 | A1* | 7/2021 | Palmert ................ G06F 16/288 |
| 2021/0266258 | A1* | 8/2021 | Sheu ..................... H04L 69/22 |
| 2022/0147497 | A1 | 5/2022 | Zimmerman et al. |

FOREIGN PATENT DOCUMENTS

| | | |
|---|---|---|
| WO | WO 2005010643 | 2/2005 |
| WO | WO2007112009 A1 * | 10/2007 |
| WO | WO2010042238 A1 * | 4/2010 |
| WO | WO2015126959 A1 * | 7/2015 |
| WO | WO 2021173777 | 9/2021 |

OTHER PUBLICATIONS

Notice of Allowance for U.S. Appl. No. 17/235,148 dated Aug. 10, 2023; 10 pps.

Borsotti et al., "Fast GLR parsers for extended BNF grammars and transition networks", Journal of Computer Languages 64 (2021), Apr. 8, 2021, pp. 1-19.

S. Vinoski, "Enterprise Integration with Ruby", IEEE Internet Computing (vol. 10, Issue 4, Jul.-Aug. 2006), Sep. 2006, pp. 91-93.

Malcolm et al., "Increasing the accessibility to Big Data systems via a common services API", IEEE International Conference on Big Data (Big Data) Oct. 2014, pp. 883-892.

* cited by examiner

920a 922-2  922-3  922-4

🔍 QA TOOL → BASE           [ ] JSON  [ ] XML  [ ] CPYBK

[Search for Track id...  922-1                              ]

| Track Id | Created | Progress | Status | Details | Container | Application | Policy Id | Type |
|---|---|---|---|---|---|---|---|---|
| 88662 | 2020-06-16 10:21:37.175284 | 100% | ✓ completed | 📄 | pi_mstr_hois_proj | hois | d7G95s | Success |
| 532681 | 2020-06-16 10:20:55.144889 | 100% | ✓ completed | 📄 | pi_mstr_dre_proj | dre | 2326188 | Success |

🔍 JSON TESTING

Container Name
[pi_mstr_dre_proj                                    922-5  ▼]

Source Name
[dre                                                 922-6  ▼]

🔍 /root/ia_record/policy_id
[3673049128                                          922-7  ]

🔍 /root/ia_record/IA_GENERATED_RATE_DATE
[2020-01-25-00.0010977402                            922-8  ]

Cycle Date
[03/11/2020                                          922-9  📅]

Testing Type
⦿ JSON E-z-E Data Testing    ○ Sample JSON Retrieval  }  922-10

( Submit Request )

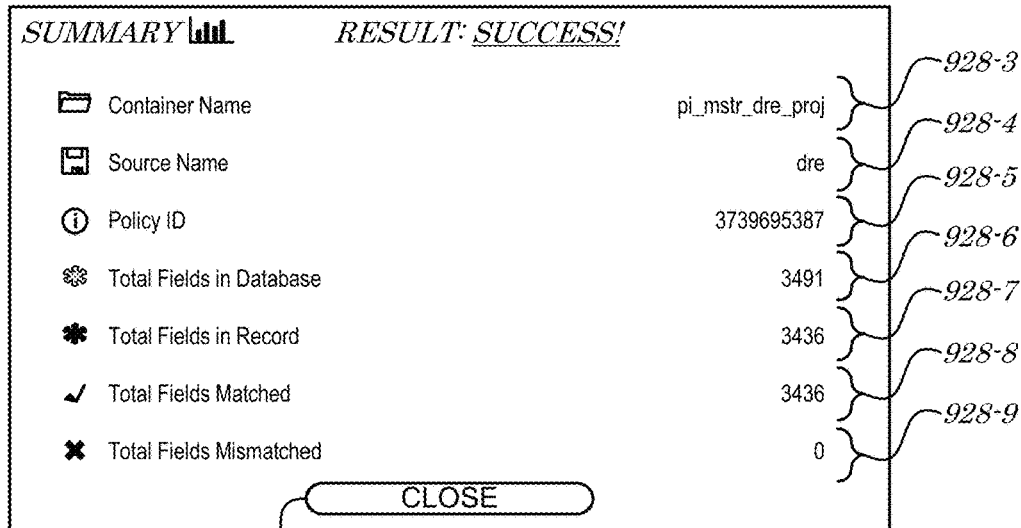

FIG. 9C

| # | Field Xpath | Hive Ind | Table Name | Field Name | #Raw | #Hive | Match |
|---|---|---|---|---|---|---|---|
| 1 | /root/ia_record | ✓ | root | ia_record | 0 | 0 | ✓ |
| 2 | /root/ia_record/IA_GENERATED_RATE_PROCESS_DATE | ✓ | root | ia_generated_rate_process_date | 1 | 1 | ✓ |
| 3 | /root/ia_record/QIW_QP_LOAD_INDICATOR | ✓ | root | qiw_qp_load_indicator | 0 | 0 | ✓ |
| 4 | /root/ia_record/aggregate_ind | ✓ | root | aggregate_ind | 1 | 1 | ✓ |
| 5 | /root/ia_record/darkmode_ind | ✓ | root | darkmode_ind | 1 | 1 | ✓ |
| 6 | /root/ia_record/death_disability_ids/death_disability_id | ✓ | death_disability_ids | death_disability_id | 0 | 0 | ✓ |
| 7 | /root/ia_record/drivers_aci_id/aci_id_grp/aci_id | ✓ | aci_id_grp | aci_id | 0 | 0 | ✓ |
| 8 | /root/ia_record/drivers_aci_id/driver_id | ✓ | drivers_aci_id | drivers_id | 1 | 1 | ✓ |

FIG. 9D

SYSTEMS AND METHODS FOR GENERIC DATA PARSING APPLICATIONS

CROSS-REFERENCE TO RELATED APPLICATIONS

Benefit and priority under 35 U.S.C. § 120 is hereby claimed to, and this is a Continuation of, U.S. patent application Ser. No. 17/235,148 filed on Apr. 20, 2021 and titled "SYSTEMS AND METHODS FOR GENERIC DATA PARSING APPLICATIONS", which issued as U.S. Pat. No. 12,001,416 on Jun. 4, 2024, which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Vast amounts of data are analyzed in various industries to facilitate wide-ranging decision-making processes. Data is often stored in structured databases such as relational data stores and is accessed by utilizing available end-user tools such as the Structured Query Language (SQL) and/or various data visualization software applications, such as the SAP® Data Warehouse Cloud available from SAP SE of Waldorf, Germany, DOMO® for BI available from Domo, Inc. of American Fork, UT, and IBM® Cognos® Analytics available from the International Business Machines Corporation (IBM) of Armonk, NY. Business Analysts utilize these tools to access and analyze the data, run reports, and identify data relationships to provide insights for many industries.

In many cases, however, source data may exist (or be provided) in an unstructured or semi-structured format, neither of which is compatible with standard analysis tools. In such cases, programmers are tasked with developing customized coding solutions that transform the unstructured/ semi-structured data into a format conducive to end-user analysis. Different programing languages such as Java™ available from the Oracle® Corporation of Santa Clara, CA and/or tools, such as the open-source Apache Hive Serializer/Deserializer (SerDe) may be utilized, for example, to develop specialized software code that is capable of transforming data from a particular unstructured or semi-structured data source format into a more usable format for end-users.

Customized coding solutions required for manageable end-user access to the data are, however, time consuming and expensive to develop—e.g., programmers are generally a limited resource due to the specialized training required to fulfil their roles and end-users lack the necessary expertise to develop such customized coded solutions. The solutions are also customized for each particular data source being transformed and are accordingly not useful outside of the particular programmed context. In the case that a coded solution is developed to load data from a particular format of a semi-structured data source, for example, such a solution would fail if it were utilized to attempt to load from a different data source having a different format.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein:

FIG. 9A, FIG. 9B, FIG. 9C, FIG. 9D, and FIG. 9E are diagrams of example interfaces according to some embodiments;

DETAILED DESCRIPTION

I. Introduction

Figure 1:
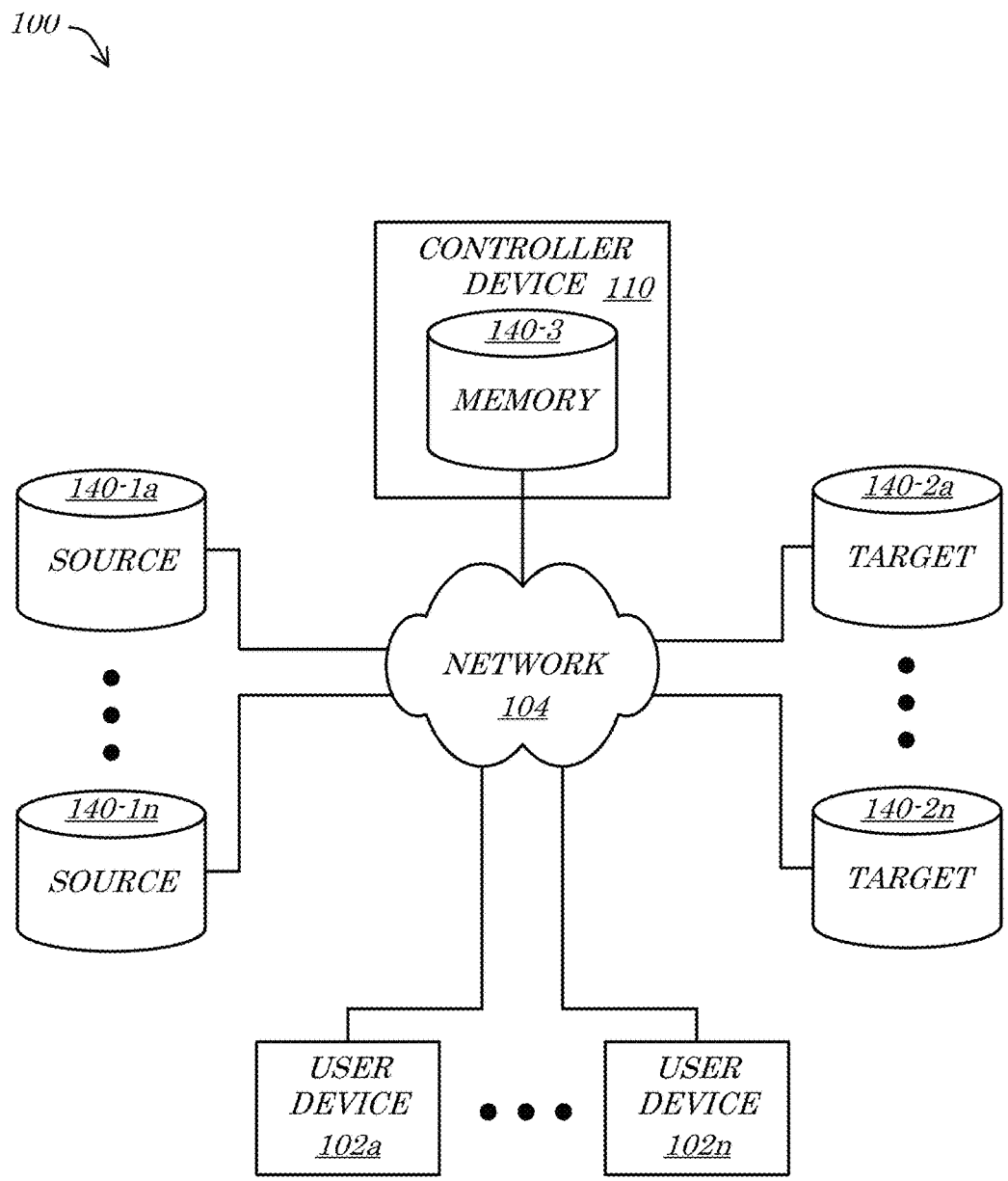
FIG. 1 is a block diagram of a system according to some embodiments.

Customized coding solutions that permit end-users (e.g., business analysts) to access unstructured and/or semi-structured data sources are expensive, time-consuming, and inflexible. As many sources of unstructured and/or semi-structured data are legacy data sources, the customized coding solutions are typically designed for legacy data loading (e.g., one-time transformation runs) and are accordingly not capable of managing repetitive data loads-particularly in the case that any changes have occurred in the source data structure. Customized tools are only capable of parsing data fields for which they have been programmed, for example, and should changes in the source file field makeup occur, the code would need to be altered and retested prior to deployment (resulting in additional cost and time delays). Typical data transformation code also does not have the ability to detect such changes in the source file structure, nor does it provide any mechanism for analyzing source file changes.

In accordance with embodiments herein, these and other deficiencies of previous solutions are remedied by providing systems, apparatus, methods, and articles of manufacture for Generic Data Parsing (GDP) applications. The inventors have realized, for example, that unstructured and/or semi-structured data sources (i) may need to be loaded multiple times, (ii) may include different formats (even for the same type of data source), and/or (iii) may change in format over time (e.g., for non-legacy unstructured and/or semi-structured data sources). According to some embodiments, a GDP application may be configured to automatically parse unstructured and/or semi-structured data sources (e.g., extensible Markup Language (XML), JavaScript Object Notation (JSON), and/or COmmon Business-Oriented Language (COBOL)) and generate a normalized and/or structured (e.g., relational) data schema, and load the parsed data into the structured data schema, which may be readily queried utilizing known end-user tools. In some embodiments, the GDP application may comprise a "code-less" solution that requires only limited configuration input from a user to operate. The GDP application may, for example, provide the ability to (i) derive schemas (e.g., normalized and/or structured) from unstructured and/or semi-structured data sources, (ii) create tables and/or databases based on the generated schemas, and/or (iii) identify/detect changes in source data structures, all while requiring only end-user level input (e.g., without coding). In such a manner, for example, the GDP application may provide significantly reduced development and/or rollout times for processing new and/or changed unstructured and/or semi-structured data sources. According to some embodiments, the GDP application may run in either parallel or sequential modes and/or may include one or more code generators that may, for example, automatically generate Python/Spark (PySpark) code to load unstructured and/or semi-structured data source base data to publish containers.

II. Generic Data Parsing Application Systems

Referring first to FIG. 1, a block diagram of a system 100 according to some embodiments is shown. In some embodiments, the system 100 may comprise a plurality of user devices 102a-n, a network 104, a controller device 110, and/or various data storage devices, such as one or more data sources 140-1a-140-1n, one or more data targets 140-2a-140-2n, and/or a memory device 140-3. As depicted in FIG. 1, any or all of the devices 102a-n, 110, 140-1a-140-1n, 140-2a-140-2n, 140-3 (or any combinations thereof) may be in communication via the network 104. In some embodiments, the system 100 may be utilized to provide a GDP application platform that permits unstructured and/or semi-structured data to be readily accessed by end-users (e.g., operating the user devices 102a-n). The controller device 110 may, for example, interface with and/or direct one or more of the user devices 102a-n, the data sources 140-1a-140-1n, the data targets 140-2a-140-2n, and/or the memory device 140-3 to automatically generate and provide end-user accessible data (e.g., via the one or more data targets 140-2a-140-2n) transformed from one or more unstructured and/or semi-structured data elements (e.g., stored in the one or more data sources 140-1a-140-1n).

Fewer or more components 102a-n, 104, 110, 140-1a-140-1n, 140-2a-140-2n, 140-3 and/or various configurations of the depicted components 102a-n, 104, 110, 140-1a-140-1n, 140-2a-140-2n, 140-3 may be included in the system 100 without deviating from the scope of embodiments described herein. In some embodiments, the components 102a-n, 104, 110, 140-1a-140-1n, 140-2a-140-2n, 140-3 may be similar in configuration and/or functionality to similarly named and/or numbered components as described herein. In some embodiments, the system 100 (and/or portions thereof) may comprise a GDP application program, system, and/or platform programmed and/or otherwise configured to execute, conduct, and/or facilitate the methods 300, 700, 800 of FIG. 3A, FIG. 3B, FIG. 3C, FIG. 7, and/or FIG. 8 herein, and/or portions or combinations thereof.

The user devices 102a-n, in some embodiments, may comprise any types or configurations of computing, mobile electronic, network, user, and/or communication devices that are or become known or practicable. The user devices 102a-n may, for example, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. According to some embodiments, the user devices 102a-n may comprise any combination and/or configuration of electronic devices that store, receive, transmit, provide, and/or process data, such as one or more "smart" cards, Radio Frequency (RF) Identification (RFID) and/or Near Field Communication (NFC) cards, chips, and/or other data storage and/or processing objects. In some embodiments, the user devices 102a-n may be owned and/or operated by different users and/or classes or groups of users. Ownership and/or operation by one or more entities or groups may be signified and/or defined by different sets of login credentials, identifiers, etc. A first user or group may be privy to, own, be assigned, and/or utilize a first set of login credentials and/or a first identifier that grants access to a first set of access privileges, for example, while a second user or group may be privy to, own, be assigned, and/or utilize a second set of login credentials and/or a second identifier that grants access to a second set of access privileges.

According to some embodiments, the user devices 102a-n may comprise devices owned and/or operated by one or more end-users, such as business analysts, report designers, revenue management analysis personnel, customers, and/or potential customers that, e.g., each utilize a unique login identifier and/or login credentials combination. In some embodiments, the user devices 102a-n may comprise devices owned and/or operated by one or more agents, representatives, brokers, third-parties, and/or other users that, e.g., each utilize a unique user login identifier and/or user login credentials combination. According to some embodiments, the user devices 102a-n may communicate with the controller device 110 via the network 104 to (i) operate a GDP application to load unstructured and/or semi-structured data source data into one or more normalized and/or relational data targets and/or (ii) access unstructured and/or semi-structured data as transformed and/or loaded into the one or more normalized and/or relational targets via the GDP application, as described herein.

In some embodiments, the controller device 110 may comprise an electronic and/or computerized controller device, such as a computer server, communicatively coupled to interface with the user devices 102a-n, the data sources 140-1a-140-1n, the data targets 140-2a-140-2n, and/or the memory device 140-3 (directly and/or indirectly). The controller device 110 may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the controller device 110 may comprise a plurality of processing devices specially programmed to execute and/or conduct processes that are not practicable without the aid of the controller device 110. The controller device 110 may, for example, execute a specially coded GDP application that permits unstructured and/or semi-structured data to be readily accessed by end-users via standard query tools, as described herein. In some embodiments, such unstructured and/or semi-structured data may only be readily accessed by implementation of individual customized coding efforts in the absence of the specially programmed controller 110, for example, which would at least increase the time and cost necessary to achieve the desired access. According to some embodiments, the controller device 110 may be located remotely from one or more of the user devices 102a-n, the data sources 140-1a-140-1n, the data targets 140-2a-140-2n, and/or the memory device 140-3. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute one or more API, Artificial Intelligence (AI), neural network, and/or other programs, modules, and/or routines that permit the automatic transformation of unstructured and/or semi-structured data sources into normalized and/or relational data targets. According to some embodiments, the controller device 110 may comprise a computerized processing device, such as a computer server and/or other electronic device, to manage and/or facilitate queries and/or communications regarding the user devices 102a-n. The controller device 110 may be utilized, for example, to: (i) receive and verify or authenticate various identifiers and/or login credentials provided by any or all of the user devices 102a-n, (ii) lookup and/or retrieve data stored in association with the received identifiers and/or login credentials, (iii) identify, manage, and/or verify or authenticate data access permissions, (iv) identify, manage, and/or verify or authenticate one or more third-party external applications and/or data sources (such as the data sources 140-1a-140-1n), and/or (v) provide access to one or more normalized and/or relational tables and/or databases (such as the data targets 140-2a-140-2n) in which the transformed data is stored, as described herein.

The network 104 may, according to some embodiments, comprise a Local Area Network (LAN; wireless and/or wired), cellular telephone, Bluetooth® and/or Bluetooth Low Energy (BLE), NFC, and/or RF network with communication links between the controller device 110, the user devices 102a-n, the data sources 140-1a-140-1n, the data targets 140-2a-140-2n, and/or the memory device 140-3. In some embodiments, the network 104 may comprise direct communication links between any or all of the components 102a-n, 110, 140-1a-140-1n, 140-2a-140-2n, 140-3 of the system 100. The user devices 102a-n may, for example, be directly interfaced or connected to the controller device 110 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102a-n may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140-1a-140-1n, 140-2a-140-2n, 140-3 of the system 100. The network 104 may comprise one or more cellular telephone networks with communication links between the user devices 102a-n and the controller device 110, for example, and/or may comprise a BLE, NFC, RF, and/or a "personal" network comprising short-range wireless communications between various user devices 102a-n, for example.

In some embodiments, the controller device 110 (and/or the user devices 102a-n) may be in communication with the data sources 140-1a-140-1n, the data targets 140-2a-140-2n, and/or the memory device 140-3. According to some embodiments, the data sources 140-1a-140-1n may store various databases, files, and/or other formats, quantities, and/or configurations of data, such as one or more types and/or formats of unstructured and/or semi-structured data. The data sources 140-1a-140-1n may store, for example, various XML, JSON, COBOL (e.g., CopyBook), text files (e.g., "flat files"), audio files, video files, sensor data, images, e-mails, website data, articles and/or publications, etc. In some embodiments, the data targets 140-2a-140-2n may comprise one or more data storage devices, such as databases, table spaces, tables, files, etc. that are normalized and/or structured, e.g., in a relational data management architecture. According to some embodiments, the memory device 140-3 may store user and/or account identification data, security data (e.g., login credentialing and/or decryption data), blockchain data (chaincode and/or blockchain ledger data), preference and/or characteristics data, user profile data, permissions data, external application data (e.g., external application instructions, addresses, and/or payment information), and/or instructions that cause various devices (e.g., the controller device 110 and/or the user devices 102a-n) to operate in accordance with embodiments described herein. The memory device 140-3 may store, for example, GDP application logic, scripts, code, and/or APIs, blockchain curator/notary data, chaincode, ledger data (e.g., storing various data related to user communications, relationships, and/or transactions), third-party application scripts, insured object data (e.g., type, capability, and/or location), and/or decision-making data (e.g., thresholds and/or logic). In some embodiments, the memory device 140-3 may comprise any type, configuration, and/or quantity of data storage devices that are or become known or practicable. The memory device 140-3 may, for example, comprise an array of optical and/or solid-state hard drives configured to store and/or process unstructured and/or semi-structured data (e.g., from one or more of the data sources 140-1a-140-1n) identified and/or provided by (and/or requested by) one or more of the user devices 102a-n, data parsing instructions, and/or various operating instructions, drivers, etc. While the memory device 140-3 is depicted as component of the controller device 110 in FIG. 1, in some embodiments the memory device 140-3 may comprise a stand-alone component of the system 100 and/or may comprise multiple components (e.g., the data sources 140-1a-140-1n and/or the data targets 140-2a-140-2n). In some embodiments, a multi-component memory device 140-3 (and/or data source 140-1a-140-1n and/or the data target 140-2a-140-2n) may be distributed across various devices and/or may comprise remotely dispersed components. Any or all of the user devices 102a-n, the network 104, and/or the controller device 110 may comprise the memory device 140-3 (and/or data source 140-1a-140-1n and/or the data target 140-2a-140-2n) or a portion thereof, for example.

Figure 2:
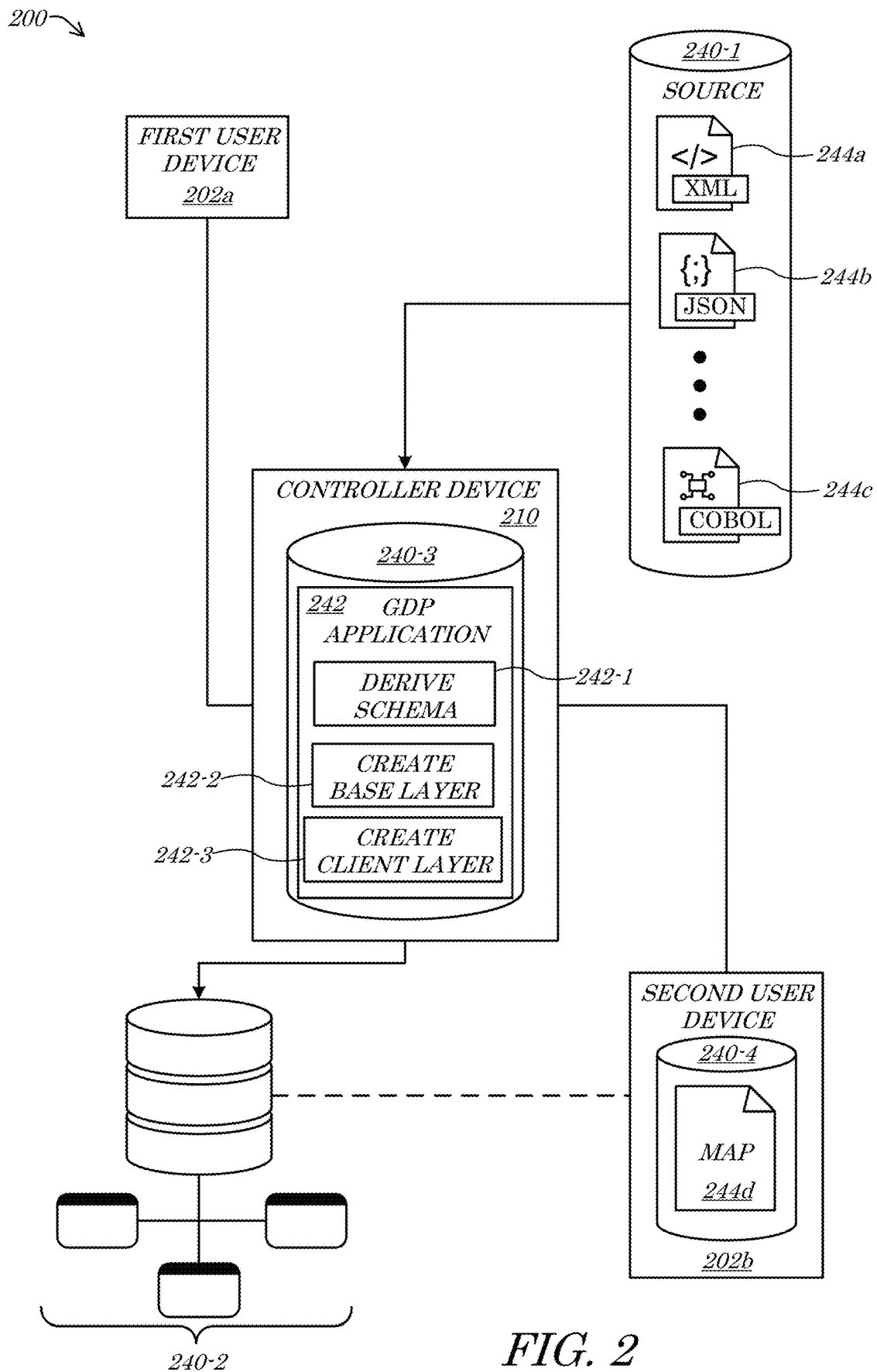
FIG. 2 is a block diagram of a system according to some embodiments.

Turning to FIG. 2, a block diagram of a system 200 according to some embodiments, is shown. In some embodiments, the system 200 may comprise a first user device 202a, a second user device 202b, and/or a controller device 210. According to some embodiments, the system may comprise one or more data storage devices, such as a data source 240-1, a data target 240-2, an operational memory device 240-3, and/or a user memory device 240-4. In some embodiments, the first user device 202a and the second user device 202b may be in communication with the controller device 210, which may comprise and/or be in communication with the operational memory device 240-3. According to some embodiments, either or both of the data source 240-1 and the data target 240-2 may be in communication with and/or accessible to the controller device 210.

According to some embodiments, the first user device 202a and the second user device 202b may comprise one or more computers and/or smart mobile phones, such as the iPhone® 12 (or a later generation iPhone®), running iOS 14 (or a later generation of iOS), supporting Location Services. The iPhone® and iOS are produced by Apple Inc., however, embodiments herein are not limited to any particular fixed or portable computing device or smart mobile phone. For example, the first user device 202a and the second user device 202b may take the form of a laptop computer, a handheld computer, a palm-size computer, a pocket computer, a palmtop computer, a Personal Digital Assistant (PDA), a tablet computer, an electronic organizer, a mobile phone, a portable/mobile phone, a feature phone, a smartphone, a tablet, a portable/mobile data terminal, an iPhone®, an iPad®, an iPod®, an Apple® Watch (or other "smart" watch), and other portable and/or wearable form-factor devices from any vendor containing at least one Central Processing Unit (CPU) and a wireless communication device (not separately depicted in FIG. 2).

In some embodiments, the first user device 202a may be utilized by a first user (not shown) to initiate a GDP application 242 executed by the controller device 210 (e.g., and/or stored by the operational memory device 240-3). The first user device 202a may, for example, transmit a command, instruction, and/or signal to the controller device 210 (e.g., that is accordingly received by the controller device 210) that causes the controller device 210 to call, initiate, and/or invoke the GDP application 242. According to some embodiments, the GDP application 242 may comprise and/or define various components, modules, routines, and/or functions such as a derive schema module 242-1, a create base layer module 242-2, and/or a create client layer module 242-3. In some embodiments, the first user device 202a may be utilized to provide input that is utilized by the GDP application 242. The input may comprise, for example, an indication of the data source 240-1 and/or one or more data files 244a-c stored therein. The data files 244a-c may comprise any quantity, size, type, format, and/or configuration of unstructured and/or semi-structured data that is or becomes known or practicable. As depicted in FIG. 2, for example, the data files 244a-c may comprise any or all of an XML file 244a, a JSON file 244b, and/or a COBOL file 244c. While the term "files" is utilized for ease of explanation regarding the data files 244a-c, in some embodiments, the data files 244a-c may comprise other and/or additional types of data storage objects.

According to some embodiments, the GDP application 242 may utilize the input (and/or may otherwise identify and/or access the data source 240-1) to process the data files 244a-c in accordance with embodiments described herein. The GDP application 242 may utilize the derive schema module 242-1, for example, to generate, create, update, and/or append a normalized and/or relational data schema (not shown) from (e.g., based on) one or more of the data files 244a-c. In some embodiments, the GDP application 242 may utilize the create base layer module 242-2 to process output from the derive schema module 242-1 to create and/or update one or more normalized and/or relational data stores (e.g., the data target 240-2; otherwise, not shown) in which the content of the data files 244a-c may be stored. According to some embodiments, the GDP application 242 may utilize the create client layer module 242-3 to process output from the derive schema module 242-1 and/or the create base layer module 242-2 to populate one or more normalized and/or relational data stores (e.g., the data target 240-2; otherwise, not shown) in which the content of the data files 244a-c may be stored and/or arranged for access by an end-user (not shown).

In some embodiments, the second user device 202b may comprise a device operated by an end-user, such as a business-side data consumer that has limited data querying tools and/or skills. According to some embodiments, the second user device 202b may interface directly with the controller device 210 and/or may accordingly indirectly access the data target 240-2 and/or may directly interface with the data target 240-2. In some embodiments, the second user device 202b may be utilized to query normalized and/or relationally organized data transformed from the data files 244a-c and stored in the data target 240-2 (e.g., a relational database). As described herein, for example, the GDP application 242 may conduct the transformation specifically to permit the second user device 202b (and/or the end-user thereof) to access the contents of the data files 244a-c utilizing standard query tools, such as SQL and/or Apache Hive.

According to some embodiments, the second user device 202b may be utilized to effect and/or manage the execution of the GDP application 242. The user memory device 240-4 may store, for example, a map file 244d that is utilized as input into at least a portion of the processing conducted by the GDP application 242. In some embodiments, the map file 244d may comprise a table, header, matrix, delimited data file, and/or other data object that stores one or more values descriptive of a desired structure of the data target 240-2. In the case that the end-user comprises a business analyst, for example, the business analyst may desire that the data files 244a-c be loaded into certain structures, formats, and/or arrangements within the data target 240-2. According to some embodiments, the map file 244d may comprise and/or define various source and/or target variables that govern how the GDP application 242 (or the create client layer module 242-3 thereof) creates a client base layer (e.g., a Single Subject Layer (SSL)) within the data target 240-2. In such a manner, for example, the end-user (e.g., utilizing the second user device 202b) may easily provide inputs into the data transformation by simply defining or editing values in the map file 244d. In some embodiments, the map file 244d may be embodied in and/or accessed via one or more interfaces (not shown). The user devices 202a-b may run (i.e., execute) software applications (not shown in FIG. 2), for example, that cause the generation and/or output of respective Graphical User Interfaces (GUIs; also not shown in FIG. 2; e.g., the interfaces 420a-g, 920a-e, 1020 of FIG. 4A, FIG. 4B, FIG. 4C, FIG. 4D, FIG. 4E, FIG. 4F, FIG. 4G, FIG. 9A, FIG. 9B, FIG. 9C, FIG. 9D, FIG. 9E, and/or FIG. 10 herein) that are, for example, defined by the GDP application 242. According to some embodiments, such interfaces may be utilized to access, monitor, and/or manage the GDP application 242 and/or may be utilized to execute one or more standardized and/or structured query tools to access the data target 240-2.

Fewer or more components 202a-b, 210, 240-1, 240-2, 240-3, 240-4, 242, 242-1, 242-2, 242-3, 244a-d and/or various configurations of the depicted components 202a-b, 210, 240-1, 240-2, 240-3, 240-4, 242, 242-1, 242-2, 242-3, 244a-d may be included in the system 200 without deviating from the scope of embodiments described herein. In some embodiments, the components 202a-b, 210, 240-1, 240-2, 240-3, 240-4, 242, 242-1, 242-2, 242-3, 244a-d may be similar in configuration and/or functionality to similarly named and/or numbered components as described herein. In some embodiments, the system 200 (and/or portions thereof) may comprise a GDP application program, system, and/or platform programmed and/or otherwise configured to execute, conduct, and/or facilitate the methods 300, 700, 800 of FIG. 3A, FIG. 3B, FIG. 3C, FIG. 7, and/or FIG. 8 herein, and/or portions or combinations thereof.

III. Generic Data Parsing Application Methods

Figure 3A:
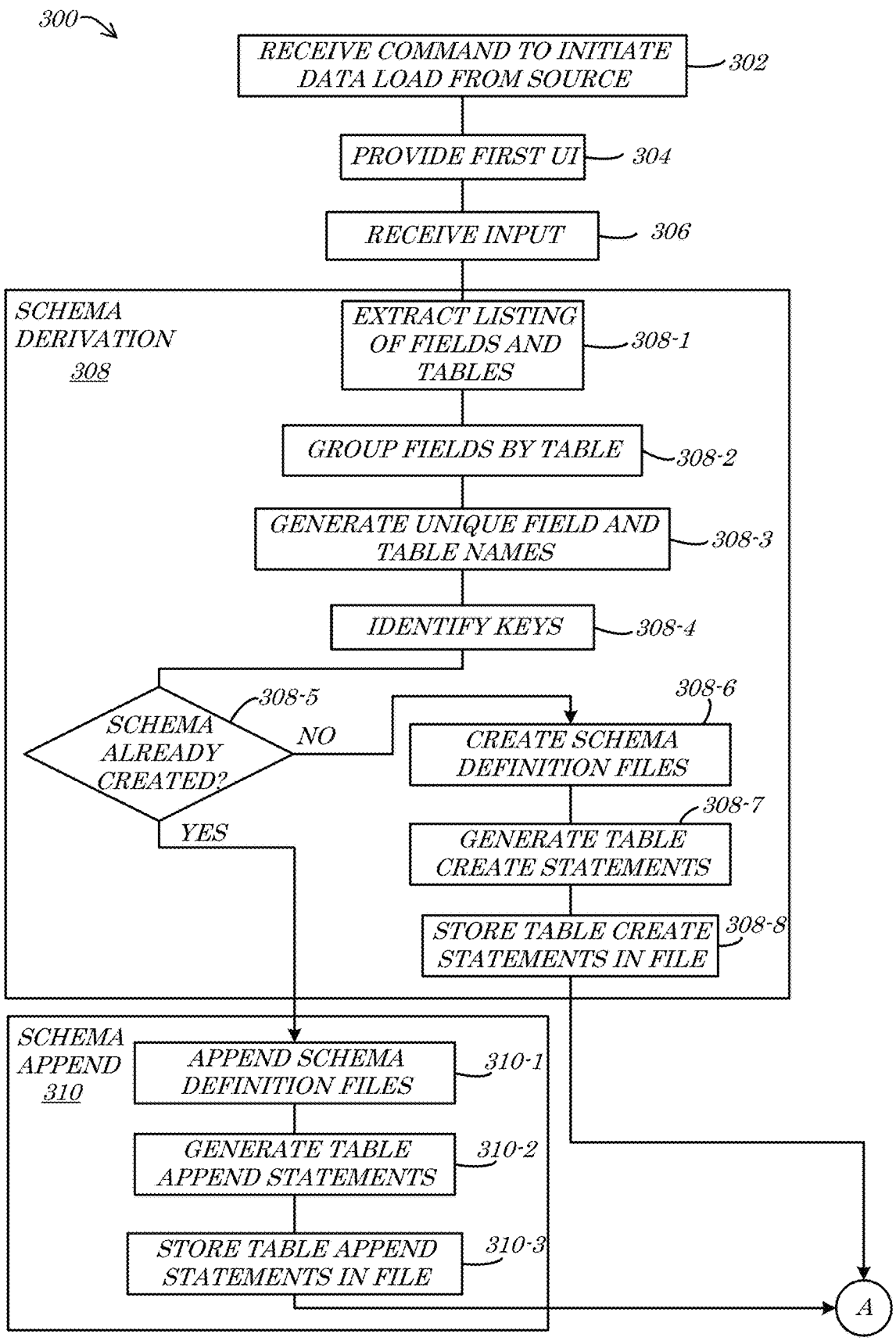
FIG. 3A, FIG. 3B, and FIG. 3C are flow diagrams of a method according to some embodiments.
Figure 3B:
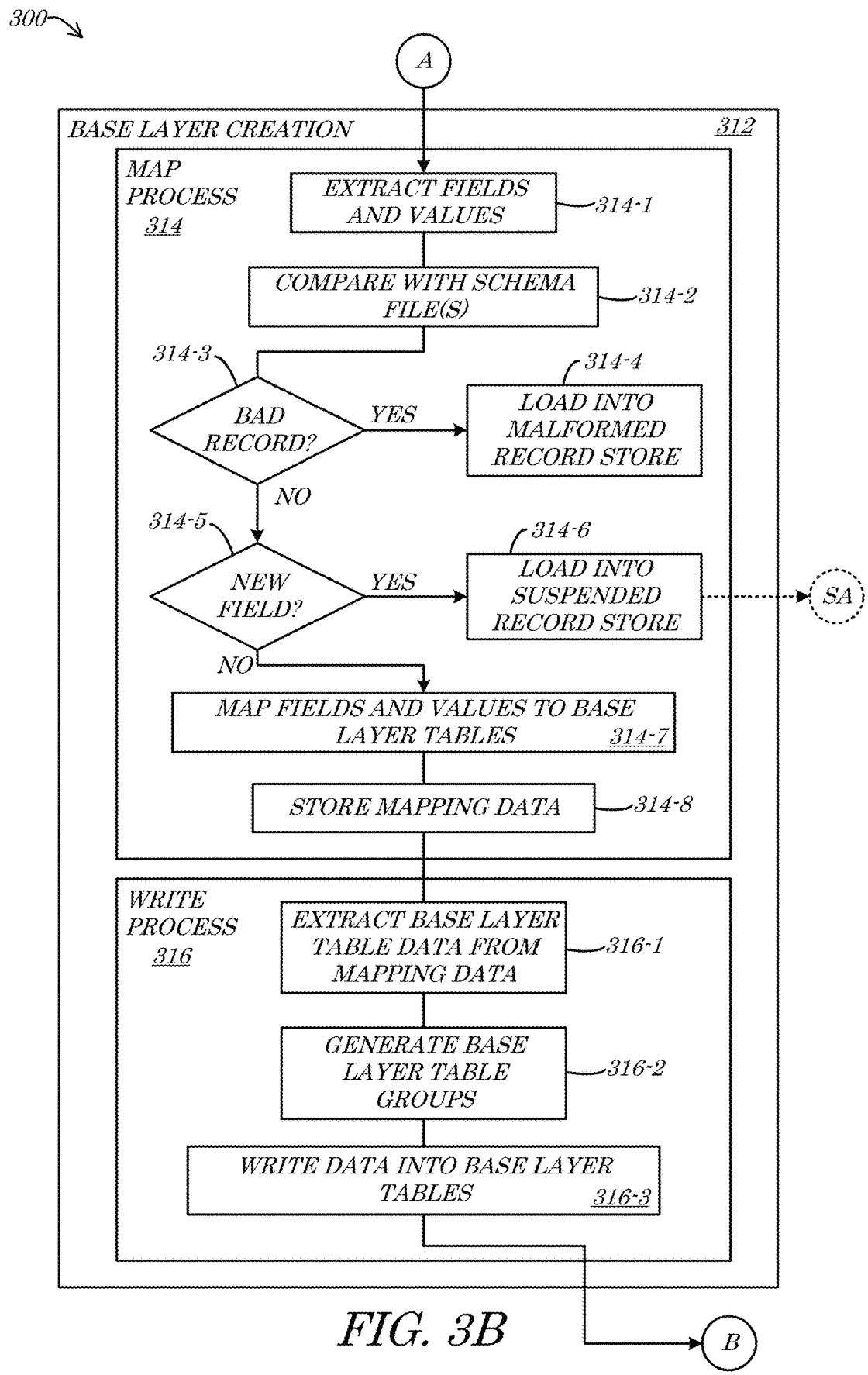
Figure 3C:
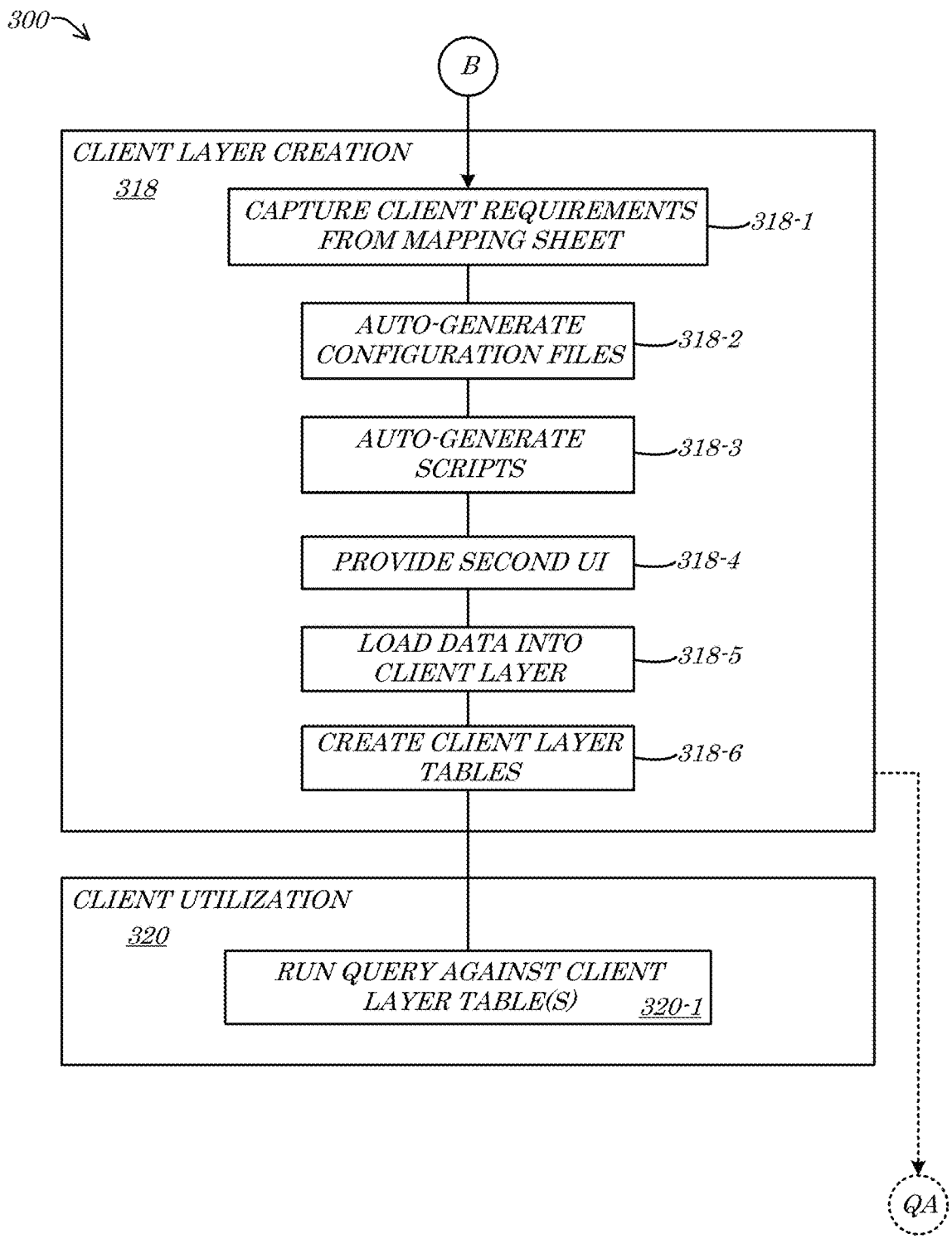

Turning now to FIG. 3A, FIG. 3B, and FIG. 3C, flow diagrams of a method 300 according to some embodiments are shown. In some embodiments, the method 300 may be performed and/or implemented by and/or otherwise associated with one or more specialized and/or specially-programmed computers (e.g., one or more of the user devices 102a-n, 202a-b, 402 and/or the controller devices 110, 210, and/or the apparatus 1010 of FIG. 1, FIG. 2, FIG. 4A, FIG. 4B, FIG. 4C, FIG. 4D, FIG. 4E, FIG. 4F, FIG. 4G, and/or FIG. 10 herein), computer terminals, computer servers, computer systems and/or networks, and/or any combinations thereof (e.g., by one or more multi-threaded and/or multi-core processing units of a GDP application program unstructured and/or semi-structured data processing system). In some embodiments, the method 300 may be embodied in, facilitated by, and/or otherwise associated with various input mechanisms and/or interfaces (such as the interfaces 420a-g, 920a-e, 1020 of FIG. 4A, FIG. 4B, FIG. 4C, FIG. 4D, FIG. 4E, FIG. 4F, FIG. 4G, FIG. 9A, FIG. 9B, FIG. 9C, FIG. 9D, FIG. 9E, and/or FIG. 10 herein). According to some embodiments, the method 300 may embody an unstructured and/or semi-structured data flow and/or process that comprises a non-limiting example of how an end-user may easily, repeatably, and with alerts to changes in source data structure, transform unstructured and/or semi-structured data into one or more normalized and/or relational data tables, without requiring a knowledge of coding.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140-1a-140-1n, 140-2a-140-2n, 140-3, 240-1, 240-2, 240-3, 240-4, 1040, 1140a-e of FIG. 1, FIG. 2, FIG. 10, FIG. 11A, FIG. 11B, FIG. 11C, FIG. 11D, and/or FIG. 11E herein) may store thereon instructions that when executed by a machine (such as a computerized processor) result in performance according to any one or more of the embodiments described herein.

In some embodiments (and with initial reference to FIG. 3A), the method 300 may comprise receiving (e.g., by an electronic processing device and/or via an electronic network) a command to initiate a data load from a data source, at 302. The command may comprise and/or define various types and/or quantities of input, such as programming strings, commands, and/or parameters, menu selections, identifiers, etc. One example of a possible command is set forth in Script #1, as follows:

(1) python<script_location>/script_name.py where the "<script_location>" comprises an address for the GDP application and the "script_name" comprises an identifier of the particular GDP application desired for execution. Such a command may be entered via a command line or triggered via a menu and/or GUI element selection.

In another example, a user (e.g., a data transformation facilitator, programmer, and/or end-user) may utilize a GUI of an electronic user device, for example, to input a login/username or ID (e.g., an account identifier, user identifier, organization identifier, etc.), password, passphrase, biometric identifier, etc. In some embodiments, input credentials may comprise and/or define a token that is passed to a UI application node service in communication with the application being executed on the electronic user device. In some embodiments, the UI application service may forward the login request to a login API of an application server by generating an HTTP POST request that comprises the login credentials as JSON input. According to some embodiments, the token/credentials may be encrypted and/or compressed and/or may comprise decryption and/or decompression keys, data, hashes, etc. According to some embodiments, the user credentials may be validated and/or compared to security and/or access rights or protocols to determine whether the user has permission to access one or more data sources, data targets, and/or to change settings of the GDP application.

In some embodiments, the method 300 may comprise providing (e.g., by the electronic processing device) a first UI (or other menu system), at 304. In response to the receiving of the command to initiate the data load from the data source, for example, the electronic processing device may generate, output, and/or provide various elements defining the first UI. According to some embodiments, data descriptive of the first UI (and/or necessary for the output thereof) may be transmitted to at least one device from which the command originated (e.g., a user device). In some embodiments, the first UI may comprise one or more interactive menu and/or input/output elements that permit a user to receive and/or provide information regarding a GDP application. According to some embodiments, the UI may be provided prior to the receiving of the command and/or the command may be received via the first UI. An instance of the first UI may be provided via a static webpage and/or other network location, for example, and a user may define and/or transmit the command via such a first UI.

According to some embodiments, the method 300 may comprise receiving (e.g., by the electronic processing device and/or via the first UI) input, at 306. Either as part of the command (e.g., via a command-line parameter) or separately via the first UI, for example, a user may provide an indication of a request for a particular data load and/or transformation. In some embodiments, the request and/or input/command may comprise, identify, and/or define, for example, one or more unstructured and/or semi-structured data sources, data targets, and/or data transformation parameters. In some embodiments, the user may only need to provide an indication of the location of a data source for the method 300 to proceed. According to some embodiments, the user input may comprise additional data, such as a selection of a subset of files, data fields, etc., that are desired for the GDP application process. In some embodiments, the first UI may prompt the user to enter specific data items, such as (i) an input file, (ii) an output path, (iii) a desired number of sample records (e.g., for testing and/or verification), and/or (iv) a version identifier for a particular version of a GDP application parsing logic.

In some embodiments a schema derivation module or process 308 may comprise various steps, processes, and/or procedures directed to deriving, creating, generating, and/or updating a schema for the identified data source. In some embodiments, the schema derivation module or process 308 may determine how many tables will be created, the fields of the respective tables, and identify and/or generate the fields that can be used to establish relationships between parent and child tables. According to some embodiments, the schema may be utilized to map data stored in one or more unstructured and/or semi-structured formats at the data source to one or more normalized, structured, and/or relational data tables, fields, etc. In such a manner, as described herein, an end-user that is capable of accessing structured data sources via structured data query tools may be provided with usable access to the data elements that were originally stored in the unstructured and/or semi-structured formats at the data source.

According to some embodiments, the method 300 (and/or the schema derivation module or process 308) may comprise extracting (e.g., by the electronic processing device) a listing of fields and tables, at 308-1. The identifier and/or location data/address of the data source may be utilized, for example, to query and/or access one or more unstructured and/or semi-structured data files at the data source. According to some embodiments, the method 300 may execute one or more parsing logic scripts, models, and/or modules that analyze the contents of the source file(s). In some embodiments, the parsing logic may comprise a machine learning and/or Artificial Intelligence (AI) logical routine that steps through the data elements of the source file to identify various elements thereof, such as headers, footers, tags, table names, field names, field values, notes or comments, etc. According to some embodiments, the parsing/extracting may comprise an identification of character strings within the source file. In the case of an XML document, for example, the parsing may comprise an identification of opening and closing element characters "<" and ">" with any characters, terms, and/or phrases disposed therebetween being identified as elements—e.g., tables or fields. In some embodiments, repetitive instances of an identified table or field may be utilized to infer relationships within the source data.

In some embodiments, the method 300 (and/or the schema derivation module or process 308) may comprise grouping (e.g., by the electronic processing device) the fields by table, at 308-2. Whether based on identification of tags, syntax, typeface, font, location, and/or other programmed parameters, for example, one or more data fields and/or table elements may be identified based on the source data. In the case that a data hierarchy is identified within the source data, the identified elements may be grouped based on parent-child relationships based on the source data. In semi-structured data sources, such as XML, such relationships may be readily determined by identification of nested tags and/or elements. In less structured or unstructured data sources, grouping relationships, such as parent-child relationships, may be identified or inferred based on various characteristics of the source data such as typeface, font style and/or size, positioning within the document, and/or based on time/date parameters (e.g., chronological relationships). In some embodiments, multiple occurrences of an identical field (e.g., based on name and/or identifier) may be inferred to be members of different tables (e.g., inferred uniqueness). Once hierarchies and/or relationships are identified, such relationships may be memorialized and/or recorded by storing one or more data tags, codes, etc.

According to some embodiments, the method 300 (and/or the schema derivation module or process 308) may comprise generating (e.g., by the electronic processing device) unique field and table names, at 308-3. Unique field and table names may be utilized, for example, to differentiate each relationship within the source data. While the source data may permit multiple occurrences of the same field name, for example, to properly transform the unstructured and/or semi-structured data into a useful normalized and/or relational format that can readily be queried by an end-user, each distinct hierarchical path may be identified and/or stored. The unique field and table names may be stored and/or expressed in a logical fashion (e.g., in a hierarchical name path format) and/or may be encoded (e.g., machine-readable, but not necessarily human-readable).

In some embodiments, the method 300 (and/or the schema derivation module or process 308) may comprise identifying (e.g., by the electronic processing device) keys, at 308-4. In some embodiments, multiple occurrences of the same or similar field name may be utilized to identify relationships between respective tables in which such field names occur. According to some embodiments, such multiple-occurring field names may be inferred to be keys that establish relationships between different tables. In some embodiments, keys may be autogenerated by the method 300 (e.g., the GDP application). Data values with different fields may be compared, for example, to identify similar data types and/or formats and/or recurring data values. In such cases, despite the source data fields not necessarily having identical field names, one or more relationships may be inferred based on the similarities between the stored data values.

According to some embodiments, the method 300 (and/or the schema derivation module or process 308) may comprise determining (e.g., by the electronic processing device) whether a schema already exists, at 308-5. In response to the receiving of the command to initiate the data load, in response to receiving the input defining the data source, and/or in response to the processing at any or all of 308-1, 308-2, 308-3, and/or 308-4, for example, the electronic processing device may compare command and/or input values to stored values to determine whether a GDP application process has previously been executed for the particular data source, type, format, etc. In the case that no stored data is located that matches the user input, the method 300 may conclude that a schema for the requested GDP application process has not already been created and may proceed to create schema definition files, at 308-6.

In some embodiments for example, the method 300 (and/or the schema derivation module or process at 308) may comprise creating (e.g., by the electronic processing device) schema definition files, at 308-6. The results of any or all of the extracting at 308-1, the grouping at 308-2, the generating at 308-3, and/or the identifying at 308-4 may, for example, be recorded in one or more files (e.g., for use as inputs into one or more subsequent processes and/or modules). According to some embodiments, files that are generated may include, but are not limited to: (i) a version file, (ii) a control file, (iii) a tables file, (iv) one or more XML Path ("XPath") data files, (v) a keys file, and/or (vi) a format file. Any or all of these definition files may store various data elements descriptive of the schema (e.g., tables, fields, keys, and relationships) designed automatically from the source data. Examples of such schema definition data may include, but are not limited to, table names/identifiers, field names/identifiers, key names/identifiers, table XPath data, and field XPath data. In some embodiments, four (4) schema definition files may be created: (1) a first file (e.g., "base_dict.txt") that stores table XPath data and table names, (2) a second file (e.g., "base_element.conf") that stores table XPath data and key data for each key in each table, (3) a third file (e.g., "keys.txt") that stores a listing of keys (identified from the data source and/or autogenerated) for all tables, and/or (4) a fourth file (e.g., "record_format.txt") that stores table XPath data, field names, and field XPath data.

According to some embodiments, the method 300 (and/or the schema derivation module or process 308) may comprise generating (e.g., by the electronic processing device) table create statements, at 308-7. One or more table create statements comprising properly coded command strings written in accordance with a particular code syntax for a particular coding language may, for example, be automatically generated based on one or more of the schema definition (e.g., configuration) files. In such a manner, the code required to create instances of the tables, fields, and keys that comprise the designed schema may be automatically prepared without coding input from an end-user. According to some embodiments, the statements and/or scripts may be mapped to various parameters (e.g., names and/or paths) within the schema definition/configuration file(s). According to some embodiments, an example of a table create statement or script may include, but is not limited to Script #2, as follows:

```
(2) python gdp_gen_table.py\
    run Typ<c-, r-, d->\
    conName<Container name>\
    srcName<Source name>\
    dbName<Database to create tables>\
    tlbPath<output directory>\
    tblPfx<Table prefix>\
    cncTyp<Connection type>\
    src Type<Type of tables>
``` where run type parameters may include "c-" to indicate/request table creation, "r-" to indicate/request table repair, and/or "d-" to indicate/request table drop partition. In the example script the "<Container name>" may indicate the desired and/or current container, the "<Source name>" may identify the data source, the "<Database to create tables>" may identify a data target (such as a particular database), and/or the "<output directory>" may identify a target Hadoop Distributed File System (HDFS) directory for the parsed data. According to some embodiments, the "<Table prefix>" may identify a desired or current table prefix, the "<Connection type>" may identify a desired and/or current connection type, such as Beeline or Hive interfaces, and/or the "<Type of tables>" may identify the desired and/or current table type, e.g., as residing in the base layer or in the client layer.

In some embodiments, the method 300 (and/or the schema derivation module or process 308) may comprise storing (e.g., by the electronic processing device) the table create statements in a file, at 308-8. The schema derivation module or process 308 may end, for example, by storing the autogenerated table creation scripts/statements for later use. According to some embodiments, the schema derivation module or process 308 may only be executed or called in the case that either a new data source is requested for processing or changes to a previously processed data source are identified and the schema requires updating. The schema generation module or process 308 may be executed based on a call, command, and/or input received from a suspense analysis process that identifies schema changes and calls for updates to be made (e.g., an append mode), e.g., the suspense analysis method 700 of FIG. 7 herein.

According to some embodiments, the method 300 (and/or the schema derivation module or process 308) may proceed to "A", e.g., after completion of the storing at 308-8 and/or in response to a positive determination at 308-5. In the case that stored data exists and matches the user input, the method 300 may conclude that a schema already exists and may proceed to from the determining at 308-5 to a schema append module or process 310. In some embodiments, the method 300 (and/or the schema append module or process 310) may comprise, for example, appending schema definition files at 310-1, generating table append statements at 310-2, and/or storing table append statements in a file at 310-3. According to some embodiments, the appending, generating, and/or storing at 310-1, 310-2, 310-3 may be similar to the creating, generating, and/or storing at 308-6, 308-7, 308-8, except instead of creating schema definition files and/or parameters for a first time, such files and/or parameters may be edited, updated, and/or appended (e.g., to reflect any changes processed through from the source data). According to some embodiments, once the storing at 310-3 is complete, the method 300 (and/or the schema append module or process 310) may proceed to "A".

From "A", for example (and with reference to FIG. 3B), the method 300 may comprise a base layer creation module or process, at 312. The base layer creation module or process 312 may, for example, comprise various steps, processes, and/or procedures directed to transforming the unstructured and/or semi-structured data at the data source into a format that may be utilized to build the end-user or client tables that will permit the end-user to readily access the transformed data. In some embodiments, the base layer creation module or process 312 may automatically generate and/or create various scripts, calls, commands, and/or other code that can be utilized by the end-user without the end-user needing to have expertise in understanding the particular coding language utilized. In such a manner, for example, unstructured and/or semi-structured data may be made available to end-users in a code-less manner. In some embodiments, the method 300 (and/or the base layer creation module or process 312) may comprise a map process at 314 and/or a write process at 316.

In some embodiments, the method 300, the base layer creation module or process 312, and/or the map process 314 may comprise extracting (e.g., by the electronic processing device) a listing of fields and values, at 314-1. The source data may be accessed, for example, and each record, line, snippet, and/or other portion of data in the source may be identified and extracted. According to some embodiments, any data and/or attributes stored in the source data for each record may be extracted. Each record may comprise, for example, one or more fields, values, and/or attributes that are read from the data source and, e.g., loaded into memory.

According to some embodiments, the method 300, the base layer creation module or process 312, and/or the map process 314 may comprise comparing (e.g., by the electronic processing device) the fields and values with the schema files, at 314-2. Any or all fields, values, and/or attributes extracted for each record of the source data may, for example, be compared to the schema definition files to identify matches. In some embodiments, the method 300, the base layer creation module or process 312, and/or the map process 314 may comprise determining (e.g., by the electronic processing device) whether a particular record is a bad record, at 314-3. The comparison of any given record to the stored schema data and/or to one or more stored data rules may, for example, yield an identification of a record that does not comply with acceptable format, structure, size, data type, etc. In such a case, the record may be tagged and/or sorted as a "bad" or "malformed" record and the method 300 (and/or the base layer creation module or process 312 and/or the map process 314) may proceed to load (e.g., by the electronic processing device) the record (e.g., fields, values, and/or attributes) into a malformed record store, at 314-4.

In the case that it is determined that a given record is not bad, the method 300, the base layer creation module or process 312, and/or the map process 314 may proceed to determining (e.g., by the electronic processing device) whether there is a new field, at 314-5. While the record itself may be properly formed and/or contain appropriate data, for example, the record may comprise a field that is not present and/or not defined by the schema definition files. Such a case may occur when the method 300, the base layer creation module or process 312, and/or the map process 314 has previously been executed with respect to a particular data source and the current execution occurs after a new field has been added to the data source. Accordingly, the determination at 314-5 (e.g., based on the comparison at 314-2) may enable the GDP application to identify new fields in unstructured and/or semi-structured data sources that have previously been processed. In such a manner, for example, the method 300 may be capable of repetitive runs utilizing the same unstructured and/or semi-structured data source, thereby permitting ongoing end-user availability processing for even changing unstructured and/or semi-structured data sources (e.g., not just one-time loads of legacy unstructured and/or semi-structured data sources).

In the case that it is determined that there is a new field, the method 300, the base layer creation module or process 312, and/or the map process 314 may proceed by loading (e.g., by the electronic processing device) the record with the new field into a suspended record store, at 314-6. The record may be flagged, identified, and/or sequestered as a "suspended" record, for example, so that it may be separately processed without disrupting the processing of other records. According to some embodiments, the method 300, the base layer creation module or process 312, and/or the map process 314 may proceed to conduct a suspended record analysis, at "SA" (an example of which is described in detail with respect to the method 700 of FIG. 7 herein). The SA process may, for example, comprise a portion of the method 300 or a separate process that is utilized to update the schema to include the newly identified field, or to reject the new field and load the remainder of the record into the target tables, as is desired.

In the case that it is determined that there are no new fields, the method 300, the base layer creation module or process 312, and/or the map process 314 may comprise mapping (e.g., by the electronic processing device) fields and values to base layer tables, at 314-7. In the case that a processed record is determined not to be malformed or to contain a new field, for example, the record may be tagged, identified, and/or considered "valid" and may be mapped to the tables and fields of the schema designed for the data source. According to some embodiments, the data for each field of the record may be mapped to a corresponding field and table in the base layer. In some embodiments, the data may comprise field values and/or attributes, such as sequence numbers.

In some embodiments, the method 300, the base layer creation module or process 312, and/or the map process 314 may comprise storing (e.g., by the electronic processing device) mapping data, at 314-8. The mapping of each field for each record to respective base layer tables and fields may, for example, be stored as a file in a specific data partition (e.g., in a data target), e.g., for a specific partition date. According to some embodiments, the mapping data may be stored as one or more delimited files and may comprise output from the map process 314. In some embodiments, an example of a script directed to executing the map process 314 may comprise, but is not limited to Script #3, as follows:

(3) spark-submit \
    master yarn \
    deploy-mode cluster \
    num-executors 50 \
    driver-memory 5G \
    executor-memory 4G \
    queue pi_s \
    conf spark.driver.maxResultSize=2048
    conf spark.driver.memoryOverhead=4096 \
    conf spark.executor.memoryOverhead=4096 \
    executor-cores 8 \
    py-files
    sandbox/public/python/gdp_com_fun.py, sandbox/public/python/gdp_gen_logger.pyl
    files
    sandbox/container/config/source_app/base/version/current/schema_dict.conf #s chema_dict.conf,
    sandbox/container/config/sourse_app/base/version/current/tables_path.conf #t ables_path.conf,
    sandbox/container/config/source_app/base/version/current/tables_key.conf #ta bles_key.conf,
    sandbox/container/config/source_app/base/version/current/tables_dict.conf #ta bles_dict.conf,
    sandbox/container/config/source_app/base/version/current/orc_list.conf #orc_lis t.conf,
    sandbox/container/config/source_app/base/version/current/gdp_json_map.conf #gdp_json_map.conf,
    sandbox/container/config/source_app/base/version/current/gdp_json_write.con f #gdp_json_write.conf \
    sandbox/public/python/gdp_json_map.py \
    input inputHDFSfile \
    output outputHDFSfolder \
    schLoc LocationOfSchema \
    cycDte<partition_date>\
    runMde cluster \
    curVer current where the code elements that are underlined may comprise parameters (e.g., Spark parameters) that are dynamically adjusted or edited based on parameters descriptive of the data source, and where the bolded code elements may comprise elements and/or parameters established based on the particular data source and/or file being mapped.

According to some embodiments, the "<py-files>" may identify and/or invoke any custom Python scripts utilized by the main script, the "<--files>" may provide a list of schema files and other configuration files, and/or the "<inputHDFS-file>" may identify the input file (e.g., from the HDFS) that is to be parsed. In some embodiments, in the case that a folder is specified, all the files in the input directory may be automatically loaded by the script. According to some embodiments, the "<LocationOfSchema>" may identify the same location where the schema configuration files are generated, the "<partition_date>" may identify a partition date present in the input file, the "<current>" may identify the schema version where the schema files are present (by default it may be set to current), and/or the "<outputHDFS-folder>" may identify the output directory for the GDP application map process 314.

In some embodiments, the output of the map process 314 may comprise a plurality of files such as, in the case of an example of a mapping of a JSON file, (i) an invalid, bad, and/or malformed JSON records file, e.g., "outputHDFS-folder/temp/<partition_date>/key=json_malf", (ii) a suspended JSON records file "outputHDFSfolder/temp/<partition_date>/key=json_susp", and/or (iii) a mapping data/valid records file "outputHDFSfolder/temp/<partition_date>/key=<table>".

According to some embodiments, the method 300, the base layer creation module or process 312, and/or the map process 314 may proceed to conduct the write process 316 (e.g., upon completion of the map process 314 and/or the storing of the mapping data thereof, at 314-8). The write process 316 may, for example, utilize the output (e.g., the stored mapping data from 314-8) from the map process 314 to load data into base layer folders (which may then, for example, be utilized to point to and/or populate the base layer tables).

In some embodiments, the method 300, the base layer creation module or process 312, and/or the write process 316 may comprise extracting (e.g., by the electronic processing device) base layer table data from the mapping data, at 316-1. The write process 316 may, for example, utilize the stored mapping data and/or the schema definition files to extract and/or load the mapping of each source data field to each respective base table path. According to some embodiments, the write process 316 may be conducted serially or in parallel. In the case that the source data comprises a large number of tables (e.g., more than a predetermined threshold number or more than a user-defined number; e.g., a parallel data load table group size parameter), for example, the write process 316 may be conducted in a parallel mode to reduce the time required to load data into all the tables.

According to some embodiments, the method 300, the base layer creation module or process 312, and/or the write process 316 may comprise generating (e.g., by the electronic processing device) base layer table groups, at 316-2. In the case that the parallel mode is utilized, for example, groupings of tables may be identified for simultaneous load processes. Members of any table grouping may be selected, in some embodiments, based on attributes of the tables, such as size, number of fields, keys, and/or relationships (e.g., either existing or not existing between selected tables).

In some embodiments, the method 300, the base layer creation module or process 312, and/or the write process 316 may comprise writing (e.g., by the electronic processing device) data into the base layer tables, at 316-3. Whether in parallel mode and accomplished in parallel load sets based on the table grouping or whether serially, for example, any or all source data may be loaded (e.g., for any or all valid records) into their respective fields in their respective base layer tables. In some embodiments, an example of a script directed to executing the write process 316 may comprise, but is not limited to Script #4, as follows:

(4) sh sandbox/public/bin/gdp_gen_write.sh \
   <Spark Master type>
   <Deploy mode>\
   <num-executors><driver-memory><executor-memory><queue name><executor-cores>
   sandbox/pub/python/gdp_com_fun.py,sandbox/public/python/gdp_gen_logger.py \ sandbox/container/config/source_app/base/version/current/schema_dict-.conf #schema dict.conf,sandbox/container/config/source_app/base/version/current/tables_path.conf #tables_path.conf,sandbox/container/config/source_app/base/version/current/tables_key. conf #tables_key.conf,sandbox/container/config/source_app/base/version/current/tables dict.conf #tables_dict.conf, sandbox/container/config/source_app/base/version/current/orc_list.conf #orc_list-.conf,sandbox/container/config/source_app/base/version/current/g dp_json_map.conf #gdp_json_map.conf,sandbox/container/config/source_app/base/vers ion/current/gdp_json_write.conf #gdp_json_write.conf \
   <Standard wait time><Tables Group Size>\
   <inputHDFSfolder>\
   <outputHDFSfolder>\
   <source>\
   <datatype>\
   <partition_date> where the code elements that are underlined may comprise parameters (e.g., Spark parameters) that are dynamically adjusted or edited based on parameters descriptive of the data source, and where the bolded code elements may comprise elements and/or parameters established based on the particular data source and/or file being mapped.

According to some embodiments, the "<Tables Group Size>" may indicate the number of tables to be present in each table group (e.g., ten (10) tables as a default and/or generated from the listing of base tables), the "<Standard wait time>" may indicate the time interval or the wait time between the population of each table group, the "<inputHDFSfolder>" may identify the output path of the map process 314 (e.g., a temp location), the "<outputHDFS-folder>" may indicate the base path, which contains sub folders for base tables, the "<source>" may indicate the source name for the application, the "<datatype>" may indicate the source data type (e.g., XML, JSON, COBOL Copybook, etc.), and/or the "<partition_date>" may comprise an identifier of the cycle date for the input data.

According to some embodiments, the method 300 (and/or the base layer creation module or process 312 and/or the write process 316 thereof) may proceed to "B", e.g., after completion of the writing at 316-3. From "B", for example (and with reference to FIG. 3C), the method 300 may comprise a client layer creation module or process, at 318. The client layer creation module or process 318 may, for example, comprise various steps, processes, and/or procedures directed to providing the data from the unstructured and/or semi-structured data source in one or more normalized and/or relational data tables (e.g., in an SSL or client layer). In some embodiments, the client layer creation module or process 318 may automatically generate and/or create various scripts, calls, commands, and/or other code that can be utilized by the end-user without the end-user needing to have expertise in understanding the particular coding language utilized. In such a manner, for example, unstructured and/or semi-structured data may be made available to end-users in a code-less manner.

In some embodiments, the method 300 (and/or the client layer creation module or process 318) may comprise capturing (e.g., by the electronic processing device) client requirements from a mapping sheet, at 318-1. Various business-end or end-user/consumer client parameters, such as table joins, data operations, and/or filters may, for example, be stored in a mapping sheet accessible to the method 300. According to some embodiments, the mapping sheet may be provided by the end-user, and therefore, may comprise input from the end-user. In some embodiments, the mapping sheet may be created and/or populated by a different user, such as a user executing and/or managing the execution of the method 300. The capturing of the client requirements may be conducted in advance of an execution of the method 300 or at runtime. In some embodiments, the captured requirements may be utilized to create and/or store a configuration file for the client layer creation process 318. In some embodiments, an example of a script (e.g., a generic script) directed to creating the configuration file from the mapping sheet may comprise, but is not limited to Script #5, as follows:

(5) python gdp_ssl_code.py--runTyp conf \
    conName pi_container_proj \
    scrName source_application \
    inpFile Claim_ssl_mapping_sheet.xlsx where the code elements that are underlined may comprise parameters (e.g., Spark parameters) that are dynamically adjusted or edited based on the format and/or structure of the mapping sheet utilized, and where the bolded code elements may comprise elements and/or parameters established based on the particular data source and/or file being mapped.

According to some embodiments, the "<runTyp>" may specify specific functionality of the generic script (e.g., in the case it is desired to create the configuration file "conf" is indicated by this parameter) and/or the "<inpFile>" may identify the mapping sheet from which any or all configuration files may be generated.

According to some embodiments, the method 300 (and/or the client layer creation module or process 318) may comprise reading (e.g., by the electronic processing device) client requirements from the configuration file, at 318-2. In the case that the requirements are not captured at runtime, for example, the configuration file may be read to acquire the client requirements. An example of a mapping sheet from which the configuration file and/or requirements are identified is described in more detail with respect to the example data storage structure 640 of FIG. 6 herein.

In some embodiments, the method 300 (and/or the client layer creation module or process 318) may comprise auto-generating (e.g., by the electronic processing device) table creation scripts, at 318-3. According to some embodiments, the same generic code utilized to create the configuration file(s) may be utilized to generate the table creation code (e.g., PySpark code). The "<runTyp>" parameter of Script #5 may be set to "code", for example, in the case that the generation of the table creation script(s) is desired. In some embodiments, the configuration file and the table creation code/scripts may be generated by the same process and/or at the same time—e.g., a single pass of a coded procedure. The client layer creation module or process 318 may automatically execute such processing and/or may automatically select the parameter values needed to effectuate the execution and/or parameter values and/or other input may be provided by a user.

According to some embodiments for example, the method 300 (and/or the client layer creation module or process 318) may comprise providing (e.g., by the electronic processing device) a second UI, at 318-4. The second UI may, for example, provide an interface via which a user may manage the client/SSL layer table creation process 318. In some embodiments, the second UI may provide a listing of all client/SSL layer tables that are identified and/or defined based on the corresponding mapping sheet. According to some embodiments, the second UI may provide a menu option that permits a user to select which client/SSL layer tables to have table creation code generated for. In such a manner, for example, a user of the second UI may selectively choose which client/SSL layer tables are desired for automatic code generation. According to some embodiments, user-selected menu options may trigger the receipt of user input by the method 300.

In some embodiments, the method 300 (and/or the client layer creation module or process 318) may comprise loading (e.g., by the electronic processing device) data into the client layer, at 318-5. Data from the source may be loaded into the target data storage system for each table in the base layer, for example, or for each base layer table selected for loading. In some embodiments, an example of a script (e.g., a generic script) directed to loading the source data into the target file system (e.g., a HDFS) may comprise, but is not limited to Script #6, as follows:

(6) spark-submit--master yarn-deploy-mode client--queue
    pi_I--packages com.databricks: spark-avro_2.10:1.0.0,
    org.apache.avro:avro-mapred: 1.6.3/data01/home/
    sandbox/bin/source_application/claim_ssl.py \
    input/lob/pi/system/pi_contianer_publ/int/base_
        source_application \
    output/lob/pi/project/source/system/gdp_demo/sub-
        ject/ssl_table name \
    version hdp_cyc_dt=2019 Apr. 10 where the code elements that are underlined may comprise parameters (e.g., Spark parameters) that are dynamically adjusted or edited based on the particular data source and/or file being transformed.

According to some embodiments, the "<input>" may specify the file location for the base layer, the "<output>" may specify the file location for the client/SSL layer, and/or the "<version>" may identify the logical partition for the GDP application.

According to some embodiments, the method 300 (and/or the client layer creation module or process 318) may comprise creating (e.g., by the electronic processing device) client layer tables, at 318-6. Once the data has been loaded into the target file system, for example, the end-user tables may be created, allowing an end-user simple structured query tool access to the transformed data. Based on the user-selected menu item(s) from the second UI, in some embodiments, the selected client/SSL layer tables may be created utilizing the autogenerated code. According to some embodiments, all tables identified by the mapping sheet being processed may be automatically created (e.g., without user input via the second UI and/or without utilization of the second UI). In some embodiments, if either table creation code or a table already exists at the target destination, the method 300 and/or the client layer creation module or process 318 may prompt the user for verification to overwrite the existing code and/or table. In some embodiments, an example of a script (e.g., a generic script) directed to building the client/SSL tables may comprise, but is not limited to Script #7, as follows:

(7) python gdp_gen_table.py --runTyp c/
   conName pi_container_proj/
   srcName source_application/
   dbName pi_source_application_ssl/
   tlbPath/lob/pi_source_application_publ/ssl/
   tblPfx source_application/
   cncTyp bline/
   srcType ssl where the code elements that are underlined may comprise parameters (e.g., Spark parameters) that are dynamically adjusted or edited based on the particular data source and/or file being transformed.

According to some embodiments, the "<conName>" may indicate the current and/or desired container name, the "<srcName>" may identify the name of the data source, the "<tlbPath>" may identify the target data storage location for the client/SSL layer (e.g., where the data is loaded at 318-5), the "<confpath>" may identify the configuration location path (e.g., where the configuration file is stored at 318-1, the "<dbName>" may identify the database name in which the client/SSL tables will be generated, and/or the "<tblPfx>" may identify any prefix that is desired to be added to the client/SSL layer table names.

Figure 8:
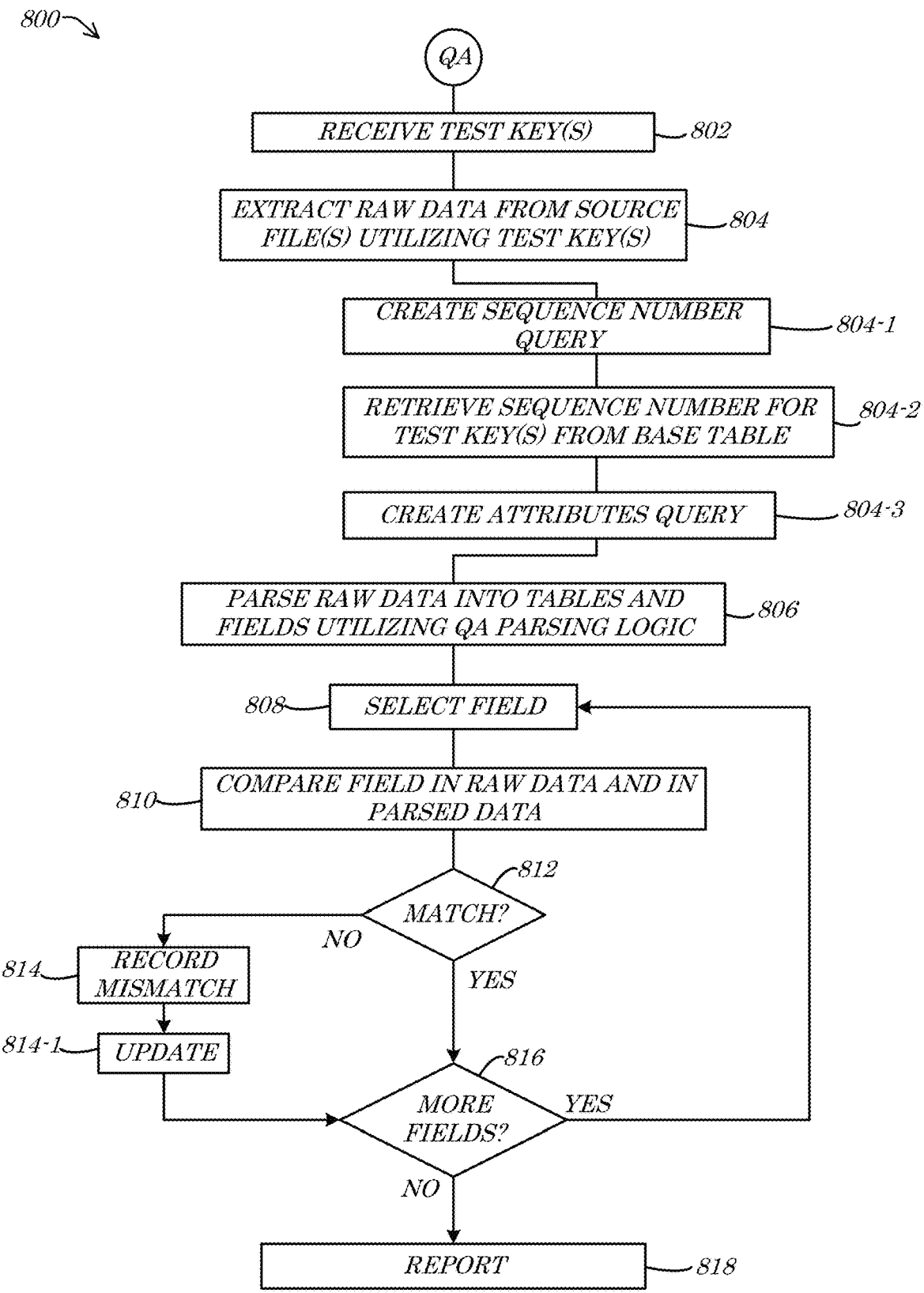
FIG. 8 is a flow diagram of a method according to some embodiments.

According to some embodiments, the method 300 and/or the client layer creation module or process 318 may proceed to conduct quality assurance, at "QA" (an example of which is described in detail with respect to the method 800 of FIG. 8 herein). In some embodiments, the method 300 and/or the client layer creation module or process 318 may proceed to provide client utilization, at 320. Once the client/SSL layer tables have been created, for example, an end-user/client may be enabled to access the transformed data through the client/SSL layer tables. In some embodiments, the end-user may utilize a standardized and/or structured query tool (such as SQL) to run a query against one or more of the client/SSL layer tables, at 320-1. According to some embodiments, a system that executes the method 300 may receive a query request from the end-user and may process the request by utilizing the client/SSL layer tables to access the transformed data from the unstructured and/or semi-structured data source(s). In some embodiments, the utilization at 320 may comprise and/or be facilitated by various interfaces, graphs, charts, tables, and/or other data visualization elements provided based on and/or representing the transformed data.

While various UI instances, scripts, code, parameters, and/or values are described with respect to the execution of the method 300, fewer or more of such elements and/or objects may be utilized to execute the method 300 and/or portions thereof. The method 300 may run entirely autonomously, for example, without input from a user. According to some embodiments, the example scripts may be representative of scripts generated and/or executed by the method 300, but not observed and/or interacted with by any users. In some embodiments, a user may cause the generation and/or execution of one or more of the scripts by interfacing with one or more UI elements, such as a "run" button or the like—e.g., without knowledge or required understanding of the underlying code executed by selecting a UI element.

IV. Generic Data Parsing Application Interfaces

Turning now to FIG. 4A, FIG. 4B, FIG. 4C, FIG. 4D, FIG. 4E, FIG. 4F, and FIG. 4G, diagrams of a system 400 depicting a user device 402 providing instances of an example interface 420a-g according to some embodiments, are shown. In some embodiments, the interface 420a-g may comprise a web page, web form, database entry form, API, spreadsheet, table, and/or application or other GUI by which a user or other entity may enter data (e.g., provide or define input) to enable transformation of unstructured and/or semi-structured data into one or more normalized and/or relational data tables, as described herein. The interface 420a-g may, for example, comprise a front-end of a GDP application program and/or platform programmed and/or otherwise configured to execute, conduct, and/or facilitate the methods 300, 700, 800 of FIG. 3A, FIG. 3B, FIG. 3C, FIG. 7, and/or FIG. 8 herein, and/or portions or combinations thereof. In some embodiments, the interface 420a-g may be output via a computerized device, such as the user device 402, which may for example, be similar in configuration to one or more of the user devices 102a-n, 202a-b and/or the controller device 110, 210, of FIG. 1 and/or FIG. 2 herein.

Figure 4A:
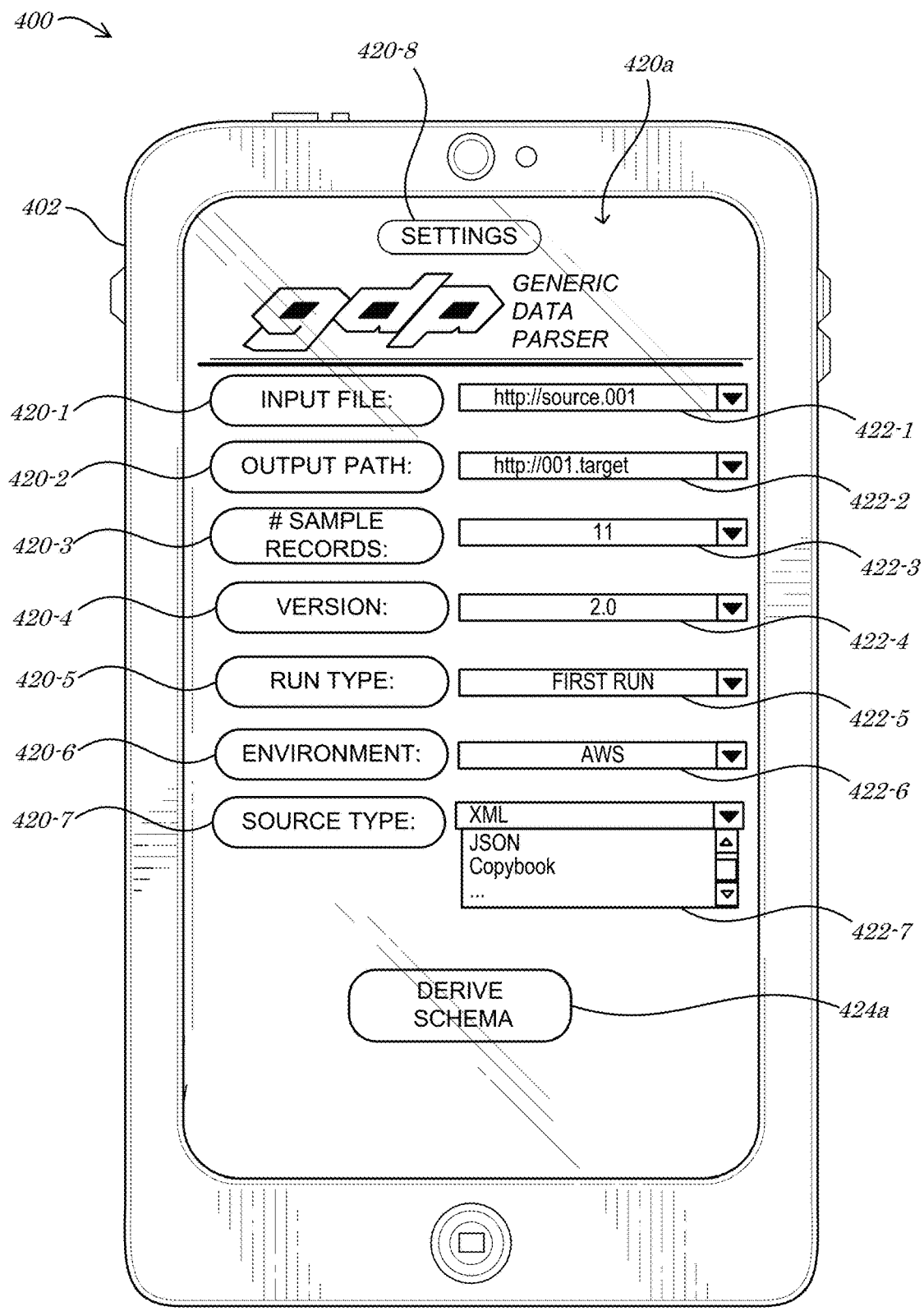
FIG. 4A, FIG. 4B, FIG. 4C, FIG. 4D, FIG. 4E, FIG. 4F, and FIG. 4G are diagrams of a system depicting a user device providing instances of an example interface according to some embodiments.

According to some embodiments, the interface 420a-g may comprise one or more tabs and/or other segmented and/or logically-presented data forms and/or fields. In some embodiments, the interface 420a-g may be configured and/or organized to allow and/or facilitate entry and/or acquisition of information regarding an unstructured and/or semi-structured data source and/or the desired transformation thereof (e.g., via a GDP application). According to some embodiments, the interface 420a-g may comprise a first page from which a user may select one or more options that initiate specific functionality of a mobile device (or other computerized) application executed by the user device 402. As depicted in FIG. 4A, for example, a first version (or page or instance) of the interface 420a may comprise an initiation interface (e.g., defining a first input and/or output mechanism) by providing an area (e.g., one or more data input and/or output mechanisms, tools, objects, and/or features) that comprises (i) an "input file" object 420-1, (ii) an "output path" object 420-2, (iii) a "#sample records" object 420-3, (iv) a "version" object 420-4, (v) a "run type" object 420-5, (vi) an "environment" object 420-6, (vii) a "source" object 420-7, and/or (viii) a "settings" button 420-8. According to some embodiments, the first version of the interface 420a may also or alternatively comprise an area (e.g., one or more data entry mechanisms, tools, objects, and/or features) that provides for selection/activation of (i) an "input file" input feature 422-1, (ii) an "output path" input feature 422-2, (iii) a "#sample records" input feature 422-3, (iv) a "version" input feature 422-4, (v) a "run type" input feature 422-5, (vi) an "environment" input feature 422-6, and/or (vii) a "source type" input feature 422-7.

In some embodiments, the first version (or page or instance) of the interface 420a may be utilized to initiate GDP application functionality (and/or initiation of a first module thereof). Any or all of the various objects 420-1, 420-2, 420-3, 420-4, 420-5, 420-6, 420-7, 420-8 may, for example, comprise prompts that direct a user (not shown) of the user device 402 to provide input via the respective input features 422-1, 422-2, 422-3, 422-4, 422-5, 422-6, 422-7. According to some embodiments, the input file object 420-1 may direct the user to enter (e.g., select and/or define) data via the input file input feature 422-1 for example, that when actuated or selected by the user, initiates a sub-routine that provides a drop-down menu populated with available (and/or previous) input file source locations and/or identifiers. The user may alternatively enter a new value defining a location of an unstructured and/or semi-structured data source. In some embodiments, the output path object 420-2 may direct the user to enter (e.g., select and/or define) data via the output path input feature 422-2 for example, that when actuated or selected by the user, initiates a sub-routine that provides a drop-down menu populated with available (and/or previous) output path locations and/or identifiers. The user may alternatively enter a new value defining a location for the creation of a GDP application base layer and/or client/SSL layer.

According to some embodiments, the #sample records object 420-3 may direct the user to enter (e.g., select and/or define) data via the #sample records input feature 422-3 for example, that when actuated or selected by the user, initiates a sub-routine that provides a drop-down menu populated with available (and/or previous) #sample records values. The user may alternatively enter a new value defining any desired number of sample records for the GDP application process. In some embodiments, the version object 420-4 may direct the user to enter (e.g., select and/or define) data via the version input feature 422-4 for example, that when actuated or selected by the user, initiates a sub-routine that provides a drop-down menu populated with available (and/or previous) versions of the GDP application, GDP application parsing logic, etc. The user may alternatively enter a new value defining any version number (e.g., that is available) desired for execution. According to some embodiments, the run type object 420-5 may direct the user to enter (e.g., select and/or define) data via the run type input feature 422-5 for example, that when actuated or selected by the user, initiates a sub-routine that provides a drop-down menu populated with available (and/or previous) run type values (e.g., "first run" or "append"). The user may alternatively enter a new value defining any desired run type (e.g., that is available). In some embodiments, the environment object 420-6 may direct the user to enter (e.g., select and/or define) data via the environment input feature 422-6 for example, that when actuated or selected by the user, initiates a sub-routine that provides a drop-down menu populated with available (and/or previous) environment values (e.g., "AWS"). The user may alternatively enter a new value defining any desired environment (e.g., that is available). According to some embodiments, the source type object 420-7 may direct the user to enter (e.g., select and/or define) data via the source type input feature 422-7 for example, that when actuated or selected by the user, initiates a sub-routine that provides a drop-down menu populated with available (and/or previous) source type values (e.g., "XML", "JSON", "Copybook", or " . . . ", for others). The user may alternatively enter a new value defining any desired source type (e.g., that is available).

The settings button 420-8 may, when actuated or selected by the user, for example, permit definition and/or editing of values that govern various settings and/or preferences, such as processing speed, processing times (e.g., a schedule), processing type (e.g., serial or parallel), and/or various GDP application rules definitions. Rules definitions may comprise, for example, definitions for one or more rules that govern (i) data field identification settings (e.g., keyword threshold settings), (ii) data traversal strategy (e.g., sorting, filtering, and/or analysis progression algorithms), and/or (iii) user preferences, credentials, account, and/or access settings.

In some embodiments, the first version of the interface 420a may comprise a derive schema button 424a that when actuated or selected by the user initiates a sub-routine that triggers and/or initiates a schema derivation module and/or routine of the GDP application. Such a module or routine may, for example, parse and/or analyze the data source to identify tables, fields, and/or keys thereof and may define (or design) a schema representative of the unstructured and/or semi-structured data source. In some embodiments, the GDP application may cause the first version of the interface 420a to display other or additional user-selectable menu choices (not shown). The user-selectable menu choices displayed by the GDP application may be part of a library of user-selectable objects. In some embodiments, the library of user-selectable objects includes other user-selectable objects that are selectively included for display based on their determined relevance (e.g., based on pre-stored data associations) to the user, the user device 402, the identified data source, the identified data output path, etc.

According to some embodiments, a selection of the generate derive button 424a may trigger a call to and/or otherwise cause a provision, generation, and/or outputting of a second version of the interface 420b (and/or the second version of the interface 420b may be automatically provided upon identification of a different triggering event, such as user entry of any or all required input values).

Figure 4B:
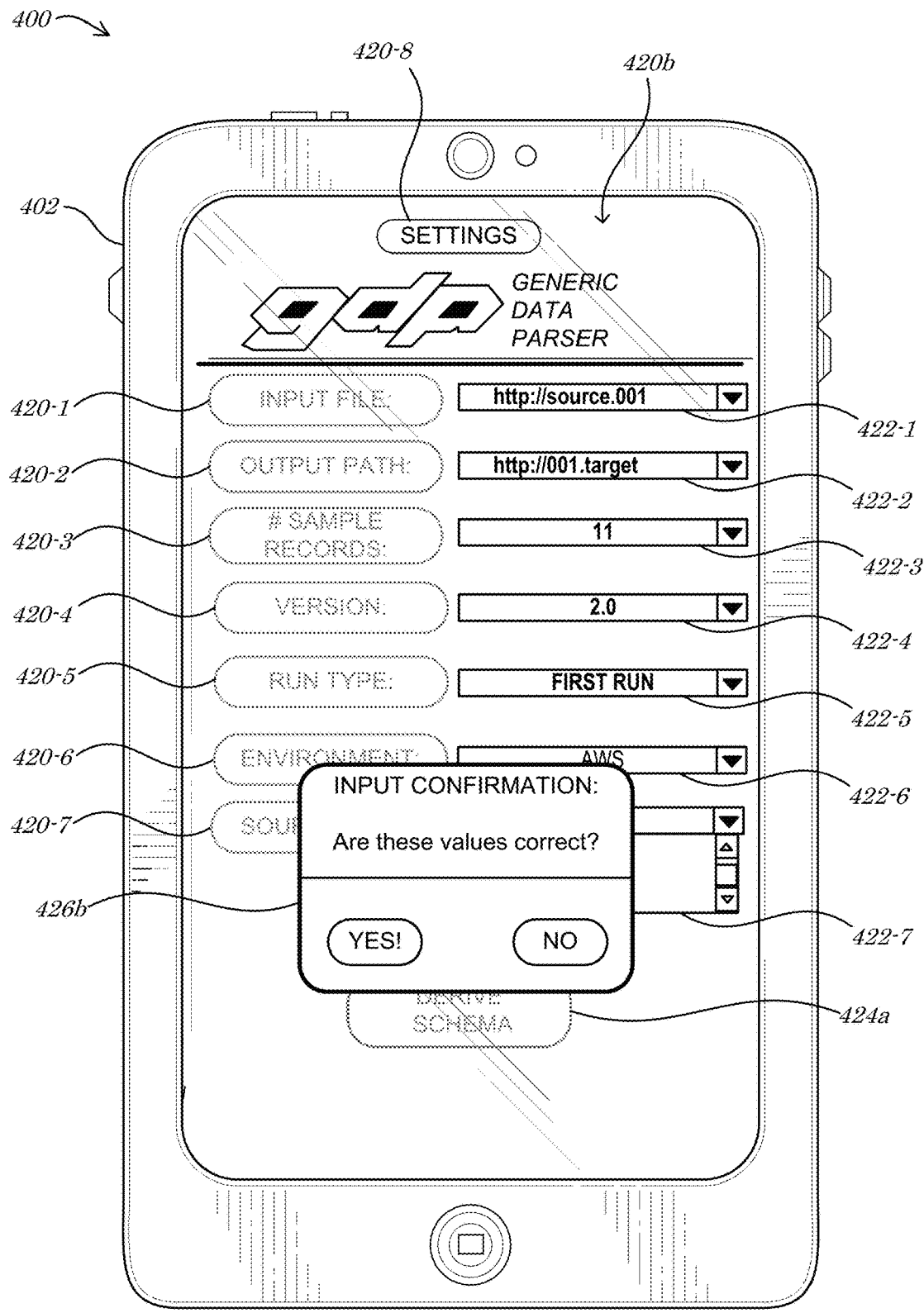

Referring to FIG. 4B for example, the second version (or page or instance) of the interface 420b may comprise an input confirmation interface (e.g., defining a second input and/or output mechanism) by providing an input data verification prompt 426b. The second version (or page or instance) of the interface 420b may be utilized, for example, upon user entry of one or more values in any or all of the input features 422-1, 422-2, 422-3, 422-4, 422-5, 422-6, 422-7. In some embodiments, the input data verification prompt 426b may request confirmation from the user regarding whether or not the input values are correct—e.g., a request for the user to verify that any or all entered input data is as desired for processing of the GDP application. In some embodiments, any entered/selected/defined input data may be highlighted (e.g., as indicated by the bold outlines of the input features 422-1, 422-2, 422-3, 422-4, 422-5 in FIG. 4B) to draw the user's attention to the values in question. According to some embodiments, the input data verification prompt 426b may comprise response/input options, such as the depicted "yes" and "no" options that a user may activate to provide feedback regarding the verification of the input data. In some embodiments, such as in the case that the user does not select one of the options within a predetermined amount of time (e.g., one minute), the data may automatically be assumed to be correct. The time-out threshold and/or default actions to be taken in the case no response is received may, in some embodiments, be defined via the settings button 420-8.

According to some embodiments, the input data verification prompt 426b of the second version of the interface 420b may, upon a triggering and/or receipt of input from the user (e.g., a properly-positioned click of a mouse or other pointer) with respect to the "no" option, re-instate the first version of the interface 420a and/or otherwise provide an opportunity for the user to edit the entered input values. In some embodiments, the input data verification prompt 426b of the second version of the interface 420b may, upon a triggering and/or receipt of input from the user (e.g., a properly-positioned click of a mouse or other pointer) with respect to the "yes" option, initiate a sub-routine that triggers an execution of the schema derivation module and/or process and/or may trigger a call to and/or otherwise cause a provision, generation, and/or outputting of a third version of the interface 420c (and/or the third version of the interface 420c may be automatically provided upon identification of a different triggering event, such as completion of the schema generation module and/or process).

Figure 4C:
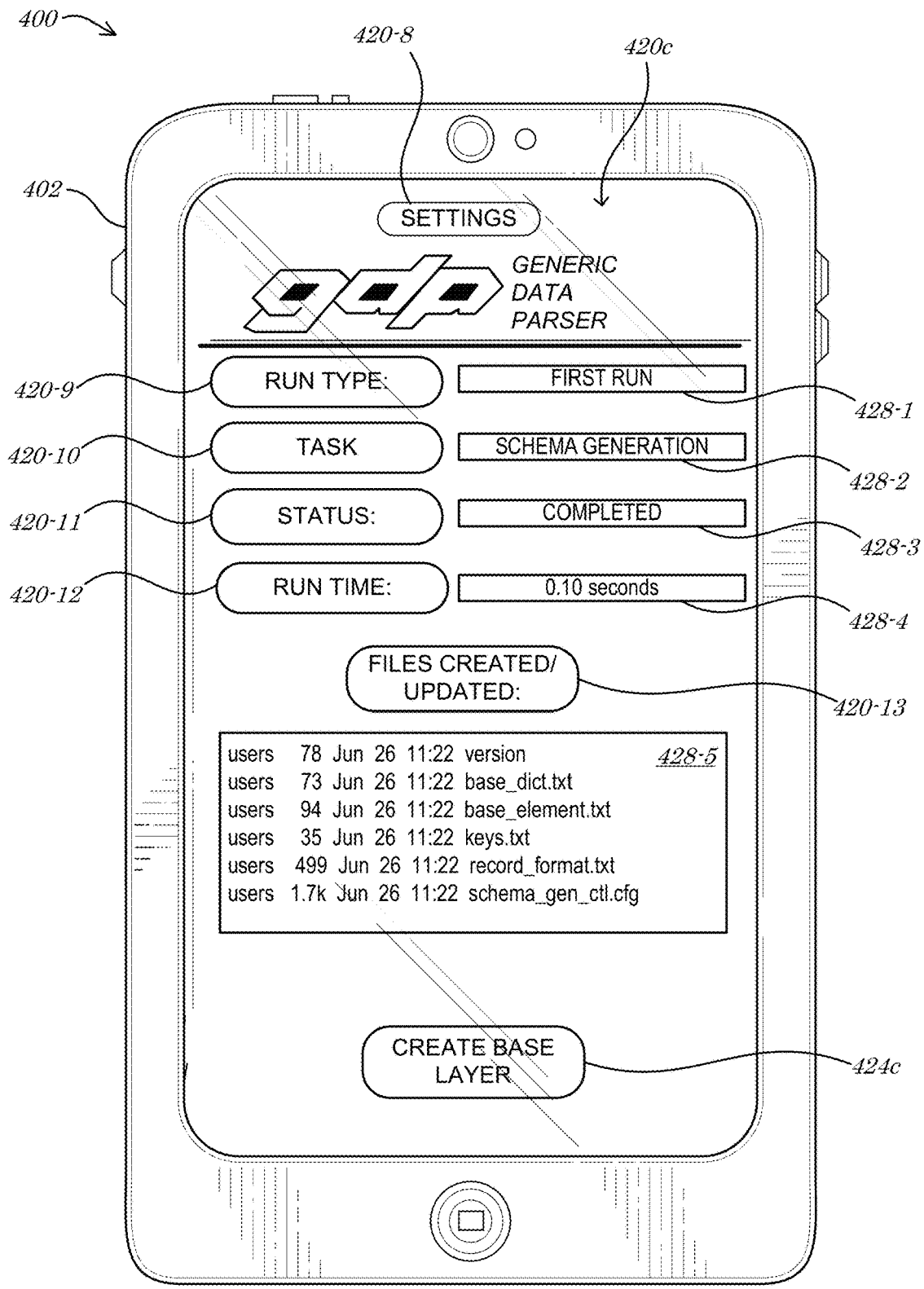

Referring to FIG. 4C for example, the third version (or page or instance) of the interface 420c may comprise a schema generation interface (e.g., defining a third input and/or output mechanism) by providing an area (e.g., one or more data input and/or output mechanisms, tools, objects, and/or features) that comprises (i) a "run type" object 420-9, (ii) a "task" object 420-10, (iii) a "status" object 420-11, (iv) a "run time" object 420-12, and/or (v) a "files created/updated" object 420-13. According to some embodiments, the third version of the interface 420*c* may also or alternatively comprise an area (e.g., one or more data input/output mechanisms, tools, objects, and/or features) that provides for (i) a "run type" output feature 428-1, (ii) a "task" output feature 428-2, (iii) a "status" output feature 428-3, (iv) a "run time" output feature 428-4, and/or (v) a "files created/updated" output feature 428-5.

In some embodiments, the third version (or page or instance) of the interface 420*c* may be utilized to receive feedback regarding GDP application processing (e.g., execution status and/or results of the first module thereof) and/or to continue the GDP application functionality (and/or initiate a second module thereof). Any or all of the various objects 420-9, 420-10, 420-11, 420-12, 420-13 may, for example, correspond to respective output features 428-1, 428-2, 428-3, 428-4, 428-5 that provide information regarding the first GDP application module, e.g., the schema derivation module and/or process. According to some embodiments, the run type output feature 428-1 may provide an indication of the type of run for the first module, the task output feature 428-2 may provide an indication of the module name and/or identifier (e.g., in the example case shown, the first module comprising the schema derivation module), the status output feature 428-3 may output an indication of the status of the execution of the first module, the run time output feature 428-4 may output an indication of the execution time of the first module, and/or the files created/updated output feature 428-5 may provide a listing of generated output files from the first module, e.g., a plurality of schema derivation files in the example case depicted in FIG. 4C.

In some embodiments, the third version of the interface 420*c* may comprise a create base layer button 424*c* that when actuated or selected by the user initiates a sub-routine that triggers and/or initiates a base layer creation module and/or routine of the GDP application. Such a module or routine may, for example, utilize the output (e.g., schema definition files) from the first module to prepare various code, tables, and/or data stores for loading of the unstructured and/or semi-structured data from the source. In some embodiments, the GDP application may cause the third version of the interface 420*c* to display other or additional user-selectable menu choices (not shown). The user-selectable menu choices displayed by the GDP application may be part of a library of user-selectable objects. In some embodiments, the library of user-selectable objects includes other user-selectable objects that are selectively included for display based on their determined relevance (e.g., based on pre-stored data associations) to the user, the user device 402, the identified data source, the identified data output path, etc.

According to some embodiments, a selection of the create base layer button 424*c* may trigger a call to and/or otherwise cause a provision, generation, and/or outputting of a fourth version of the interface 420*d* (and/or the fourth version of the interface 420*d* may be automatically provided upon identification of a different triggering event).

Figure 4D:
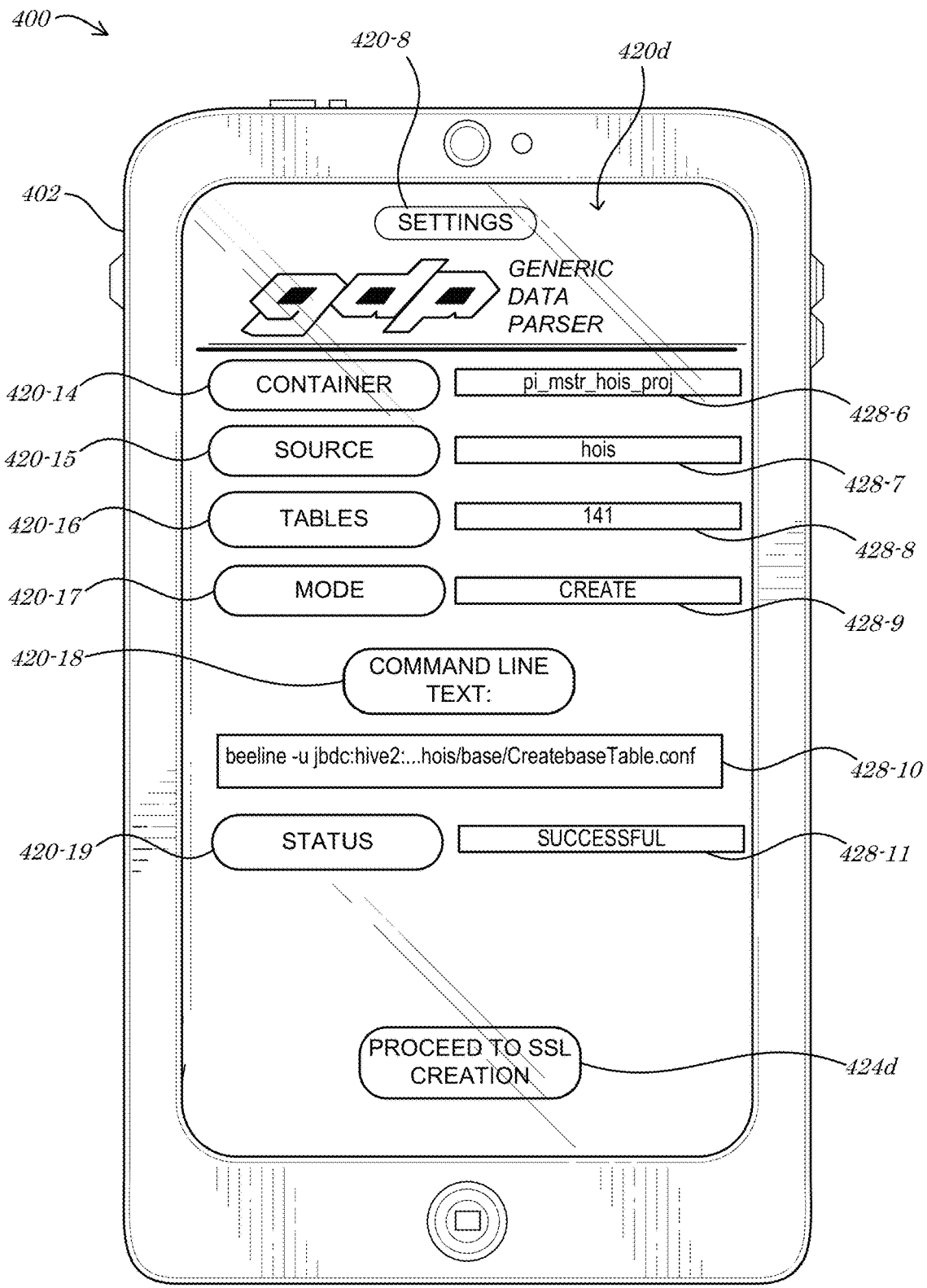

Referring to FIG. 4D for example, the fourth version (or page or instance) of the interface 420*d* may comprise a base layer creation interface (e.g., defining a fourth input and/or output mechanism) by providing an area (e.g., one or more data input and/or output mechanisms, tools, objects, and/or features) that comprises (i) a "container" object 420-14, (ii) a "source" object 420-15, (iii) a "tables" object 420-16, (iv) a "mode" object 420-17, (v) a "command line text" object 420-18, and/or (vi) a "status" object 420-19. According to some embodiments, the fourth version of the interface 420*d* may also or alternatively comprise an area (e.g., one or more data input/output mechanisms, tools, objects, and/or features) that provides for (i) a "container" output feature 428-6, (ii) a "source" output feature 428-7, (iii) a "tables" output feature 428-8, (iv) a "mode" output feature 428-9, (v) a "command line text output feature 428-10, and/or (vi) a "status" output feature 428-11.

In some embodiments, the fourth version (or page or instance) of the interface 420*d* may be utilized to receive feedback regarding GDP application processing (e.g., execution status and/or results of the second module thereof) and/or to continue the GDP application functionality (and/or initiate a third module thereof). Any or all of the various objects 420-14, 420-15, 420-16, 420-17, 420-18, 420-19 may, for example, correspond to respective output features 428-6, 428-7, 428-8, 428-9, 428-10, 428-11 that provide information regarding the second GDP application module, e.g., the base layer creation module and/or process. According to some embodiments, the container output feature 428-6 may provide an indication of the container name, the source output feature 428-7 may provide an indication of the data source, the tables output feature 428-8 may output an indication of the total number of base layer tables created based on the schema for the source data, the mode output feature 428-9 may output an indication of the execution mode of the second module, the command line text output feature 428-10 may output an indication of the code utilized by the GDP application (and/or the second module thereof) to create the base layer tables, and/or the status output feature 428-11 may output an indication of a status of the second module (e.g., in the example case depicted in FIG. 4D, that creation of the base layer and/or base layer tables is "successful").

In some embodiments, the GDP application may cause the fourth version of the interface 420*d* to display other or additional user-selectable menu choices (not shown). The user-selectable menu choices displayed by the GDP application may be part of a library of user-selectable objects. In some embodiments, the library of user-selectable objects includes other user-selectable objects that are selectively included for display based on their determined relevance (e.g., based on pre-stored data associations) to the user, the user device 402, the identified data source, the identified data output path, etc. In some embodiments, the fourth version of the interface 420*d* may comprise a proceed to SSL creation button 424*d* that when actuated or selected by the user may trigger a call to and/or otherwise cause a provision, generation, and/or outputting of a fifth version of the interface 420*e* (and/or the fifth version of the interface 420*e* may be automatically provided upon identification of a different triggering event).

Figure 4E:
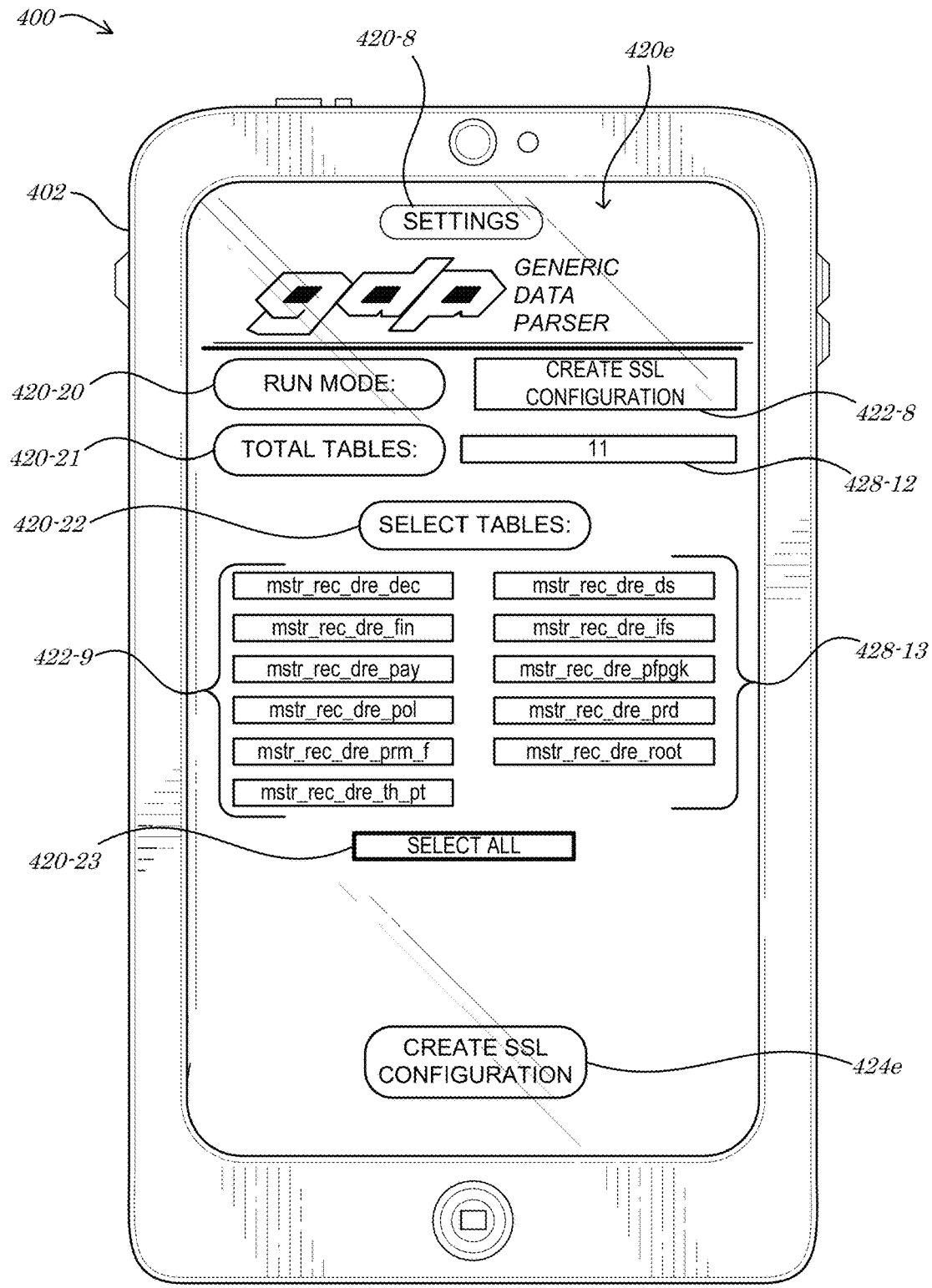

Referring to FIG. 4E for example, the fifth version (or page or instance) of the interface 420*e* may comprise an SSL layer configuration interface (e.g., defining a fifth input and/or output mechanism) by providing an area (e.g., one or more data input and/or output mechanisms, tools, objects, and/or features) that comprises (i) a "run mode" object 420-20, (ii) a "total tables" object 420-21, (iii) a "select tables" object 420-22, and/or (iv) a "select all" object 420-23. According to some embodiments, the fifth version of the interface 420*e* may also or alternatively comprise an area (e.g., one or more data input/output mechanisms, tools, objects, and/or features) that provides for (i) a "run mode" input feature 422-8, (ii) a "select tables" input feature 422-9, (iii) a "total tables" output feature 428-12, and/or (iv) a "select tables" output feature 428-13.

In some embodiments, the fifth version (or page or instance) of the interface 420e may be utilized to receive feedback regarding GDP application processing (e.g., execution status and/or results of the second module thereof) and/or to continue the GDP application functionality (and/or initiate and/or configure a third module thereof). Any or all of the various objects 420-20, 420-21, 420-22, 420-23 may, for example, correspond to respective input and/or output features 422-8, 422-9, 428-12, 428-13 that provide and/or prompt for information regarding the third GDP application module, e.g., the SSL layer creation module and/or process. According to some embodiments, the run mode object 420-20 may direct the user to enter (e.g., select and/or define) data via the run mode input feature 422-8 for example, that when actuated or selected by the user, initiates a sub-routine that provides a drop-down menu populated with available (and/or previous) run modes for the SSL layer creation module. In some embodiments, the run mode input feature 422-8 may also or alternatively comprise an output feature that provides an indication of a current run mode for the SSL layer creation module (e.g., "create configuration" and/or "create code"). According to some embodiments, the total tables output feature 428-12 may comprise an indication of a total number of SSL layer tables to be created (e.g., from the base layer tables). In some embodiments, the total tables output feature 428-12 may also or alternatively comprise an input feature that permits a user to enter or edit the total number of tables (and/or details thereof) for the SSL layer creation module.

According to some embodiments, the select tables object 420-22 may direct the user to enter (e.g., select and/or define) data via the select tables input feature 422-9. The select tables output feature 428-13 may correspond to the select tables object 420-22, for example, and may output a listing of the available SSL tables (e.g., eleven (11), in accordance with the example shown in FIG. 4E). According to some embodiments, the user may utilize the select tables input feature 422-9 to select a subset of the available tables for which the SSL configuration should be generated. In some embodiments, the select all object 420-23 may comprise a button that when selected by (e.g., receipt of input from) the user (e.g., a properly-positioned click of a mouse or other pointer) with respect to the select all object 420-23, automatically selects all available tables for SSL configuration generation (e.g., indicated by the bolding of the select all object 420-23 in the example depicted in FIG. 4E).

In some embodiments, the fifth version of the interface 420e may comprise a create SSL configuration button 424e that when actuated or selected by the user initiates a sub-routine that triggers and/or initiates an SSL layer creation module and/or routine of the GDP application and/or a sub-routine thereof, such as an SSL layer configuration file generation script, module, and/or routine. Such a module or routine may, for example, utilize the output (e.g., schema definition files) from the first module and/or output (e.g., base layer configuration data) from the second module to define, create, and/or store configuration details for an SSL layer (e.g., a client-accessible relational data layer). In some embodiments, the GDP application may cause the fifth version of the interface 420e to display other or additional user-selectable menu choices (not shown). The user-selectable menu choices displayed by the GDP application may be part of a library of user-selectable objects. In some embodiments, the library of user-selectable objects includes other user-selectable objects that are selectively included for display based on their determined relevance (e.g., based on pre-stored data associations) to the user, the user device 402, the identified data source, the identified data output path, base layer parameters, SSL layer parameters, etc.

According to some embodiments, a selection of the create SSL configuration button 424e may trigger a call to and/or otherwise cause a provision, generation, and/or outputting of a sixth version of the interface 420f (and/or the sixth version of the interface 420f may be automatically provided upon identification of a different triggering event).

Figure 4F:
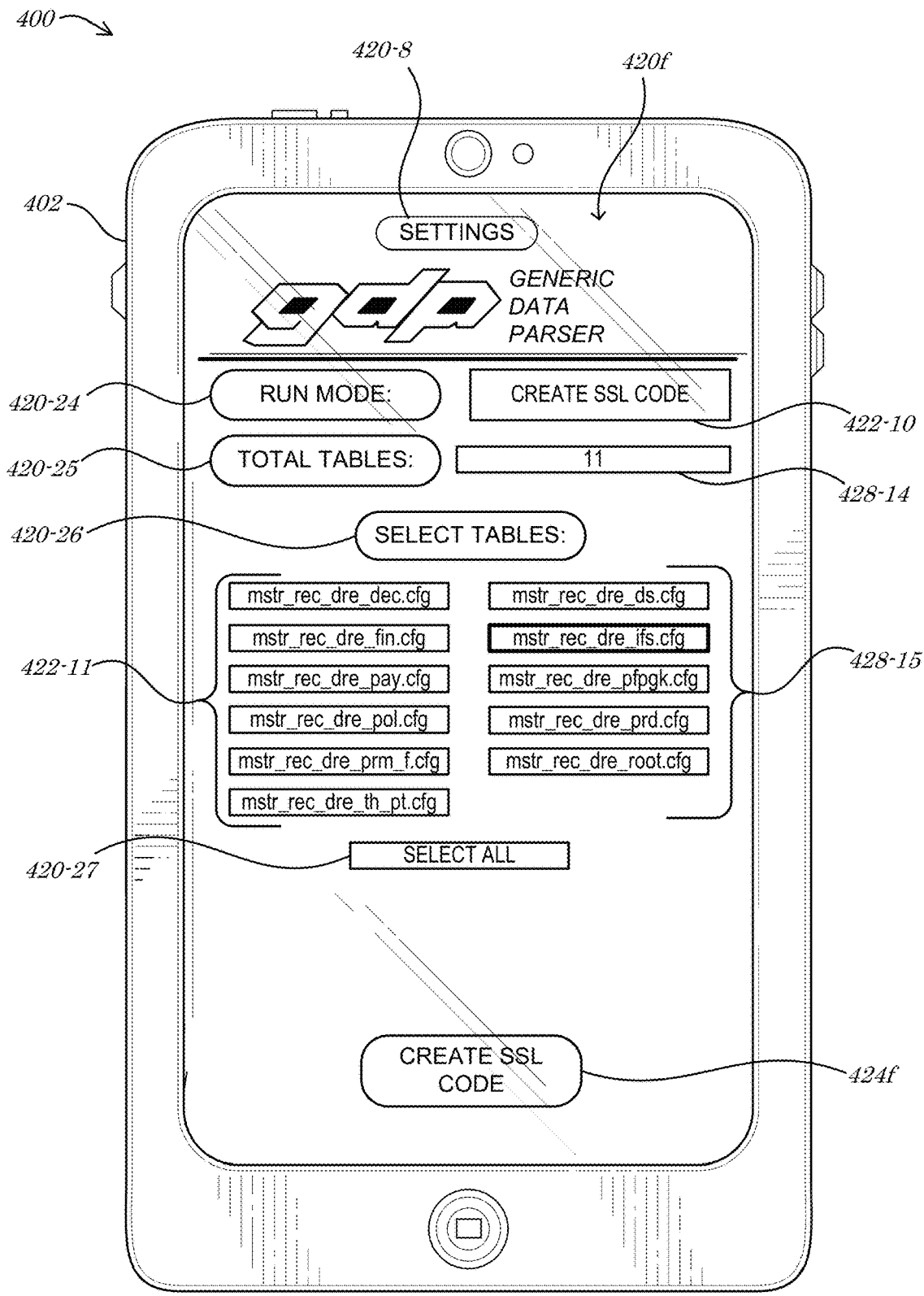

Referring to FIG. 4F for example, the sixth version (or page or instance) of the interface 420f may comprise an SSL layer code creation interface (e.g., defining a sixth input and/or output mechanism) by providing an area (e.g., one or more data input and/or output mechanisms, tools, objects, and/or features) that comprises (i) a "run mode" object 420-24, (ii) a "total tables" object 420-25, (iii) a "select tables" object 420-26, and/or (iv) a "select all" object 420-27. According to some embodiments, the sixth version of the interface 420f may also or alternatively comprise an area (e.g., one or more data input/output mechanisms, tools, objects, and/or features) that provides for (i) a "run mode" input feature 422-10, (ii) a "select tables" input feature 422-11, (iii) a "total tables" output feature 428-14, and/or (iv) a "select tables" output feature 428-15.

In some embodiments, the sixth version (or page or instance) of the interface 420f may be utilized to receive feedback regarding GDP application processing (e.g., execution status and/or results of the third module thereof and/or of a first sub-module thereof, such as a configuration module) and/or to continue the GDP application functionality (and/or initiate and/or configure the third module thereof). Any or all of the various objects 420-24, 420-25, 420-26, 420-27 may, for example, correspond to respective input and/or output features 422-10, 422-11, 428-14, 428-15 that provide and/or prompt for information regarding the third GDP application module, e.g., the SSL layer creation module and/or process. According to some embodiments, the run mode object 420-24 may direct the user to enter (e.g., select and/or define) data via the run mode input feature 422-10 for example, that when actuated or selected by the user, initiates a sub-routine that provides a drop-down menu populated with available (and/or previous) run modes for the SSL layer creation module. In some embodiments, the run mode input feature 422-10 may also or alternatively comprise an output feature that provides an indication of a current run mode for the SSL layer creation module (e.g., "create configuration" and/or "create code"). According to some embodiments, the total tables output feature 428-14 may comprise an indication of a total number of SSL layer tables to be created (e.g., from the base layer tables). In some embodiments, the total tables output feature 428-14 may also or alternatively comprise an input feature that permits a user to enter or edit the total number of tables (and/or details thereof) for the SSL layer creation module.

According to some embodiments, the select tables object 420-26 may direct the user to enter (e.g., select and/or define) data via the select tables input feature 422-11. The select tables output feature 428-15 may correspond to the select tables object 420-26, for example, and may output a listing the available SSL tables (e.g., eleven (11), in accordance with the example shown in FIG. 4F). According to some embodiments, the user may utilize the select tables input feature 422-11 to select a subset of the available tables (one (1), as indicated by bold outlining in the example depicted in FIG. 4F) for which the SSL code should be generated. In some embodiments, the select all object 420-27 may comprise a button that when selected by (e.g., receipt of input from) the user (e.g., a properly-positioned click of a mouse or other pointer) with respect to the select all object 420-27, automatically selects all available tables for SSL code generation.

In some embodiments, the sixth version of the interface 420f may comprise a create SSL code button 424f that when actuated or selected by the user initiates a sub-routine that triggers and/or initiates an SSL layer creation module and/or routine of the GDP application and/or a sub-routine thereof, such as an SSL layer code generation script, module, and/or routine. Such a module or routine may, for example, utilize the output (e.g., schema definition files) from the first module, output (e.g., base layer configuration data) from the second module, and/or output from and/or configuration of the third module (or first sub-module thereof) to define, create, and/or store scripts (e.g., code) for an SSL layer (e.g., a client-accessible relational data layer). In some embodiments, the GDP application may cause the sixth version of the interface 420f to display other or additional user-selectable menu choices (not shown). The user-selectable menu choices displayed by the GDP application may be part of a library of user-selectable objects. In some embodiments, the library of user-selectable objects includes other user-selectable objects that are selectively included for display based on their determined relevance (e.g., based on pre-stored data associations) to the user, the user device 402, the identified data source, the identified data output path, base layer parameters, SSL layer parameters, etc.

According to some embodiments, a selection of the create SSL code button 424f may trigger a call to and/or otherwise cause a provision, generation, and/or outputting of a seventh version of the interface 420g (and/or the seventh version of the interface 420g may be automatically provided upon identification of a different triggering event).

Figure 4G:
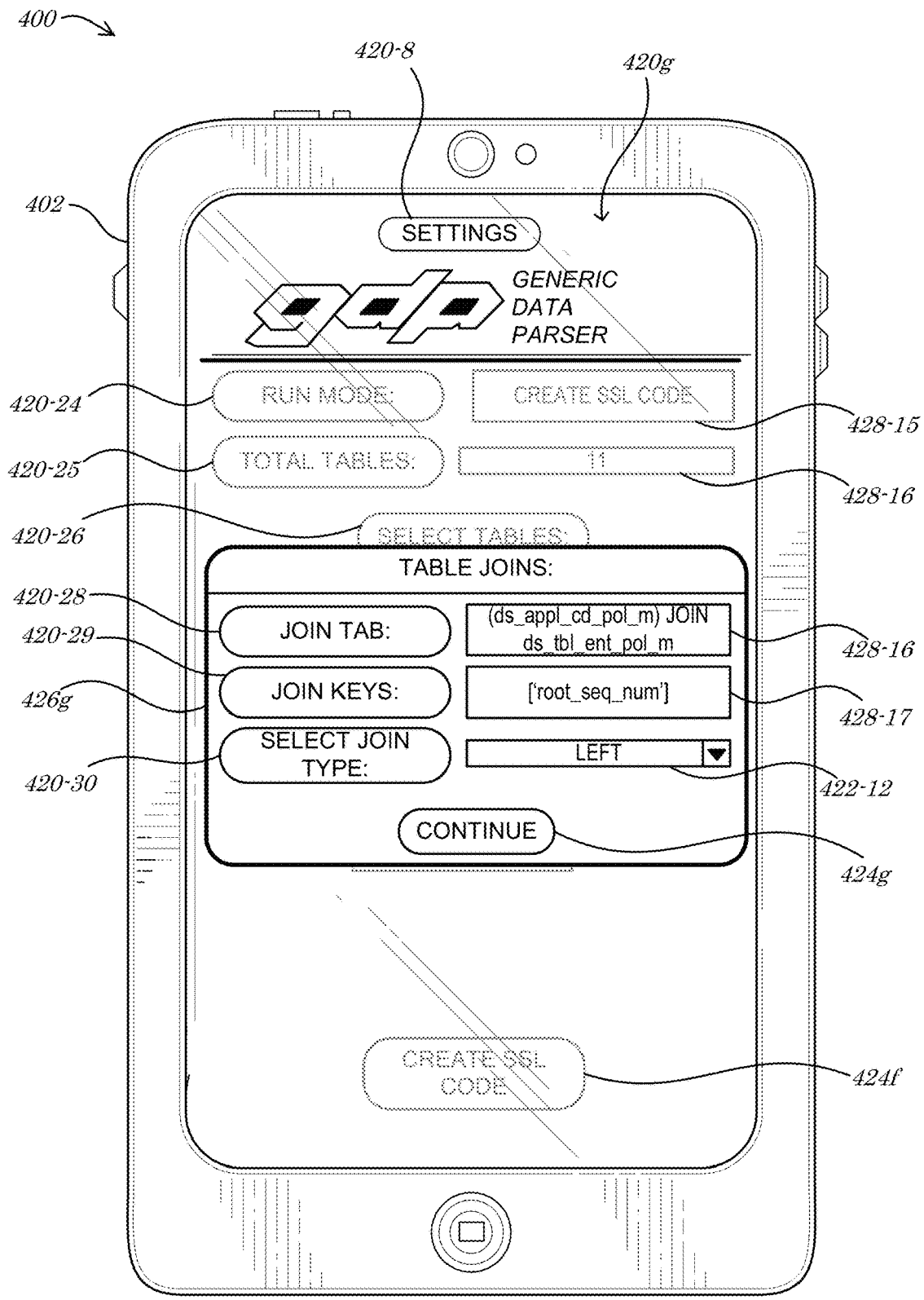

Referring to FIG. 4G for example, the seventh version (or page or instance) of the interface 420g may comprise a table joins interface (e.g., defining a seventh input and/or output mechanism) by providing a table joins prompt 426g. The seventh version (or page or instance) of the interface 420g may be utilized, for example, upon activation of the create SSL code button 424f of the sixth version of the interface 420f and/or upon completion of the SSL layer creation module (and/or a sub-routine thereof). In some embodiments, the table joins prompt 426g may request that the user verify and/or define various data elements related to SSL table creation by providing (i) a "join tab" object 420-28, (ii) a "join keys" object 420-29, and/or a "select join type" object 420-30. According to some embodiments, the table joins prompt 426g may present data to the user via a join tab output feature 428-16 and/or a join keys output feature 428-17. The join tab output feature 428-16 and the join keys output feature 428-17 may, for example, provide indications of table join and key (e.g., relationship) data utilized to relate various SSL tables in the SSL layer. According to some embodiments, the join tab output feature 428-16 and/or a join keys output feature 428-17 may not be editable by the user (e.g., may comprise output only).

In some embodiments, the select join type object 420-30 may direct the user to enter (e.g., select and/or define) data via a join type input feature 422-12, that when actuated or selected by the user, initiates a sub-routine that provides a drop-down menu populated with available (and/or previous) joint types (e.g., left, right, inner, outer) for the SSL tables created by the SSL layer creation module. In some embodiments, the join type input feature 422-12 may also or alternatively comprise an output feature that provides an indication of a current join type for the identified SSL tables using the identified key(s). In such a manner, for example, a user may verify, edit, and/or define the various table relationship attributes for the SSL layer tables created by the GDP application.

According to some embodiments, the seventh version of the interface 420g and/or the table joins prompt 426g may comprise a continue button 424g that when actuated or selected by the user initiates a sub-routine that triggers and/or completes the SSL layer creation module and/or routine of the GDP application and/or a sub-routine thereof, such as an SSL layer code generation script, module, and/or routine. Once any or all table joins, keys, and/or join types are verified, entered, and/or defined, for example, the table joins prompt 426g may be closed by selection of the continue button 424g and the SSL layer creation module may accordingly proceed to complete creation of the SSL tables, fields, keys, joins, etc. According to some embodiments, additional interfaces (not shown) and/or elements may be provided that permit an end-user to query data loaded into the SSL tables/layer from the unstructured and/or semi-structured data source.

While various components of the interface 420a-g have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. Generic Data Parsing Data Storage Structures

Figure 5:
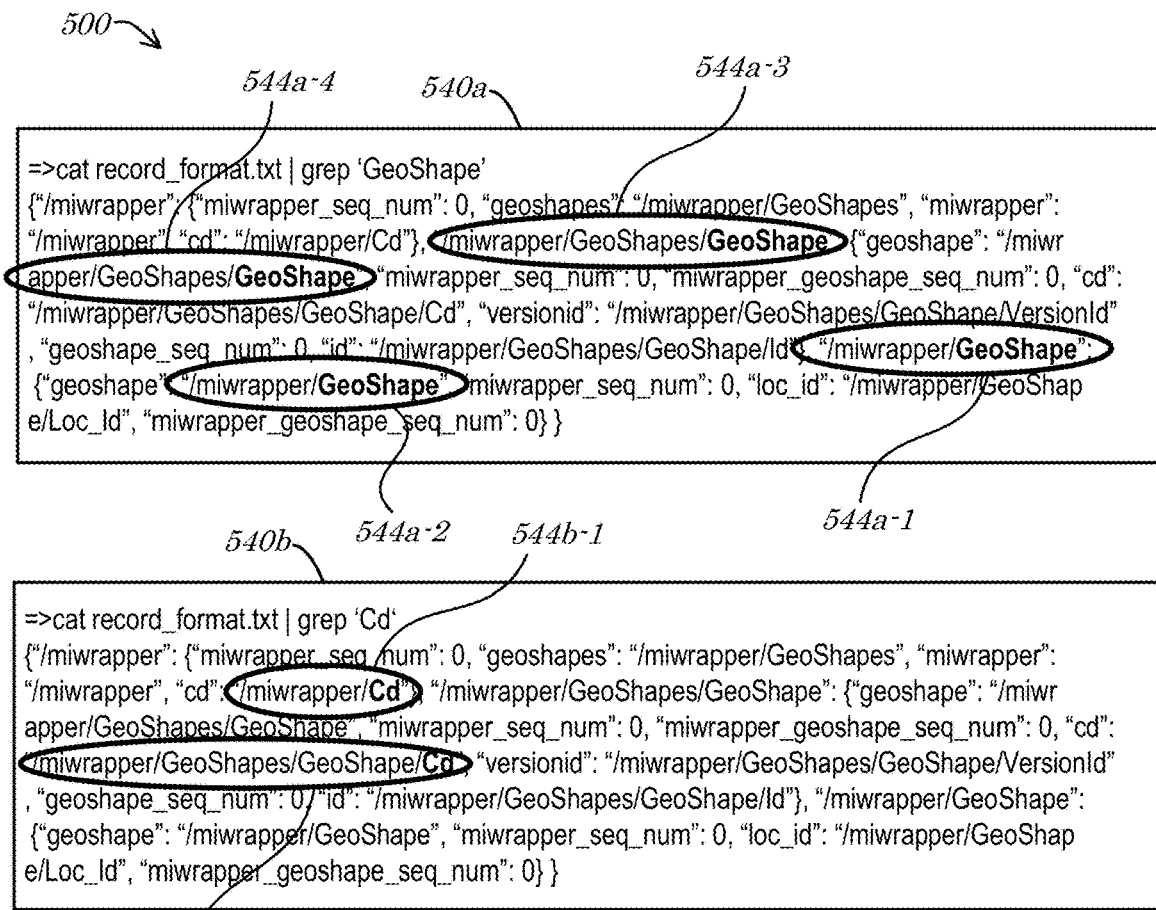
FIG. 5 is a block diagram of a system of example data files according to some embodiments.

Referring now to FIG. 5, a diagram system 500 of example data files 540a-b according to some embodiments is shown. In some embodiments, the data files 540a-b may, for example, comprise one or more flat files, matrices, arrays, and/or other referential files that store data descriptive of output from a parsing and/or extraction process (e.g., the derive schema module 242-1, the schema derivation module/process 308, and/or the schema append module/process 310, of FIG. 2 and/or FIG. 3A herein) that has been executed utilizing an unstructured and/or semi-structured data source (not shown). According to some embodiments, the data files 540a-b depicted in FIG. 5 may comprise and/or define one or more text and/or configuration files utilized to define a schema for a normalized and/or relational data storage structure and/or format. In some embodiments, the data files 540a-b may comprise delimited data stores from which tables, fields, and/or keys are identified (e.g., based on an unstructured and/or semi-structured data source). In some embodiments, for example, the data files 540a-b may be generated based on an XML (or other semi-structured) data source such as, but not limited to, the following Source File #1:

```
(1)<miwrapper>
   <Cd>F112345</Cd>
   <GeoShape><Loc_Id>121</Loc_Id></GeoShape>
   <GeoShape><Loc_Id>122</Loc_Id></GeoShape>
   <GeoShapes>
      <GeoShape Id="101" VersionId="A0001">
         <Cd>101</Cd>
      </GeoShape>
```

```
<GeoShape Id=" 102" VersionId="A0001">
    <Cd>102</Cd>
</GeoShape>
</GeoShapes>
</miwrapper>
```

According to some embodiments, and, as depicted in a non-limiting example first file 540*a* with respect to the tag or element "GeoShape", multiple occurrences of the tag/element may be stored in the first file 540*a* in a manner that deconstructs the formatting of the Source File #1 into a flat file or path-based hierarchical structure. The first file 540*a* may store, for example, indications of multiple occurrences of the "GeoShape" element (e.g., a particular alphanumeric character set, word, term, phrase, string, etc.) with respect to the "miwrapper" element at 544*a*-1 and 544*a*-2 and/or may store indications of multiple occurrences of the same "GeoShape" element with respect to the "GeoShapes" element (e.g., itself being a sub-element of the "miwrapper" element) at 544*a*-3 and 544*a*-4. Similarly, the second file 540*b* may be generated with respect to the tag or element "Cd" and may store and/or identify multiple occurrences of the tag/element in a manner that deconstructs the formatting of the Source File #1 into a flat file or path-based hierarchical structure. The second file 540*b* may store, for example, indications of occurrences of the "Cd" element (e.g., a particular alphanumeric character set, word, term, phrase, string, etc.) with respect to the "miwrapper" element at 544*b*-1 and/or may store indications of occurrences of the same "Cd" element with respect to the "GeoShape" element (e.g., itself being a sub-element of the "GeoShapes" element, which in turn is a sub-element of the "miwrapper" element) at 544*b*-2.

In such a manner, for example, different fields, tables, keys (e.g., multiple occurring tags/elements) and/or other data elements and/or relationships therebetween may be identified based on the parsing of the Source File #1, e.g., such that a normalized and/or relational data schema descriptive thereof may be defined. In some embodiments, fewer or more tag/element paths and/or occurrences 544*a*-1, 544*a*-2, 544*a*-3, 544*a*-4, 544*b*-1, 544*b*-2 may be included in the data files 540*a*-*b*, e.g., based on the data stored in the Source File #1 and/or the format, type, and/or structure of the Source File #1. According to some embodiments, fewer or more data fields and/or data items comprising the data files 540*a*-*b* than are shown may be included in the system 500. Only a portion of the data files 540*a*-*b* and/or data lists or stores is necessarily shown in FIG. 5, for example, and other data, data types, database fields, columns, structures, orientations, quantities, and/or configurations may be utilized without deviating from the scope of some embodiments. Further, the particular data, tables, fields, keys, tags, elements, etc. depicted in the data files 540*a*-*b* are provided solely for exemplary and illustrative purposes and do not limit the scope of embodiments described herein.

Figure 6:
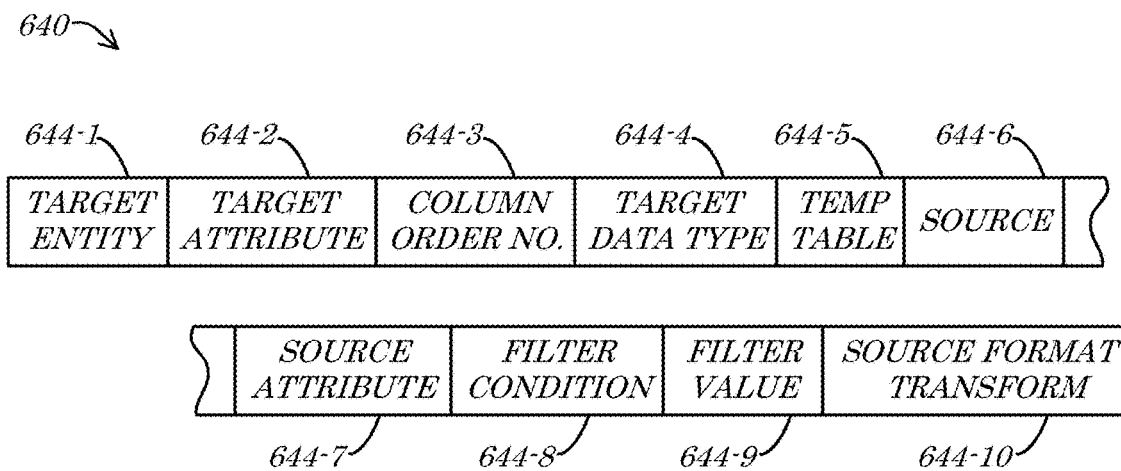
FIG. 6 is a block diagram of an example data storage structure according to some embodiments.

Turning to FIG. 6, a block diagram of an example data storage structure 640 according to some embodiments is shown. In some embodiments, the data storage structure 640 may comprise a mapping file that is utilized to drive a client and/or SSL layer creation process, as described herein. According to some embodiments, the data storage structure 640 may be similar in configuration and/or functionality to the map file 244*d* of FIG. 2 and/or the mapping sheet utilized by the client layer creation module/process 318 (and/or a sub-process 318-1 thereof) of FIG. 3C. The data storage structure 640 may comprise and/or define, for example, a target entity field 644-1, a target attribute field 644-2, a column order no. field 644-3, a target data type field 644-4, a temp table field 644-5, a source field 644-6, a source attribute field 644-7, a filter condition field 644-8, a filter value field 644-9, and/or a source format/transformation field 644-10.

In some embodiments, the target entity field 644-1 (e.g., identified by the tag "<Target entity>") may store data descriptive of a target client/SSL layer table name, the target attribute field 644-2 (e.g., identified by the tag "<Target attribute>") may store data identifying a target column/field name for the table, the column order no. field 644-3 (e.g., identified by the tag "<column order>") may store data descriptive of the column order in the table, and/or the target data type field 644-4 (e.g., identified by the tag "<Target data type>") may store data descriptive of the data type/format for the column/field of the table.

According to some embodiments, the temp table field 644-5 (e.g., identified by the tag "<Temp table>") may store data descriptive of any temporary tables associated with the target client/SSL layer table, the source field 644-6 (e.g., identified by the tag "<Source>") may store data identifying a source table, the source attribute field 644-7 (e.g., identified by the tag "<Source Attribute name>") may store data descriptive of a source column/field for the table, the filter condition field 644-8 (e.g., identified by the tag "<Filter condition>") may store data descriptive of any filter condition (e.g., < >, <, >, <=, >=) for the column/field of the source table, the filter value field 644-9 (e.g., identified by the tag "<Filter Value>") may store data descriptive of any value applicable to the filter operation, and/or the source format/transformation field 644-10 (e.g., identified by the tag "<Source Format/transformation>") may store data descriptive of any data types, special conditions, etc., pertinent to the transformation from the source table to the target table. According to some embodiments, each respective pairing and/or mapping of source and target tables may be included in the data storage structure 640. In such a manner, for example, the configuration parameters for the data transformation and/or creation and/or loading of the client/SSL layer data tables may be established. According to some embodiments, a GDP application process may utilize the data storage structure 640 and/or data generated therefrom to perform any desired data transformation that ultimately provides one or more client/SSL layer tables to an end-user, via which they may readily access stored data utilizing one or more well known query tools, languages, applications, etc.

In some embodiments, fewer or more data fields than are shown may be included in and/or associated with the data storage structure 640. Only a portion of one or more databases, files, and/or other data stores is necessarily shown in FIG. 6, for example, and other fields, columns, structures, orientations, quantities, and/or configurations may be utilized without deviating from the scope of some embodiments. Further, the data shown (e.g., the field names) in the various data fields is provided solely for exemplary and illustrative purposes and does not limit the scope of embodiments described herein.

VI. Additional Generic Data Parsing Application Methods

Figure 7:
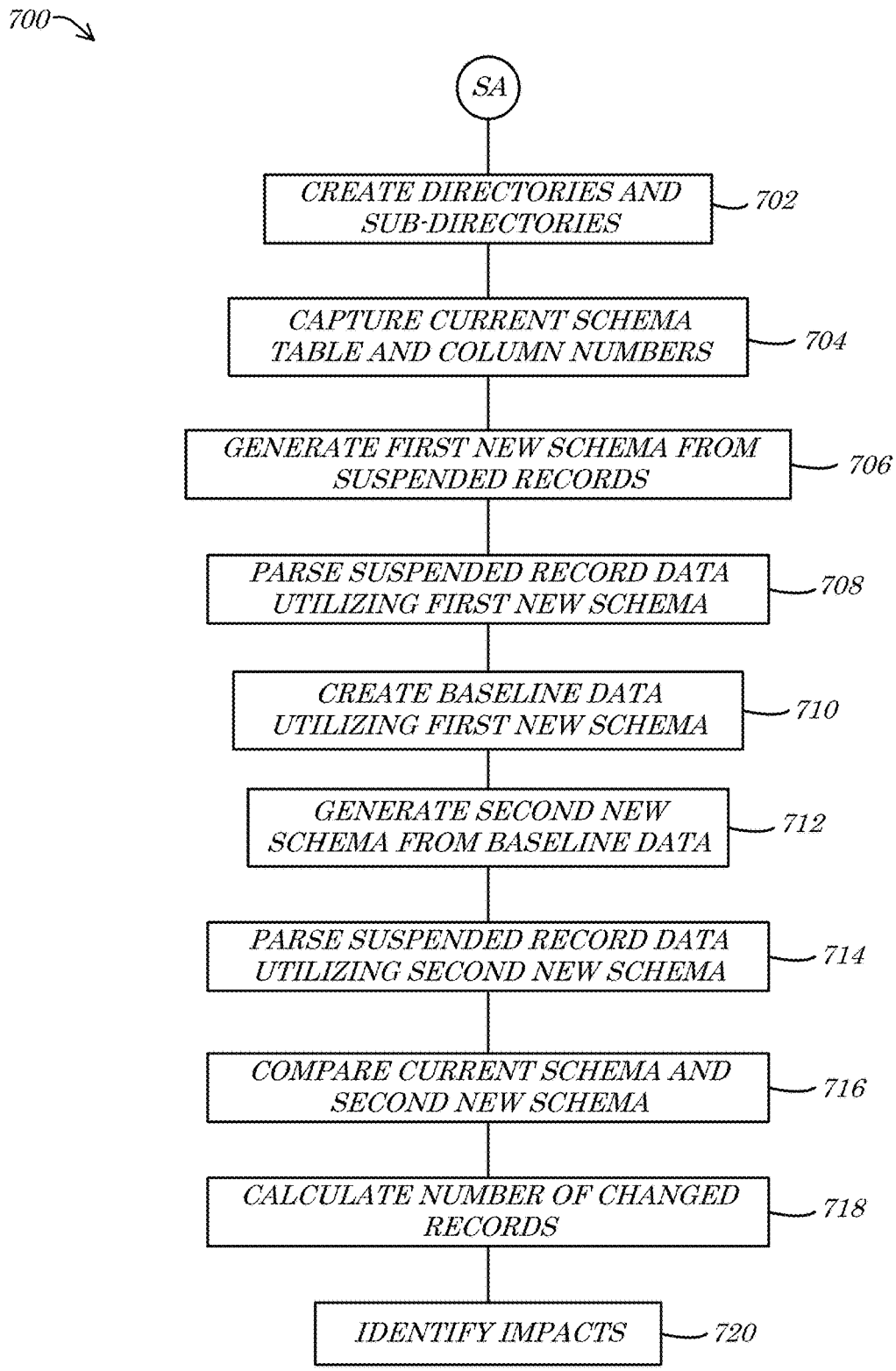
FIG. 7 is a flow diagram of a method according to some embodiments

Referring now to FIG. 7, a flow diagram of a method 700 according to some embodiments is shown. In some embodiments, the method 700 may be performed and/or implemented by and/or otherwise associated with one or more specialized and/or specially-programmed computers (e.g., one or more of the user devices 102*a-n*, 202*a-b*, 402 and/or the controller devices 110, 210, and/or the apparatus 1010 of FIG. 1, FIG. 2, FIG. 4A, FIG. 4B, FIG. 4C, FIG. 4D, FIG. 4E, FIG. 4F, FIG. 4G, and/or FIG. 10 herein), computer terminals, computer servers, computer systems and/or networks, and/or any combinations thereof (e.g., by one or more multi-threaded and/or multi-core processing units of a GDP application program unstructured and/or semi-structured data processing system). In some embodiments, the method 700 may be embodied in, facilitated by, and/or otherwise associated with various input mechanisms and/or interfaces (such as the interfaces 420*a-g*, 920*a-e*, 1020 of FIG. 4A, FIG. 4B, FIG. 4C, FIG. 4D, FIG. 4E, FIG. 4F, FIG. 4G, FIG. 9A, FIG. 9B, FIG. 9C, FIG. 9D, FIG. 9E, and/or FIG. 10 herein). According to some embodiments, the method 700 may embody an unstructured and/or semi-structured data flow and/or process that comprises a non-limiting example of how an end-user may easily, repeatably, and with alerts to changes in source data structure, transform unstructured and/or semi-structured data into one or more normalized and/or relational data tables, without requiring a knowledge of coding. In some embodiments, the method 700 may be automatically performed based on various triggers and/or events such as, but not limited to, expiration of a time period and/or upon a number of suspended records reaching or exceeding a threshold number or amount.

According to some embodiments, the method 700 may comprise a portion of and/or may otherwise be related to the method 300 of FIG. 3A, FIG. 3B, and/or FIG. 3C. The method 700 may, for example, comprise a Suspense Analysis ("SA") process that is related to and/or triggered by the loading of a record into a suspended record data store at 314-6 of the map process 314, the base layer creation process 312, and/or the method 300. In some embodiments, such an SA process and/or tool may be utilized to analyze groups of suspended records, identify impacts related to any new fields and/or changed fields, and/or to reincorporate one or more suspended records into the transformed data set (e.g., as managed by a GDP application process). According to some embodiments, the method 700 may continue at the point "SA" from a call, request, trigger, and/or handoff from the method 300 and/or may otherwise be separately triggered and/or initiated at "SA", e.g., by a data analysis user desiring to investigate records suspended for a particular GDP application run (or group of runs).

In some embodiments, the method 700 may comprise creating (e.g., by an electronic processing device) directories and sub-directories, at 702. Upon initiation of the method 700, whether triggered automatically or on-demand, for example, any or all necessary directories, sub-directories, folders, files, settings, and/or other attributes may be defined, set, stored, and/or established. According to some embodiments, the directories and/or sub-directories may comprise temporary directories at one or more desired locations. In some embodiments, the directories and/or sub-directories (and/or other features and/or settings) may be stored and/or created at a data storage location associated with an execution of the GDP application. In the case that the GDP application generates suspended records that are stored in a particular suspended record location, for example, the directories and/or sub-directories may be created in the same location and/or on the same data storage device (e.g., to minimize data transmission latency).

According to some embodiments, the method 700 may comprise capturing (e.g., by the electronic processing device) a current schema table and column numbers, at 704. The method 700 may be performed to compare a current schema for the unstructured and/or semi-structured data source to the records that were suspended from the GDP application process due to some difference between the records and the schema. The method 700 may accordingly load, capture, identify, and/or otherwise determine the table and column names, numbers (e.g., unique numbers assigned by the GDP application process), and/or other attributes in preparation for the comparison. In some embodiments, the table and/or column/field information may be acquired from the schema definition files created by the GDP application process.

In some embodiments, the method 700 may comprise deriving (e.g., by the electronic processing device) a first new schema from the suspended records, at 706. According to some embodiments, the method 700 may utilize the same process that the GDP application utilized to derive the current schema (e.g., at the time of first-run on the unstructured and/or semi-structured data source). The population of suspended records may be utilized and/or treated as a new unstructured and/or semi-structured data source, for example, to derive the first new schema. In such a manner, for example, all tables, fields, columns, keys, and/or other attributes of the records may be mapped to normalized, structured, and/or relational elements, regardless of whether they are represented in the current schema, or not. In some embodiments, PySpark scripting (and/or another programming language) may be utilized to derive and/or define the first new schema. The first new schema may, for example, comprise a PySpark or Spark schema.

According to some embodiments, the method 700 may comprise parsing (e.g., by the electronic processing device) the suspended record data utilizing the first new schema, at 708. Once the first new schema is defined, for example, the suspended records may be parsed with respect to the new structure. In some embodiments, the method 700 may validate the record count of the suspended records. According to some embodiments, the method 700 may comprise creating (e.g., by the electronic processing device) baseline data (e.g. XML) utilizing the first new schema, at 710. The baseline data may, for example, store and/or represent all attributes of the suspended records.

According to some embodiments, the method 700 may comprise deriving (e.g., by the electronic processing device) a second new schema from the baseline data, at 712. The baseline data (which may include all record attributes, for example) may be utilized as input into a Python (and/or other programing language) script, for example, to derive the second new schema. The second new schema may, for example, comprise a Python schema. In some embodiments, the method 700 may comprise parsing (e.g., by the electronic processing device) suspended record data utilizing the second new schema, at 714. The suspended record data set may be parsed, loaded, and/or otherwise processed utilizing the second new schema, for example, and/or the count of suspended records may be verified (e.g., a second count verification).

According to some embodiments, the method 700 may comprise comparing (e.g., by the electronic processing device) the current schema and the second new schema, at 716. The Python or second new schema may be compared to the current schema (e.g., originally generated from the unstructured and/or semi-structured data source before the suspended records were identified), for example, to identify differences therebetween. In some embodiments, one or more differing tables, field/columns, keys, and/or other data attributes (e.g., type, format, etc.) may be identified. According to some embodiments, the nature of the differences may be identified and may include, for example, an indication and/or flagging of the records corresponding to the identified differences.

In some embodiments, the method 700 may comprise calculating (e.g., by the electronic processing device) a number of changed records, at 718. The method 700 may, for example, generate a record count for each identified difference between the current schema and the second new schema. According to some embodiments, the count (and/or identification listing) of the records corresponding to the differences may be output to a user. In such a manner, for example, the user may readily perceive which differences/changes are outliers (e.g., associated with small numbers of records) and which differences/changes are more substantial. In some embodiments, the user may utilize the data from such a change report to make changes to the configuration of the GDP application and/or the current schema (e.g., to account for and/or incorporate, for example, new tables, fields, keys, data types, etc.).

According to some embodiments, the method 700 may comprise identifying (e.g., by the electronic processing device) impacts, at 720. In some embodiments, the method 700 may automatically identify, qualify, quantify, and/or assess the impacts and/or nature of the identified differences and/or changes. According to some embodiments, the impact identified may comprise a listing of cascading effects and/or of ultimate effects expected to the client/SSL layer. A listing of affected tables in the SSL layer may be provided, for example, and/or the nature and/or extent of the effects may be expressed. Based on the identified record counts for each difference/change, for example, the method 700 may categorize and/or classify the difference/change. Differences and/or changes due to and/or comprising a single record, for example, may be considered outliers and may be automatically disregarded. In some embodiments, an outlier threshold for record counts may be applied that causes any difference/change associated with a record count that falls below the threshold to be disregarded. According to some embodiments, records associated with disregarded changes may be loaded, to the extent possible (such as by deleting the difference/change therewithin), into the current schema, e.g., utilizing the GDP application. In some embodiments, for differences/changes associated with record counts above the threshold, the differences/changes may be automatically incorporated into the current schema. Additional and/or changed tables, fields/columns, keys, etc., may, for example, be added to the current schema and the associated records may be loaded into the updated schema, including any data corresponding to the new tables, fields, etc. In such a manner, for example, the SA process of the method 700 may automatically, e.g., utilizing stored schema update rules and/or thresholds, modify the schema for an unstructured and/or semi-structured data source in the case that the content and/or format of the unstructured and/or semi-structured data source changes-all without requiring coding by the end-user.

Turning now to FIG. 8, a flow diagram of a method 800 according to some embodiments is shown. In some embodiments, the method 800 may be performed and/or implemented by and/or otherwise associated with one or more specialized and/or specially-programmed computers (e.g., one or more of the user devices 102*a-n*, 202*a-b*, 402 and/or the controller devices 110, 210, and/or the apparatus 1010 of FIG. 1, FIG. 2, FIG. 4A, FIG. 4B, FIG. 4C, FIG. 4D, FIG. 4E, FIG. 4F, FIG. 4G, and/or FIG. 10 herein), computer terminals, computer servers, computer systems and/or networks, and/or any combinations thereof (e.g., by one or more multi-threaded and/or multi-core processing units of a GDP application program unstructured and/or semi-structured data processing system). In some embodiments, the method 800 may be embodied in, facilitated by, and/or otherwise associated with various input mechanisms and/or interfaces (such as the interfaces 420*a-g*, 920*a-e*, 1020 of FIG. 4A, FIG. 4B, FIG. 4C, FIG. 4D, FIG. 4E, FIG. 4F, FIG. 4G, FIG. 9A, FIG. 9B, FIG. 9C, FIG. 9D, FIG. 9E, and/or FIG. 10 herein). According to some embodiments, the method 800 may embody an unstructured and/or semi-structured data flow and/or process that comprises a non-limiting example of how an end-user may easily, repeatably, and with alerts to changes in source data structure, transform unstructured and/or semi-structured data into one or more normalized and/or relational data tables, without requiring a knowledge of coding.

According to some embodiments, the method 800 may comprise a portion of and/or may otherwise be related to the method 300 of FIG. 3A, FIG. 3B, and/or FIG. 3C. The method 800 may, for example, comprise a Quality Assurance ("QA") process that is related to and/or triggered by the completion of the client layer creation at 318, the creation of client/SSL layer tables at 318-6, and/or the method 300. In some embodiments, such a QA process and/or tool may be utilized to analyze the transformation of unstructured and/or semi-structured data sources by the GDP application by execution of a different and/or separate parsing algorithm and/or method—e.g., to verify the functionality of the GDP application. According to some embodiments, the method 800 may continue at the point "QA" from a call, request, trigger, and/or handoff from the method 300 and/or may otherwise be separately triggered and/or initiated at "QA", e.g., by a data analysis user desiring to investigate the effectiveness/quality of the GDP application (e.g., with respect to a particular source of data).

In some embodiments, the method 800 may comprise receiving (e.g., by an electronic processing device) test keys, at 802. A user (such as a GDP application tester and/or QA personnel) may, for example, provide information to direct the method 800 to a particular unstructured and/or semi-structured data source for which the GDP application process is desired to be tested, validated, and/or authenticated. According to some embodiments, the user may utilize an interface to enter and/or define one or more test keys, container names, source names, identifiers, and/or locations (e.g., paths), and/or source data types (e.g., JSON, XML, COBOL, etc.). In some embodiments, any or all of such QA input may be prompted for, selected from a drop-down menu, and/or received by a device executing the method 800. In some embodiments, the source of the unstructured and/or semi-structured data may comprise one or more files directly attached to and/or imported into the QA analysis tool executing the method 800 (e.g., COBOL and/or other files may be imported directly from another application, as opposed to being stored in a data storage structure for retrieval and/or access).

According to some embodiments, the method 800 may comprise extracting (e.g., by the electronic processing device) raw data from source files utilizing test keys, at 804. In some embodiments, a query may be executed utilizing the QA input parameters to access the source data. In some embodiments, the method 800 and/or the extracting at 804 may comprise creating (e.g., by the electronic processing device) a sequence number query, at 804-1. The query may be structured to retrieve, for example, a sequence number for each record stored in the unstructured and/or semi-structured data source that corresponds to the one or more QA input keys. In some embodiments, the method 800 and/or the extracting at 804 may comprise retrieving (e.g., by the electronic processing device) the sequence number for each QA test key from a base table, at 804-2. According to some embodiments, for example, the sequence number(s) may be retrieved from the base layer tables storing the keys and/or records thereof. In some embodiments, the method 800 and/or the extracting at 804 may comprise creating (e.g., by the electronic processing device) an attributes query, at 804-3. Different attributes and/or attribute sets may be retrieved for each record associated with the retrieved sequence numbers, keys, tables, etc., for example.

In some embodiments, the method 800 may comprise parsing (e.g., by the electronic processing device) the raw data into tables and fields utilizing QA parsing logic, at 806. The goal of the method 800 may comprise performance of a GDP application process on the same source data utilized for a normal GDP application run, but utilizing different logic in an attempt to achieve the same end results. The QA parsing logic may accordingly comprise a set of rules for identifying tables, fields, keys, and/or other data parameters from the unstructured and/or semi-structured data source that differs in logical approach, rules, and/or threshold settings from the logic employed by the regular GDP application process. In such a manner, for example, the regular GDP application process may be checked. According to some embodiments, based on the QA input test keys and/the identified sequence numbers, the method 800 may automatically generate scripts for the creation of base layer and/or client/SSL layer tables.

According to some embodiments, the method 800 may comprise selecting (e.g., by the electronic processing device) a field, at 808. The method 800 may randomly or in sequence, for example, select a data field for analysis. In some embodiments, the selection of the field may be based on the QA test key input, the source data type, and/or other attribute and/or parameter values. According to some embodiments, the method 800 may comprise comparing (e.g., by the electronic processing device) the field in the raw data and in the parsed data, at 810. The data values stored in each field of each table identified for analysis may, for example, be compared. According to some embodiments, values and/or parameters other than (and/or in addition to) the data values may be compared, such as data attribute values.

In some embodiments, the method 800 may comprise determining (e.g., by the electronic processing device) whether there is a match, at 812. Numeric and/or alphanumeric data and/or attribute values may be compared, for example, to determine if there is an equivalence therebetween. While generally the equivalence may be mathematical, it may also or alternatively be logical (e.g., based on one or more rules, thresholds, etc.). For calculated and/or estimated data field values, for example, a match may be determined in the case that the mathematical difference between the two values falls within an acceptable threshold (e.g., an error or tolerance threshold).

In the case that no match is found, the method 800 may proceed to recording (e.g., by the electronic processing device) a mismatch, at 814. A count and/or listing of mismatched values may be recorded and/or stored, for example, to define a running count and/or listing of identified problems. In some embodiments, stored data indicative of the cumulative and/or ongoing mismatched data may be updated, at 814-1. According to some embodiments, such as in the case that a match is found at 812 and/or in the case that the recording of the mismatch at 814 is complete, the method 800 may proceed to determining (e.g., by the electronic processing device) whether more fields are to be analyzed, at 816. The method 800 may cycle through an analysis/comparison of a set of records and/or fields, for example, and may maintain a listing of records and/or fields that remain to be analyzed (e.g., that have not yet been flagged as having been compared). The method 800 may proceed to advance through this listing until all fields and/or records have been processed. In the case that one or more additional records (and/or fields) remain for analysis, the method 800 may return to the selecting of a field, at 808.

In the case that no additional records (and/or fields) remain for analysis, the method 800 may proceed to reporting, at 818. The reporting may comprise, for example, a generating (e.g., by the electronic processing device) of a QA detail and/or summary report, listing, file, output, etc. The summary may comprise, in some embodiments, a count of mismatched records. According to some embodiments, the summary may comprise mismatched record counts grouped by table, field, etc. In such a manner, for example, a user may readily identify where problems have occurred, and to what extent. In some embodiments, the summary may also or alternatively comprise a detailed listing. Details descriptive of each mismatched record and/or field may, for example, be output to the user along with the summary or in place of the summary. According to some embodiments, the summary may comprise an interactive UI that enables a user to drill-down through the data to analyze the details of the errors identified in the summary.

VII. Generic Data Parsing Application Quality Assurance Interfaces

Turning now to FIG. 9A, FIG. 9B, FIG. 9C, FIG. 9D, and FIG. 9E, diagrams of example interfaces 920*a-e* according to some embodiments are shown. In some embodiments, any or all of the interfaces 920*a-e* may comprise a web page, web form, database entry form, API, spreadsheet, table, and/or application or other GUI by which a user or other entity may enter data (e.g., provide or define input) to enable testing and/or a QA process with respect to data loaded via a GDP application, as described herein. The interfaces 920*a-e* may, for example, comprise a front-end of a GDP application QA program and/or platform programmed and/or or otherwise configured to execute, conduct, and/or facilitate the method 800 of FIG. 8 herein, and/or portions thereof. In some embodiments, the interfaces 920*a-e* may be output via a computerized device, such as one or more of the user devices 102*a-n*, 202*a-b*, 402 and/or the controller devices 110, 210, and/or the apparatus 1010 of FIG. 1, FIG. 2, FIG. 4A, FIG. 4B, FIG. 4C, FIG. 4D, FIG. 4E, FIG. 4F, FIG. 4G, and/or FIG. 10 herein.

According to some embodiments, the interfaces 920*a-e* may comprise one or more tabs and/or other segmented and/or logically-presented data forms and/or fields. In some embodiments, the interfaces 920*a-e* may be configured and/or organized to allow and/or facilitate entry and/or acquisition of information regarding QA testing for a GDP application. According to some embodiments, the interfaces 902*a-e* may comprise a menu page from which a user may select one or more options that initiate specific functionality of a QA testing application executed by a user device and/or controller device (neither of which is shown). As depicted in FIG. 9A, for example, a first interface 920*a* (e.g., version, page, or instance) may comprise a "Menu" or "Home Page" interface (e.g., defining a first input and/or output mechanism) by comprising an area (e.g., one or more data entry mechanisms, tools, objects, and/or features) that provides for selection/activation of (i) a search bar 922-1, (ii) a first data type (e.g., "JSON") button 922-2, (iii) a second data type (e.g., "XML") button 922-3, and/or (viii) a third data type (e.g., "CPYBK") button 922-4. According to some embodiments, the first interface 920*a* may comprise and/or output testing data 928-1, 928-2, e.g., descriptive of previously initiated QA analysis executions (e.g., QA jobs or test runs).

In some embodiments, the first interface 920*a* may be utilized to select, monitor, and/or review current and/or previous testing runs via the testing data 928-1, 928-2, for example, and/or by searching for a test run utilizing the search bar 922-1 (e.g., by entering a tracking identifier and/or other data descriptive of a QA test run). According to some embodiments, the first interface 920*a* may be utilized to initiate a new QA test. A new QA test may be initiated, in some embodiments, in the case that a user selects one or more of the data type buttons 922-2, 922-3, 922-4 and/or otherwise indicates a desire to initiate a QA module, routine, and/or process. As depicted for example purposes only in FIG. 9A, and as indicated by a shaded button area, the user may have selected the first data type button 922-2 to indicate that a test of a JSON data source is desired.

According to some embodiments, the first data type button 922-2 (and/or the other buttons 922-3, 922-4) may, when actuated or selected by the user, for example, initiate a sub-routine that directs the user to information input and/or output areas (e.g., additional interface views) for QA analysis initiation. In some embodiments for example, the application may cause the first interface 920*a* to display other or additional user-selectable menu choices (not shown). The user-selectable menu choices displayed by the application may be part of a library of user-selectable objects. In some embodiments, the library of user-selectable objects includes other user-selectable objects that are selectively included for display based on their determined relevance (e.g., based on pre-stored data associations) to the user, a user device, GDP application version, data source, and/or data target. In some embodiments, a positive indication of a desire to initiate a QA test run (e.g., a selection of one or more of the data type buttons 922-2, 922-3, 922-4 may trigger a call to and/or otherwise cause a provision, generation, and/or outputting of a second interface 920*b* (and/or the second interface 920*b* may be automatically provided upon event detection).

Referring to FIG. 9B for example, the second interface 920*b* (e.g., version, page, or instance) may comprise a QA analysis initiation and/or configuration interface (e.g., defining a second input and/or output mechanism) by providing (i) a container name input 922-5, (ii) a source name input 922-6, (iii) a first key input 922-7, (iv) a second key input 922-8, (v) a cycle date input 922-9, and/or (vi) a testing type input 922-10. The second interface 920*b* may be utilized, for example, for the user to input (and the QA system to receive) data descriptive of the desired QA testing run. The container name input 922-5 may comprise a data entry box and/or a drop-down menu, for example, that enables a user to enter and/or select a value descriptive of a current and/or desired container name for the QA test run. In some embodiments, the source name input 922-6 may comprise a data entry box and/or a drop-down menu that enables a user to enter and/or select a value descriptive of a current and/or desired data source (e.g., an unstructured and/or semi-structured data source) name for the QA test run.

According to some embodiments, the key inputs 922-7, 922-8 may comprise data entry boxes (and/or drop-down menus) that enable a user to enter and/or select a value descriptive of a desired test key for the QA test run. While two (2) test keys are depicted in FIG. 9B, fewer or more test keys may be utilized, as is or becomes desirable and/or practicable. In some embodiments, the cycle date input 922-9 may comprise a data entry box and/or a date menu that enables a user to enter and/or select a value descriptive of a current and/or desired cycle date for the QA test run. According to some embodiments, the testing type input 922-10 may comprise a data entry box and/or a radio button menu that enables a user to enter and/or select a value descriptive of a current and/or desired testing type (e.g., "JSON E-z-E Data Testing" as shown as selected for purposes of example) for the QA test run.

In some embodiments, the second interface 920*b* may comprise a submit request button 924*b* that may be utilized to indicate when all input has been entered and/or selected. In some embodiments, the application may cause the second interface 920*b* to display other or additional user-selectable menu choices (not shown). The user-selectable menu choices displayed by the application may be part of a library of user-selectable objects. In some embodiments, the library of user-selectable objects includes other user-selectable objects that are selectively included for display based on their determined relevance (e.g., based on pre-stored data associations) to the user, a user device, GDP application version, data source, and/or data target. According to some embodiments, the submit request button 924*b* of the second interface 920*b* may, upon a triggering and/or receipt of input from the user (e.g., a properly-positioned click of a mouse or other pointer) with respect to the submit request button 924*b*, initiate a sub-routine that causes the desired QA testing process to initiate and/or execute. In some embodiments, a positive indication of data input completion (e.g., a selection of the submit request button 924*b*) may trigger a call to and/or otherwise cause a provision, generation, and/or outputting of a third interface 920*c* (and/or the third interface 920*c* may be automatically provided upon event detection).

Referring to FIG. 9C for example, the third interface 920*c* (e.g., version, page, or instance) may comprise a QA analysis summary or results interface (e.g., defining a third input and/or output mechanism) by providing (i) a container name output 928-3, (ii) a source name output 928-4, (iii) a policy ID output 928-5, (iv) a total fields in database output 928-6, (v) a total fields in record output 928-7, (vi) a total fields matched output 928-8, and/or (vii) a total fields mismatched output 928-9. The third interface 920*c* may be utilized, for example, to provide meaningful output descriptive of the executed QA testing run. The container name output 928-3 may provide output, for example, that is descriptive of a container name for the executed QA test run. In some embodiments, the source name output 928-4 may provide output descriptive of a data source (e.g., an unstructured and/or semi-structured data source) name for the executed QA test run. According to some embodiments, the policy ID output 928-5 may provide output descriptive of a policy ID utilized for the executed QA test run.

In some embodiments, the total fields in database output 928-6 may provide output descriptive of a total number of data fields from the source database that have been processed by the executed QA test run. According to some embodiments, the total fields in record output 928-7 may provide output descriptive of a total number of fields for each record that have been processed by the executed QA test run. In some embodiments, the total fields matched output 928-8 may provide output descriptive of a total number of data fields that have been successfully matched by the executed QA test run. According to some embodiments, the total fields mismatched output 928-9 may provide output descriptive of a total number of fields that have not been successfully matched by the executed QA test run (as is depicted in FIG. 9C for purposes of non-limiting example, there were zero (0) mismatched records in the example run; meaning the run was a complete success and/or that the GDP application has been successfully verified for accuracy).

In some embodiments, the third interface 920c may comprise a close button 924c that may be utilized to indicate that the user is done viewing the provided output. In some embodiments, the application may cause the third interface 920c to display other or additional user-selectable menu choices (not shown). The user-selectable menu choices displayed by the application may be part of a library of user-selectable objects. In some embodiments, the library of user-selectable objects includes other user-selectable objects that are selectively included for display based on their determined relevance (e.g., based on pre-stored data associations) to the user, a user device, GDP application version, data source, and/or data target. According to some embodiments, the close button 924c of the third interface 920c may, upon a triggering and/or receipt of input from the user (e.g., a properly-positioned click of a mouse or other pointer) with respect to the close button 924c, initiate a sub-routine that causes the desire QA testing process to initiate and/or execute. In some embodiments, a positive indication of data input completion (e.g., a selection of the submit request button 924b) may trigger a call to and/or otherwise cause a provision, generation, and/or outputting of a fourth interface 920d or the first interface 920a (and/or the first interface 920a or the fourth interface 920d may be automatically provided upon event detection).

In the case that the fourth interface 920d is output, and referring to FIG. 9D, for example, the fourth interface 920d (e.g., version, page, or instance) may comprise a QA analysis details interface (e.g., defining a fourth input and/or output mechanism) by providing (i) a field XPath output 928-10, (ii) a table name output 928-11, (iii) a field name output 928-12, and/or (iv) a match indicator output 928-13. The fourth interface 920d may be utilized, for example, to provide detailed output descriptive of evaluated fields, tables, record, keys, etc., tested and/or evaluated during the QA testing run. The field XPath output 928-10 may provide output, for example, that is descriptive of a field XPath for each field tested during the QA test run. In some embodiments, the table name output 928-11 may provide output descriptive of a table name for tables associated with tested fields/records and/or tables that were themselves tested during the QA test run. According to some embodiments, the field name output 928-12 may provide output descriptive of a field name evaluated during the QA test run. In some embodiments, the match indicator output 928-13 may provide output descriptive of whether or not the analysis was able to match the data from the test with the data previously loaded by the GDP application (e.g., line-level success or failure indicators).

In some embodiments, the fourth interface 920d may comprise a differences button 924d that may be utilized to request a listing of any identified differences (e.g., mismatches). In some embodiments, the application may cause the fourth interface 920d to display other or additional user-selectable menu choices (not shown). The user-selectable menu choices displayed by the application may be part of a library of user-selectable objects. In some embodiments, the library of user-selectable objects includes other user-selectable objects that are selectively included for display based on their determined relevance (e.g., based on pre-stored data associations) to the user, a user device, GDP application version, data source, and/or data target. According to some embodiments, the differences button 924d of the fourth interface 920d may, upon a triggering and/or receipt of input from the user (e.g., a properly-positioned click of a mouse or other pointer) with respect to the differences button 924d, initiate a sub-routine that causes the provision of a detailed report of differences for the QA testing run. In some embodiments, a positive indication of a request for the detailed mismatch report (e.g., a selection of the differences button 924d) may trigger a call to and/or otherwise cause a provision, generation, and/or outputting of a fifth interface 920e (and/or the fifth interface 920e may be automatically provided upon event detection).

Figure 9E:

Referring to FIG. 9E for example, the fifth interface 920e (e.g., version, page, or instance) may comprise a QA analysis differences report (e.g., defining a fifth input and/or output mechanism) by providing (i) a table/field search box 922-11, (ii) a table/field output 928-14, (iii) a Hive data output 928-15, and/or (iv) a raw data output 928-16. The table/field search box 922-11 may be utilized, for example, to search for a particular table, field, key, record, value, etc.—e.g., to locate any mismatches that may be associated with the queried element(s). According to some embodiments, the table/field output 928-14 may provide table and/or field names, for example, the Hive data output 928-15 may provide the Hive or base layer value for the particular table and field (e.g., for a given record), and/or the raw data output 928-16 may provide the raw data value that was compared to the base table (e.g., Hive) value.

While various components of the interfaces 920a-e have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

VIII. Generic Data Parsing Application Apparatus & Articles of Manufacture

Figure 10:
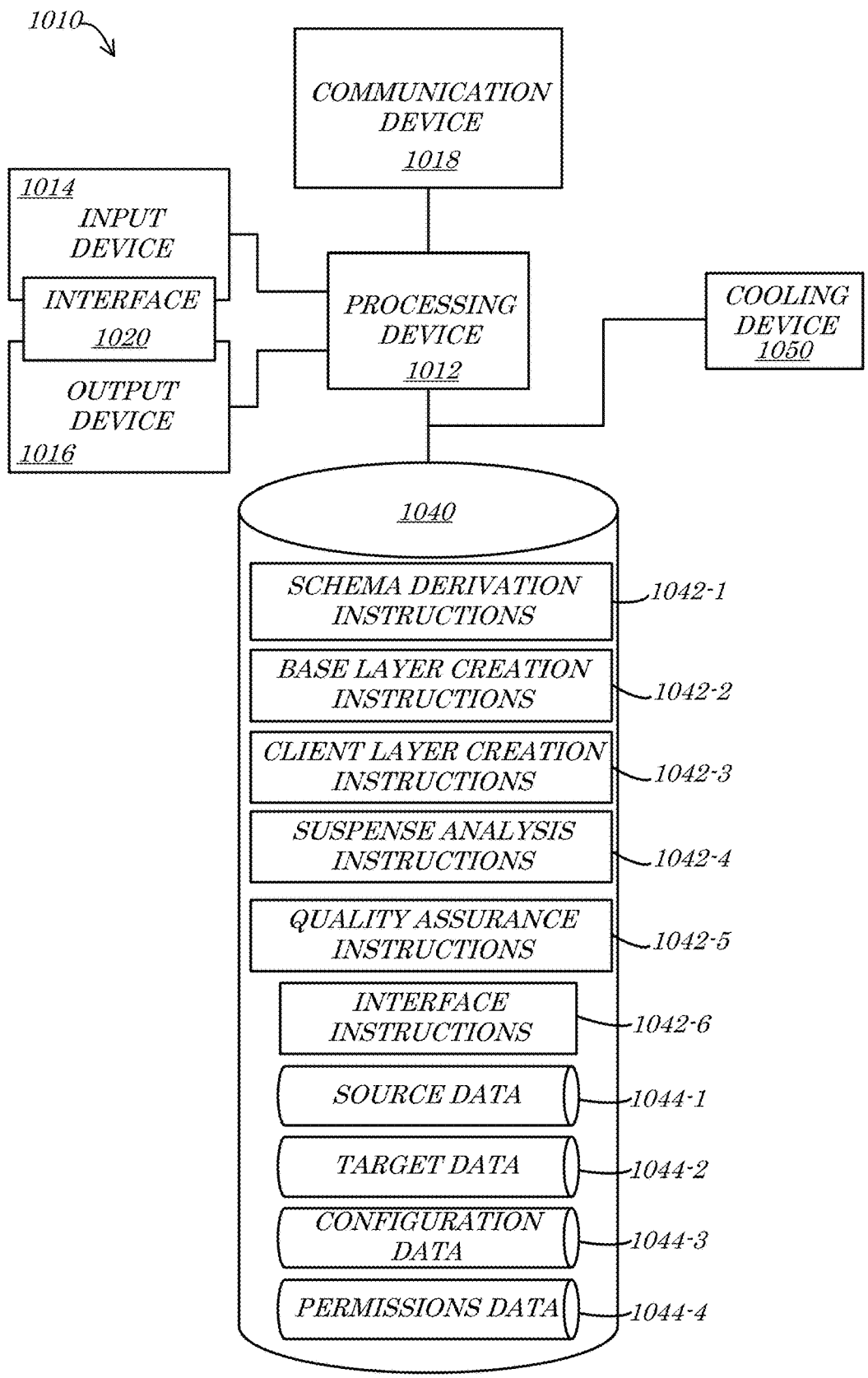
FIG. 10 is a block diagram of an apparatus according to some embodiments.
Figure 11A:
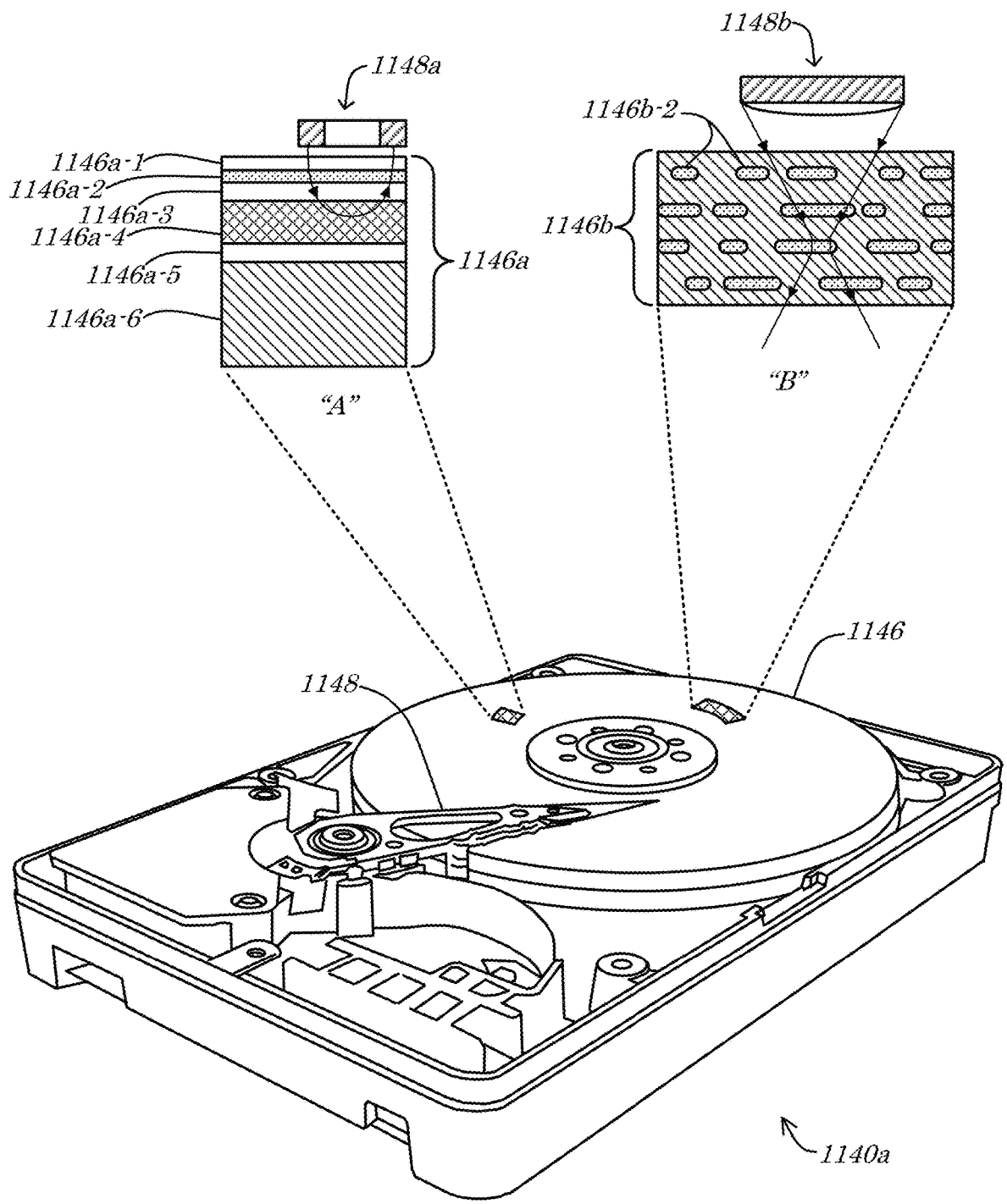
FIG. 11A, FIG. 11B, FIG. 11C, FIG. 11D, and FIG. 11E are perspective diagrams of exemplary data storage devices according to some embodiments.
Figure 11B:
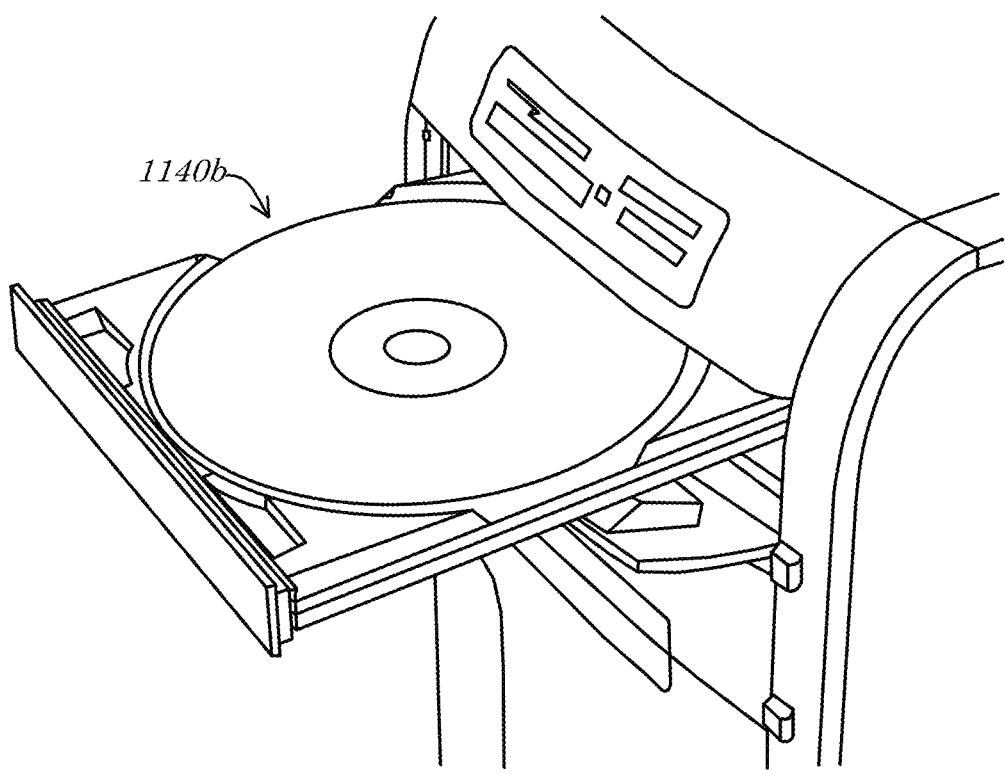
Figure 11C:
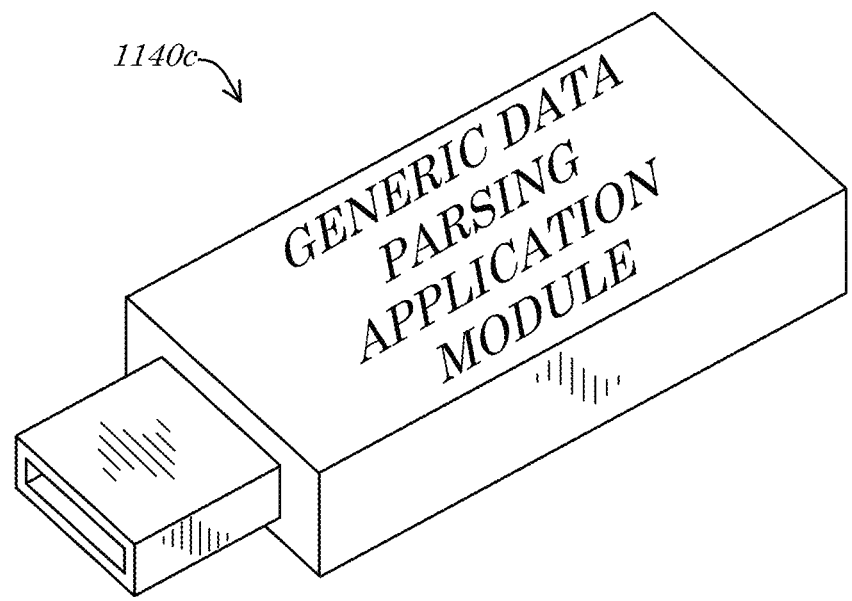
Figure 11D:
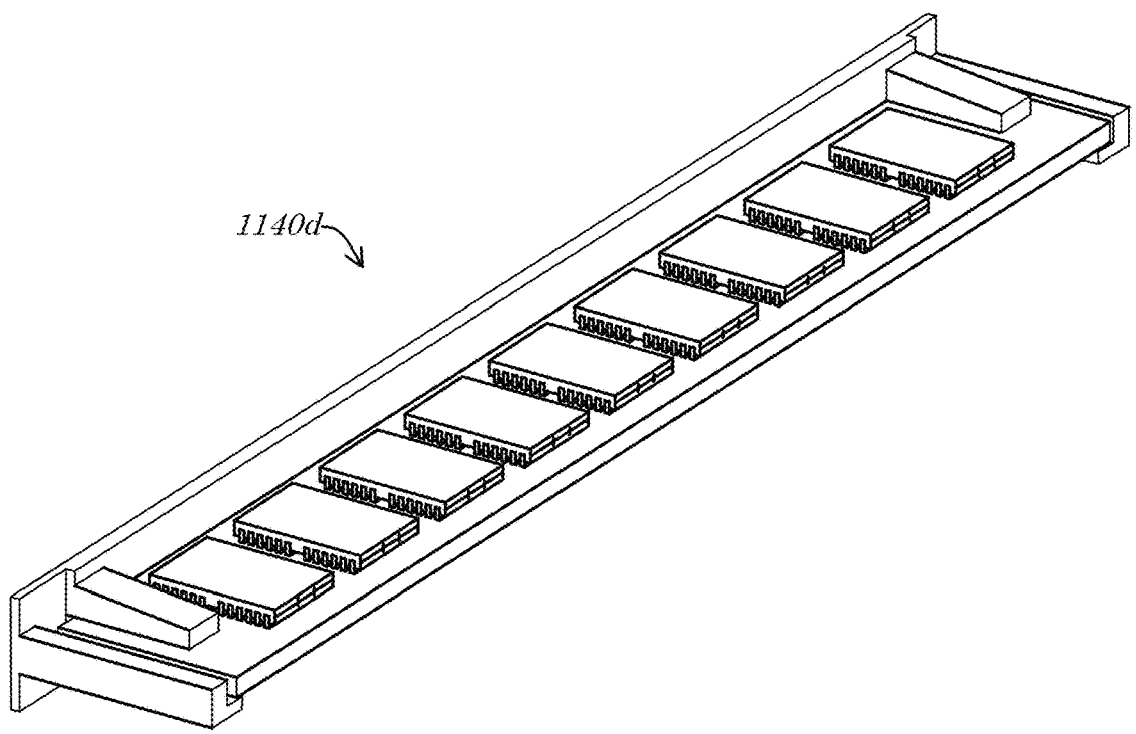
Figure 11E:
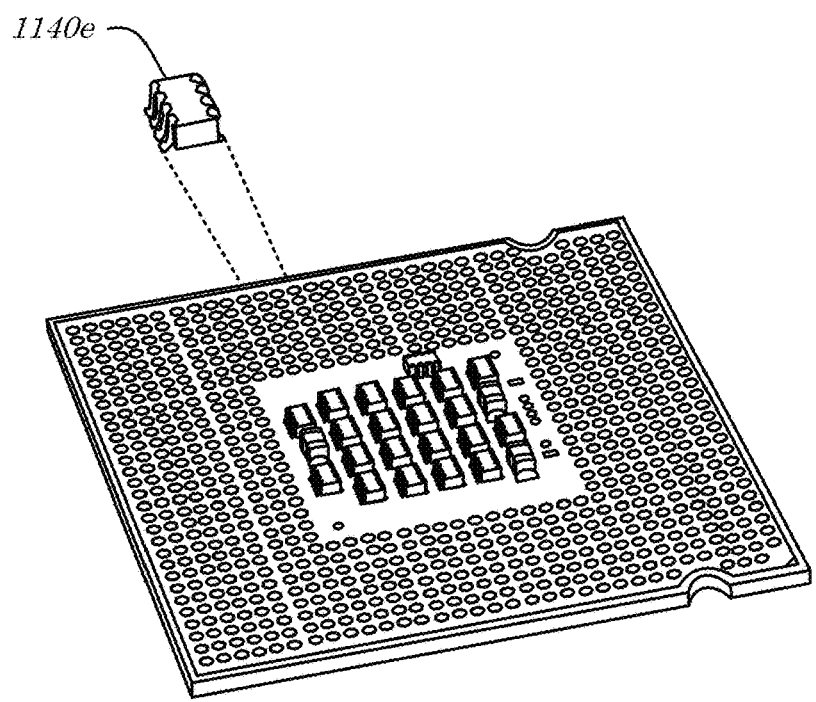

Turning to FIG. 10, a block diagram of an apparatus 1010 according to some embodiments is shown. In some embodiments, the apparatus 1010 may be similar in configuration and/or functionality to one or more of the user devices 102a-n, 202a-b, 402 and/or the controller devices 110, 210 of FIG. 1, FIG. 2, FIG. 4A, FIG. 4B, FIG. 4C, FIG. 4D, FIG. 4E, FIG. 4F, and/or FIG. 4G, herein. The apparatus 1010 may, for example, execute, process, facilitate, and/or otherwise be associated with the methods 300, 700, 800 of FIG. 3A, FIG. 3B, FIG. 3C, FIG. 7, and/or FIG. 8 herein, and/or portions or combinations thereof. In some embodiments, the apparatus 1010 may comprise a processing device 1012, an input device 1014, an output device 1016, a communication device 1018, an interface 1020, a memory device 1040 (storing various programs and/or instructions 1042 and data 1044), and/or a cooling device 1050. According to some embodiments, any or all of the components 1012, 1014, 1016, 1018, 1020, 1040, 1042, 1044, 1050 of the apparatus 1010 may be similar in configuration and/or functionality to any similarly named and/or numbered components described herein. Fewer or more components 1012, 1014, 1016, 1018, 1020, 1040, 1042, 1044, 1050 and/or various configurations of the components 1012, 1014, 1016, 1018, 1020, 1040, 1042, 1044, 1050 may be included in the apparatus 1010 without deviating from the scope of embodiments described herein.

According to some embodiments, the processor 1012 may be or include any type, quantity, and/or configuration of processor that is or becomes known. The processor 1012 may comprise, for example, an Intel® IXP 2800 network processor or an Intel® XEON™ Processor coupled with an Intel® E7501 chipset. In some embodiments, the processor 1012 may comprise multiple inter-connected processors, microprocessors, and/or micro-engines. According to some embodiments, the processor 1012 (and/or the apparatus 1010 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 1010 comprises a server, such as a blade server or a virtual co-location device, necessary power may be supplied via a standard AC outlet, power strip, surge protector, and/or Uninterruptible Power Supply (UPS) device.

In some embodiments, the input device 1014 and/or the output device 1016 are communicatively coupled to the processor 1012 (e.g., via wired and/or wireless connections and/or pathways) and they may generally comprise any types or configurations of input and output components and/or devices that are or become known, respectively. The input device 1014 may comprise, for example, a keyboard that allows an operator of the apparatus 1010 to interface with the apparatus 1010 (e.g., by a data transformation specialist or a non-coding, querying end-user, as described herein). The output device 1016 may, according to some embodiments, comprise a display screen and/or other practicable output component and/or device. The output device 1016 may, for example, provide an interface (such as the interface 1020) via which functionality for automatic unstructured and/or semi-structured data transformation is provided to a user (e.g., via a website and/or mobile application). According to some embodiments, the input device 1014 and/or the output device 1016 may comprise and/or be embodied in a single device, such as a touch-screen monitor.

In some embodiments, the communication device 1018 may comprise any type or configuration of communication device that is or becomes known or practicable. The communication device 1018 may, for example, comprise a Network Interface Card (NIC), a telephonic device, a cellular network device, a router, a hub, a modem, and/or a communications port or cable. In some embodiments, the communication device 1018 may be coupled to receive GDP application inputs and/or queries directed to transformed data, as described herein. The communication device 1018 may, for example, acquire data from a user (not separately depicted in FIG. 10) and/or may comprise a transmitter device that provides data to the user. According to some embodiments, the communication device 1018 may also or alternatively be coupled to the processor 1012. In some embodiments, the communication device 1018 may comprise an IR, RF, Bluetooth™, Near-Field Communication (NFC), and/or Wi-Fi® network device coupled to facilitate communications between the processor 1012 and another device (such as a remote user device, not separately shown in FIG. 10).

The memory device 1040 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 1040 may, according to some embodiments, store one or more of schema derivation instructions 1042-1, base layer creation instructions 1042-2, client layer creation instructions 1042-3, suspense analysis (e.g., "SA") instructions 1042-4, quality assurance (e.g., "QA") instructions 1042-5, interface instructions 1042-6, source data 1044-1, target data 1044-2, configuration data 1044-3, and/or permissions data 1044-4. In some embodiments, the schema derivation instructions 1042-1, base layer creation instructions 1042-2, client layer creation instructions 1042-3, suspense analysis instructions 1042-4, quality assurance instructions 1042-5, interface instructions 1042-6, source data 1044-1, target data 1044-2, configuration data 1044-3, and/or permissions data 1044-4 may be utilized by the processor 1012 to provide output information via the output device 1016 and/or the communication device 1018.

According to some embodiments, the schema derivation instructions 1042-1 may be operable to cause the processor 1012 to process the source data 1044-1, target data 1044-2, configuration data 1044-3, and/or permissions data 1044-4 in accordance with embodiments as described herein. Source data 1044-1, target data 1044-2, configuration data 1044-3, and/or permissions data 1044-4 received via the input device 1014 and/or the communication device 1018 may, for example, be analyzed, sorted, filtered, decoded, decompressed, ranked, scored, plotted, and/or otherwise processed by the processor 1012 in accordance with the schema derivation instructions 1042-1. In some embodiments, source data 1044-1, target data 1044-2, configuration data 1044-3, and/or permissions data 1044-4 may be fed by the processor 1012 through one or more mathematical, AI logic (e.g., neural network), and/or statistical formulas and/or models in accordance with the schema derivation instructions 1042-1 to define a normalized, structured, and/or relational data schema based on an unstructured and/or semi-structured data source, as described herein.

In some embodiments, the base layer creation instructions 1042-2 may be operable to cause the processor 1012 to process the source data 1044-1, target data 1044-2, configuration data 1044-3, and/or permissions data 1044-4 in accordance with embodiments as described herein. Source data 1044-1, target data 1044-2, configuration data 1044-3, and/or permissions data 1044-4 received via the input device 1014 and/or the communication device 1018 may, for example, be analyzed, sorted, filtered, decoded, decompressed, ranked, scored, plotted, and/or otherwise processed by the processor 1012 in accordance with the base layer creation instructions 1042-2. In some embodiments, source data 1044-1, target data 1044-2, configuration data 1044-3, and/or permissions data 1044-4 may be fed by the processor 1012 through one or more mathematical, AI logic (e.g., neural network), and/or statistical formulas and/or models in accordance with the base layer creation instructions 1042-2 to create a base layer based on the normalized, structured, and/or relational data schema for the unstructured and/or semi-structured data source, as described herein.

According to some embodiments, the client layer creation instructions 1042-3 may be operable to cause the processor 1012 to process the source data 1044-1, target data 1044-2, configuration data 1044-3, and/or permissions data 1044-4 in accordance with embodiments as described herein. Source data 1044-1, target data 1044-2, configuration data 1044-3, and/or permissions data 1044-4 received via the input device 1014 and/or the communication device 1018 may, for example, be analyzed, sorted, filtered, decoded, decompressed, ranked, scored, plotted, and/or otherwise processed by the processor 1012 in accordance with the client layer creation instructions 1042-3. In some embodiments, source data 1044-1, target data 1044-2, configuration data 1044-3, and/or permissions data 1044-4 may be fed by the processor 1012 through one or more mathematical, AI logic (e.g., neural network), and/or statistical formulas and/or models in accordance with the client layer creation instructions 1042-3 to create a client (e.g., SSL) layer based on the base layer that is crated from the normalized, structured, and/or relational data schema for the unstructured and/or semi-structured data source, as described herein.

In some embodiments, the suspense analysis instructions 1042-4 may be operable to cause the processor 1012 to process the source data 1044-1, target data 1044-2, configuration data 1044-3, and/or permissions data 1044-4 in accordance with embodiments as described herein. Source data 1044-1, target data 1044-2, configuration data 1044-3, and/or permissions data 1044-4 received via the input device 1014 and/or the communication device 1018 may, for example, be analyzed, sorted, filtered, decoded, decompressed, ranked, scored, plotted, and/or otherwise processed by the processor 1012 in accordance with the suspense analysis instructions 1042-4. In some embodiments, source data 1044-1, target data 1044-2, configuration data 1044-3, and/or permissions data 1044-4 may be fed by the processor 1012 through one or more mathematical, AI logic (e.g., neural network), and/or statistical formulas and/or models in accordance with the suspense analysis instructions 1042-4 to analyze, sort, load, and or otherwise process suspended records from a GDP application and/or to update a GDP data schema based on identified changes in the underlying unstructured and/or semi-structured data source, as described herein.

According to some embodiments, the quality assurance instructions 1042-5 may be operable to cause the processor 1012 to process the source data 1044-1, target data 1044-2, configuration data 1044-3, and/or permissions data 1044-4 in accordance with embodiments as described herein. Source data 1044-1, target data 1044-2, configuration data 1044-3, and/or permissions data 1044-4 received via the input device 1014 and/or the communication device 1018 may, for example, be analyzed, sorted, filtered, decoded, decompressed, ranked, scored, plotted, and/or otherwise processed by the processor 1012 in accordance with the quality assurance instructions 1042-5. In some embodiments, source data 1044-1, target data 1044-2, configuration data 1044-3, and/or permissions data 1044-4 may be fed by the processor 1012 through one or more mathematical, AI logic (e.g., neural network), and/or statistical formulas and/or models in accordance with the quality assurance instructions 1042-5 to run a quality assurance test on data loaded by a GDP application, as described herein.

In some embodiments, the interface instructions 1042-6 may be operable to cause the processor 1012 to process the source data 1044-1, target data 1044-2, configuration data 1044-3, and/or permissions data 1044-4 in accordance with embodiments as described herein. Source data 1044-1, target data 1044-2, configuration data 1044-3, and/or permissions data 1044-4 received via the input device 1014 and/or the communication device 1018 may, for example, be analyzed, sorted, filtered, decoded, decompressed, ranked, scored, plotted, and/or otherwise processed by the processor 1012 in accordance with the interface instructions 1042-6. In some embodiments, source data 1044-1, target data 1044-2, configuration data 1044-3, and/or permissions data 1044-4 may be fed by the processor 1012 through one or more mathematical, AI logic (e.g., neural network), and/or statistical formulas and/or models in accordance with the interface instructions 1042-6 to provide various interfaces to end-users, consumers, companies, and/or other users to facilitate querying of unstructured and/or semi-structured data sources, as described herein.

According to some embodiments, the apparatus 1010 may comprise the cooling device 1050. According to some embodiments, the cooling device 1050 may be coupled (physically, thermally, and/or electrically) to the processor 1012 and/or to the memory device 1040. The cooling device 1050 may, for example, comprise a fan, heat sink, heat pipe, radiator, cold plate, and/or other cooling component or device or combinations thereof, configured to remove heat from portions or components of the apparatus 1010.

Any or all of the exemplary instructions and data types described herein and other practicable types of data may be stored in any number, type, and/or configuration of memory devices that is or becomes known. The memory device 1040 may, for example, comprise one or more data tables or files, databases, table spaces, registers, and/or other storage structures. In some embodiments, multiple databases and/or storage structures (and/or multiple memory devices 1040) may be utilized to store information associated with the apparatus 1010. According to some embodiments, the memory device 1040 may be incorporated into and/or otherwise coupled to the apparatus 1010 (e.g., as shown) or may simply be accessible to the apparatus 1010 (e.g., externally located and/or situated).

Referring to FIG. 11A, FIG. 11B, FIG. 11C, FIG. 11D, and FIG. 11E, perspective diagrams of exemplary data storage devices 1140a-e according to some embodiments are shown. The data storage devices 1140a-e may, for example, be utilized to store instructions and/or data such as the schema derivation instructions 1042-1, base layer creation instructions 1042-2, client layer creation instructions 1042-3, suspense analysis instructions 1042-4, quality assurance instructions 1042-5, interface instructions 1042-6, source data 1044-1, target data 1044-2, configuration data 1044-3, and/or permissions data 1044-4, each of which is presented in reference to FIG. 10 herein. In some embodiments, instructions stored on the data storage devices 1140a-e may, when executed by a processor, cause the implementation of and/or facilitate the methods 300, 700, 800 of FIG. 3A, FIG. 3B, FIG. 3C, FIG. 7, and/or FIG. 8 herein, and/or portions or combinations thereof.

According to some embodiments, the first data storage device 1140a may comprise one or more various types of internal and/or external hard drives. The first data storage device 1140a may, for example, comprise a data storage medium 1146 that is read, interrogated, and/or otherwise communicatively coupled to and/or via a disk reading device 1148. In some embodiments, the first data storage device 1140a and/or the data storage medium 1146 may be configured to store information utilizing one or more magnetic, inductive, and/or optical means (e.g., magnetic, inductive, and/or optical-encoding). The data storage medium 1146, depicted as a first data storage medium 1146a for example (e.g., breakout cross-section "A"), may comprise one or more of a polymer layer 1146a-1, a magnetic data storage layer 1146a-2, a non-magnetic layer 1146a-3, a magnetic base layer 1146a-4, a contact layer 1146a-5, and/or a substrate layer 1146a-6. According to some embodiments, a magnetic read head 1148*a* may be coupled and/or disposed to read data from the magnetic data storage layer 1146*a*-2.

In some embodiments, the data storage medium 1146, depicted as a second data storage medium 1146*b* for example (e.g., breakout cross-section "B"), may comprise a plurality of data points 1146*b*-2 disposed with the second data storage medium 1146*b*. The data points 1146*b*-2 may, in some embodiments, be read and/or otherwise interfaced with via a laser-enabled read head 1148*b* disposed and/or coupled to direct a laser beam through the second data storage medium 1146*b*.

In some embodiments, the second data storage device 1140*b* may comprise a CD, CD-ROM, DVD, Blu-Ray™ Disc, and/or other type of optically-encoded disk and/or other storage medium that is or becomes know or practicable. In some embodiments, the third data storage device 1140*c* may comprise a USB keyfob, dongle, and/or other type of flash memory data storage device that is or becomes know or practicable. In some embodiments, the fourth data storage device 1140*d* may comprise RAM of any type, quantity, and/or configuration that is or becomes practicable and/or desirable. In some embodiments, the fourth data storage device 1140*d* may comprise an off-chip cache such as a Level 2 (L2) cache memory device. According to some embodiments, the fifth data storage device 1140*e* may comprise an on-chip memory device such as a Level 1 (L1) cache memory device.

The data storage devices 1140*a-e* may generally store program instructions, code, and/or modules that, when executed by a processing device cause a particular machine to function in accordance with one or more embodiments described herein. The data storage devices 1140*a-e* depicted in FIG. 11A, FIG. 11B, FIG. 11C, FIG. 11D, and FIG. 11E are representative of a class and/or subset of computer-readable media that are defined herein as "computer-readable memory" (e.g., non-transitory memory devices as opposed to transmission devices or media).

IX. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described herein, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A method for loading semi-structured data into a data storage structure operable to accept and respond to structured queries, comprising:
   deriving, by at least one electronic processing device and by execution of schema derivation rules stored in at least one non-transitory computer readable medium, a schema, by:
      receiving, from a user and via a User Interface (UI), first input comprising a command and an identifier of a semi-structured data source;
      extracting, utilizing the identifier of the semi-structured data source and from the semi-structured data source, a listing of tables and fields;
      generating a unique identifier for each extracted table and field;
      identifying keys linking two or more extracted tables;
      creating a plurality of output files descriptive of the extracted tables and fields, the unique identifiers for the tables and fields, and the keys, thereby defining the schema;
      generating, based on the plurality of output files, a plurality of table create statements; and
      storing the plurality of table create statements in a schema definition file;
   creating, by the at least one electronic processing device and by execution of the base layer creation rules stored in the at least one non-transitory computer readable medium, a base layer, by:
      extracting, for each record in the semi-structured data source, all fields and corresponding values;
      comparing each of the extracted fields and values to the plurality of output files descriptive of the extracted tables and fields;
      mapping each of the extracted field values to a base layer table identified by a base layer table name;
      storing an indication of the mapping for each of the extracted field values in a partition of a distributed file system;
      creating, by executing at least one of the table create statements stored in the schema definition file, a plurality of base layer tables;
      writing, utilizing the stored mapping for each of the extracted field values, each of the extracted field values into a corresponding base layer table of the plurality of base layer tables; and
   creating, by the at least one electronic processing device and by execution of the Single Subject Layer (SSL) creation rules stored in the at least one non-transitory computer readable medium, an SSL layer, by:
      creating, utilizing a mapping sheet comprising at least one column of data descriptive of at least one data relationship, an SSL configuration file;
      generating, automatically, by executing a generic script and utilizing the SSL configuration file, SSL table creation code;
      creating, utilizing the SSL table creation code, a plurality of SSL tables; and
      loading the plurality of SSL tables with the corresponding values from the extracted fields of the records in the semi-structured data source.

2. The method of claim 1, wherein the mapping of the extracted field values to the base layer table produces a mapping file in delimited form.

3. The method of claim 1, wherein the plurality of output files comprise each of (i) a version file, (ii) a control file, (iii) a tables file, (iv) an XPath date file, (v) a keys file, and (vi) a format file.

4. The method of claim 1, further comprising:
   outputting, via the UI, a listing of the created plurality of output files.

5. The method of claim 1, wherein the extracting, utilizing the identifier of the semi-structured data source and from the semi-structured data source, of the listing of tables and fields, is conducted by an AI logical routine.

6. The method of claim 1, wherein the deriving of the schema, further comprises:
   grouping the extracted fields by corresponding extracted tables.

7. The method of claim 1, wherein the semi-structured data source comprises at least one of an XML, JSON, and a COBOL file.

8. The method of claim 1, wherein the first input further comprises information identifying a location at which the plurality of output files are to be created.

9. The method of claim 1, wherein the at least one column of data descriptive of the at least one data relationship from the mapping sheet comprises data describing the at least one relationship that differs from data descriptive of the at least one relationship that is stored with respect to the mapping for each of the extracted field values.

10. The method of claim 1, further comprising:
    identifying the mapping sheet from a plurality of available mapping sheets.

11. The method of claim 1, further comprising:
    receiving the mapping sheet from the user.

12. The method of claim 1, wherein the creating, utilizing the mapping sheet comprising the at least one column of data descriptive of the at least one data relationship, of the SSL configuration file, comprises:

accessing the mapping sheet; and
retrieving, from the mapping sheet, data descriptive of at least two of:
(i) a target entity;
(ii) a target attribute;
(iii) a column order number;
(iv) a target data type;
(v) a temp table;
(vi) a source;
(vii) a source attribute;
(viii) a filter condition;
(ix) a filter value; and
(x) a transformation format.

13. The method of claim 1, further comprising:
executing a suspended record analysis.

14. The method of claim 13, wherein the schema comprises a baseline schema and wherein the executing of the suspended record analysis, comprises:
deriving a first new schema from a population of suspended records;
deriving a second new schema from the first new schema; and
comparing the second new schema to the baseline schema.

15. The method of claim 14, wherein the executing of the suspended record analysis, further comprises:
identifying, based on the comparing of the second new schema to the baseline schema, at least one new field;
generating a report that provides a listing descriptive of the at least one new field; and
outputting the report.

16. The method of claim 14, wherein the executing of the suspended record analysis, further comprises:
identifying, based on the comparing of the second new schema to the baseline schema, at least one new table;
generating a report that provides a listing descriptive of the at least one new table; and
outputting the report.

17. The method of claim 1, further comprising:
executing a quality assurance analysis.

18. The method of claim 17, wherein the base layer creation rules comprise a first set of base layer creation rules, and wherein the executing of the quality assurance analysis, comprises:
receiving at least one test key;
extracting, from the semi-structured data source and utilizing the at least one test key, raw data;
parsing the extracted raw data, utilizing a second set of base layer creation rules into one or more corresponding tables; and
comparing each field value from the raw data to each field value stored in a corresponding field of at least one base layer table.

19. The method of claim 18, wherein the executing of the quality assurance analysis, further comprises:
identifying, based on the comparing of the field values from the raw data to the field values stored in the corresponding field of the at least one base layer table, at least one mismatched value;
generating a report that provides a listing descriptive of the at least one mismatched value; and
outputting the report.

20. The method of claim 1, wherein the creating of the SSL configuration file is based on a subset of the plurality of base layer tables selected for SSL layer creation, further comprising:
receiving, via the UI, an indication of a user selection of the subset of the plurality of base layer tables.

21. The method of claim 1, wherein the automatic generating of the SSL table creation code is based on a subset of the plurality of base layer tables selected for SSL layer creation, further comprising:
receiving, via the UI, an indication of a user selection of the subset of the plurality of base layer tables.

* * * * *